US012585164B2

(12) United States Patent
Lee

(10) Patent No.: US 12,585,164 B2
(45) Date of Patent: Mar. 24, 2026

(54) CAMERA ACTUATOR AND CAMERA MODULE COMPRISING SAME

(71) Applicant: LG INNOTEK CO., LTD., Seoul (KR)

(72) Inventor: Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 471 days.

(21) Appl. No.: 18/017,542

(22) PCT Filed: Jul. 23, 2021

(86) PCT No.: PCT/KR2021/009544
§ 371 (c)(1),
(2) Date: Jan. 23, 2023

(87) PCT Pub. No.: WO2022/019704
PCT Pub. Date: Jan. 27, 2022

(65) Prior Publication Data
US 2023/0259002 A1 Aug. 17, 2023

(30) Foreign Application Priority Data

Jul. 23, 2020 (KR) ........................ 10-2020-0091615
Jul. 22, 2021 (KR) ........................ 10-2021-0096523

(51) Int. Cl.
| | |
|---|---|
| *G03B 17/17* | (2021.01) |
| *G03B 5/00* | (2021.01) |
| *H02K 11/01* | (2016.01) |
| *H02K 11/215* | (2016.01) |
| *H02K 41/035* | (2006.01) |
| *H04N 23/51* | (2023.01) |

(52) U.S. Cl.
CPC .............. *G03B 5/00* (2013.01); *G03B 17/17* (2013.01); *H02K 11/0141* (2020.08);
(Continued)

(58) Field of Classification Search
CPC .... G02B 5/00; G02B 27/646; H02K 11/0141; H02K 11/215; H02K 41/0354;
(Continued)

(56) References Cited

U.S. PATENT DOCUMENTS 9,382,188 B2 7/2016 Shabtay et al.
10,269,859 B2 * 4/2019 Hu ......................... H04N 23/54
(Continued)

FOREIGN PATENT DOCUMENTS

EP 3 292 685 B1 6/2019
KR 10-2018-0041040 A 4/2018
(Continued)

*Primary Examiner* — Christopher E Leiby
(74) *Attorney, Agent, or Firm* — Birch, Stewart, Kolasch & Birch, LLP

(57) ABSTRACT

Disclosed according to an embodiment of the present invention is a camera actuator comprising: a housing; a mover which is disposed in the housing; a tilting guide unit which is disposed between the housing and the mover; a driving unit which is disposed in the housing to drive the mover; an elastic member by which the tilting guide unit and the mover come into close contact with each other; and a damper member which is disposed between the elastic member and at least one of the mover and the housing.

16 Claims, 54 Drawing Sheets

1000

(52) U.S. Cl.
CPC ....... *H02K 11/215* (2016.01); *H02K 41/0354* (2013.01); *H04N 23/51* (2023.01); *G03B 2205/0023* (2013.01)

(58) Field of Classification Search
CPC ...... H04N 23/51; H04N 23/57; H04N 23/687; H04N 23/54; G03B 2205/0023; G03B 3/10; G03B 30/00
See application file for complete search history.

(56) References Cited

U.S. PATENT DOCUMENTS

| | | | |
|---|---|---|---|
| 10,678,062 B2* | 6/2020 | Im | G02B 7/09 |
| 2012/0033280 A1* | 2/2012 | Mizoguchi | G02B 26/085 |
| | | | 359/198.1 |
| 2013/0050828 A1 | 2/2013 | Sato et al. | |
| 2015/0241691 A1* | 8/2015 | Asada | F16F 1/14 |
| | | | 310/38 |
| 2018/0259787 A1* | 9/2018 | Kim | H04N 23/687 |
| 2018/0364450 A1* | 12/2018 | Lee | H04N 23/55 |
| 2018/0367714 A1 | 12/2018 | Im et al. | |
| 2020/0174270 A1 | 6/2020 | Enta et al. | |
| 2020/0225442 A1 | 7/2020 | Weng et al. | |

FOREIGN PATENT DOCUMENTS

| | | |
|---|---|---|
| KR | 10-2018-0098074 A | 9/2018 |
| KR | 10-2019-0117973 A | 10/2019 |
| KR | 10-2046473 B1 | 11/2019 |

* cited by examiner

【Fig.1】
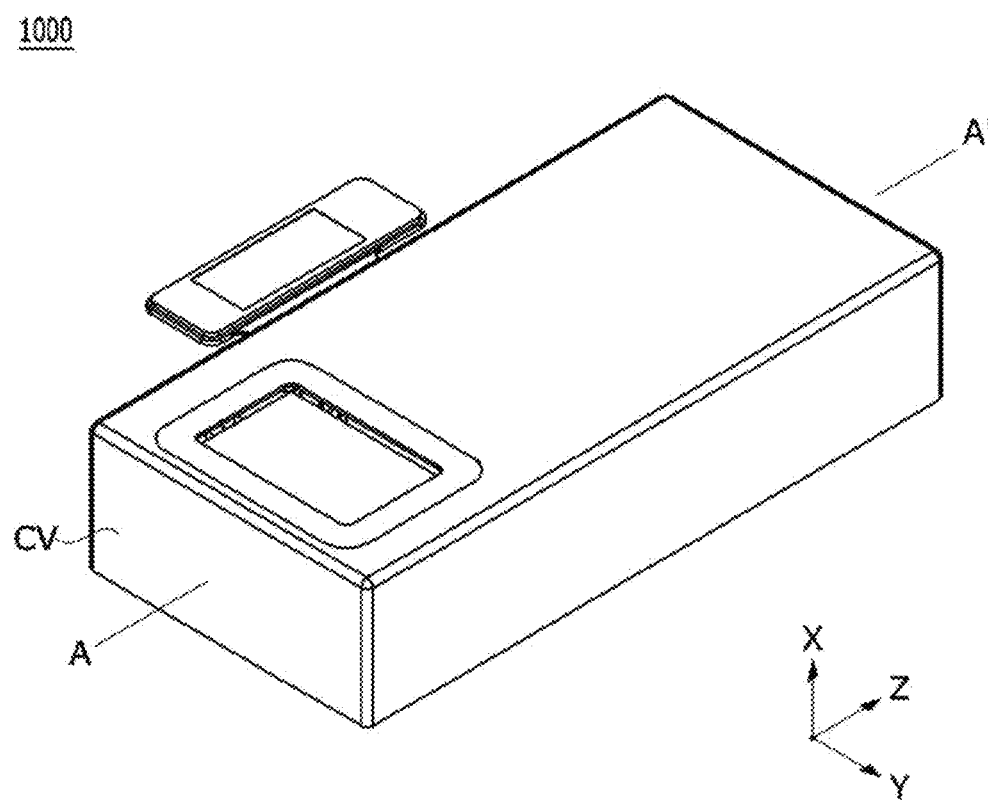

【Fig.2】
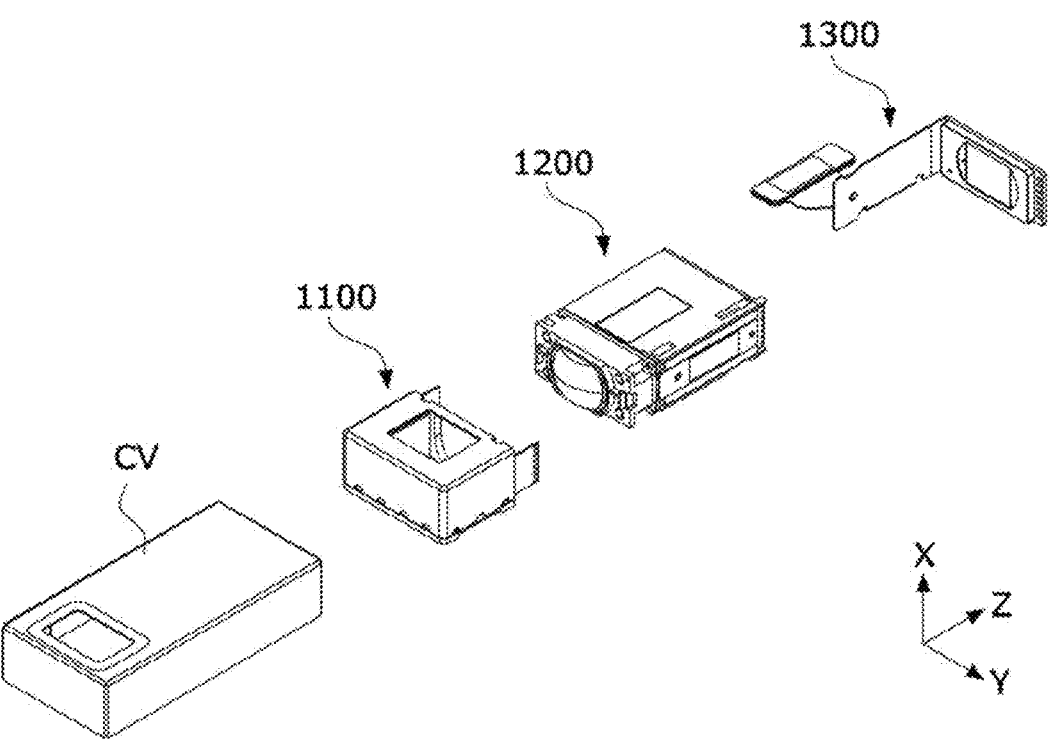
【Fig.3】
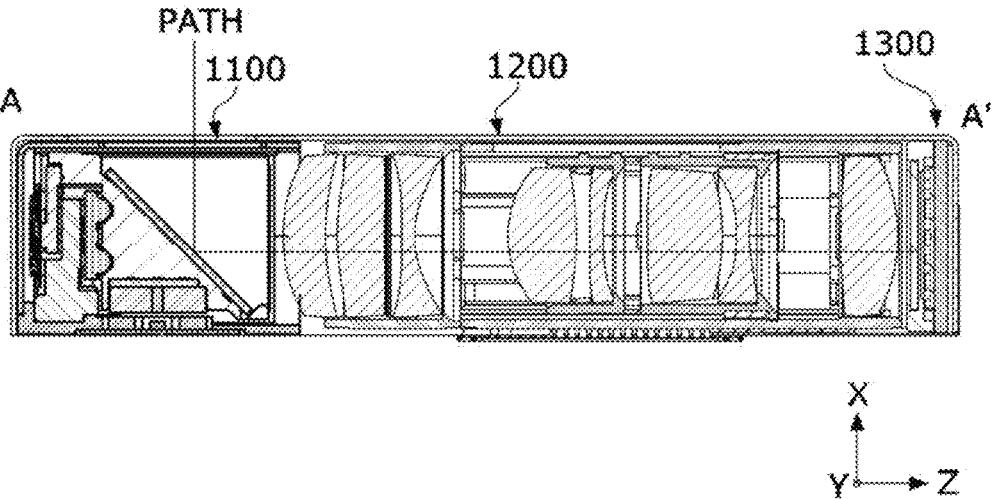

【Fig.4】
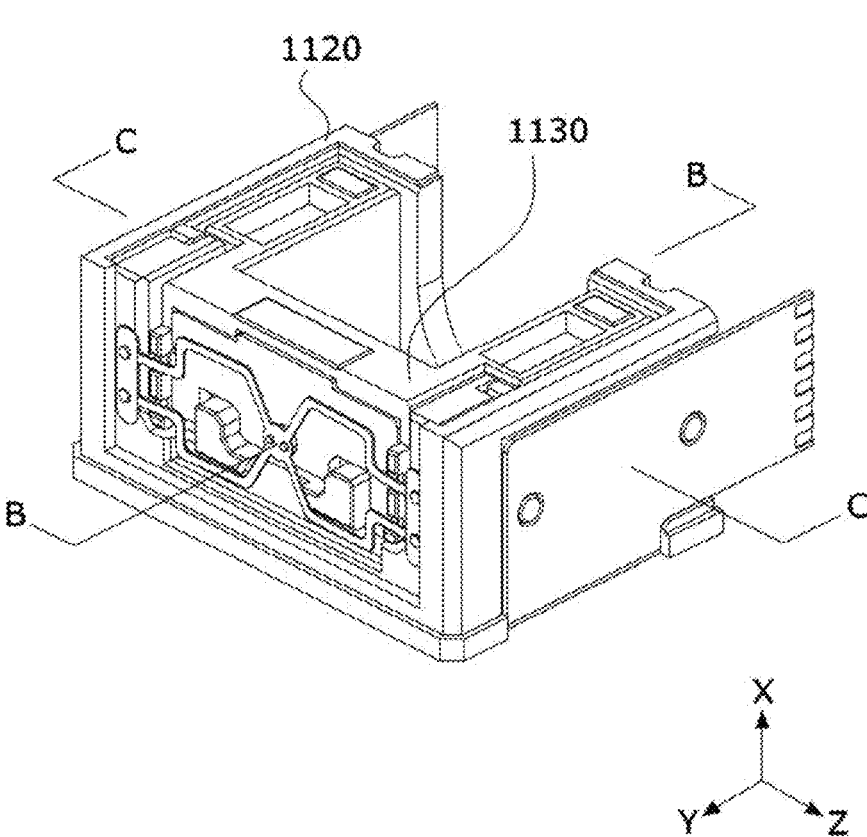

【Fig.5】
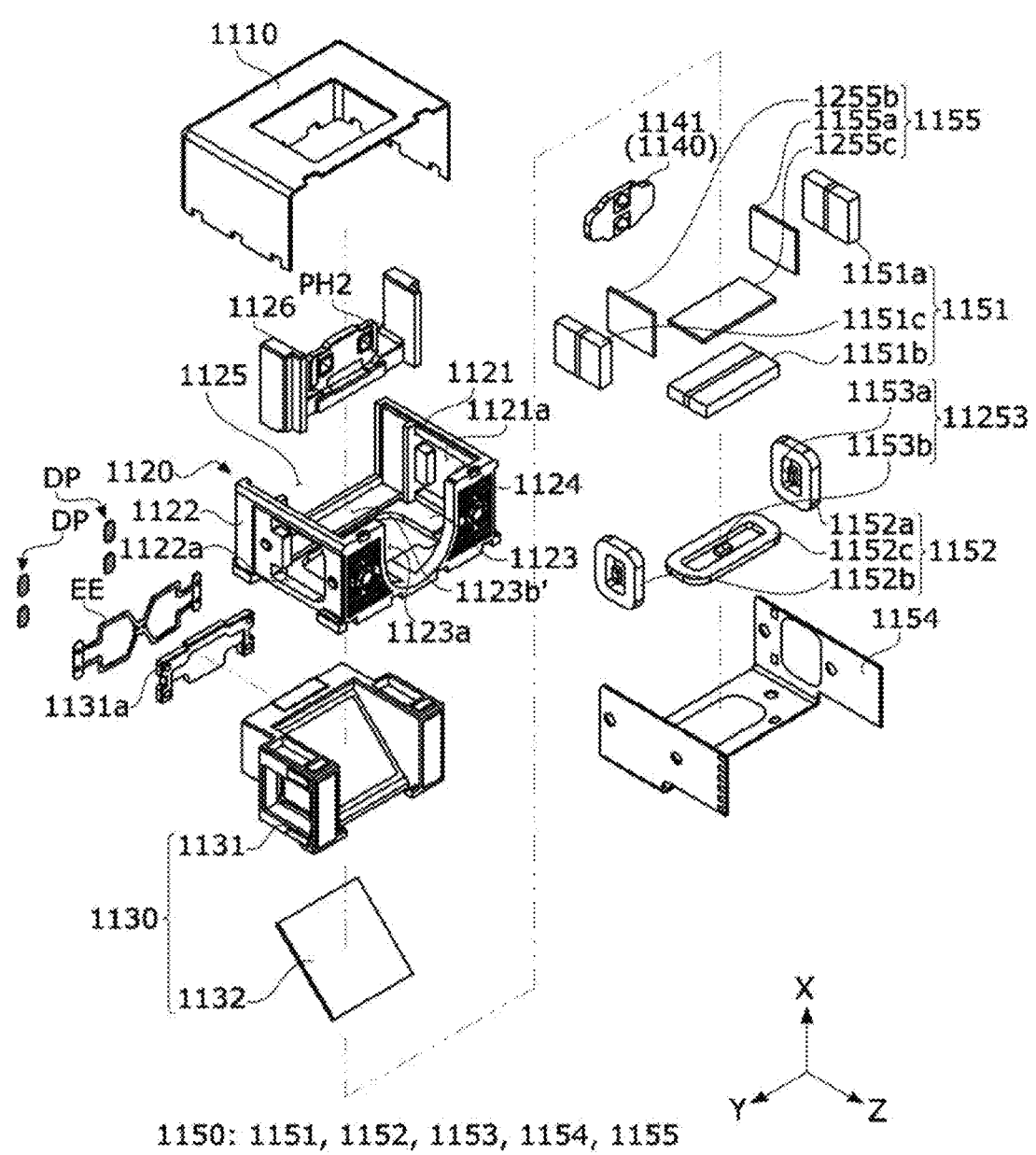
1150: 1151, 1152, 1153, 1154, 1155

【Fig.6】
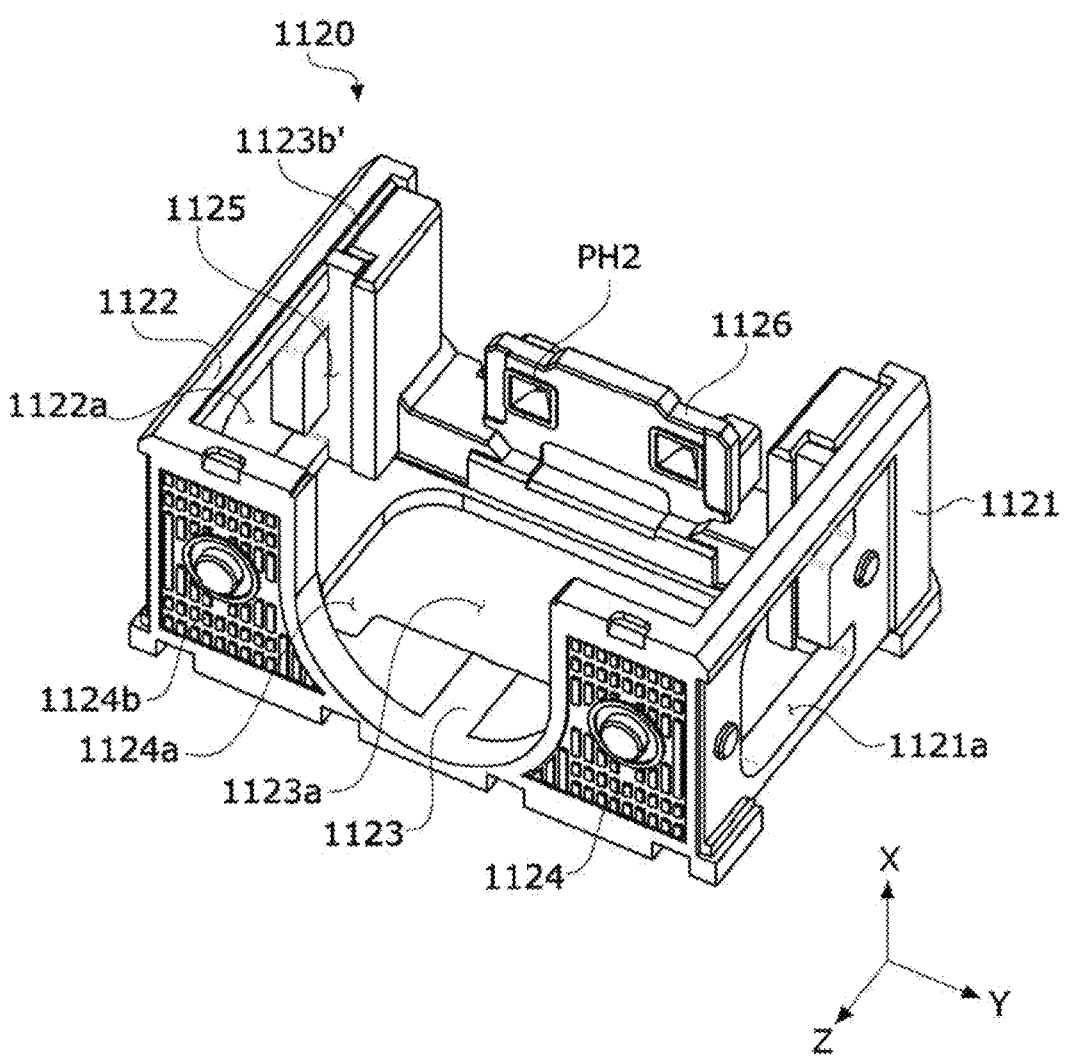

【Fig.7】
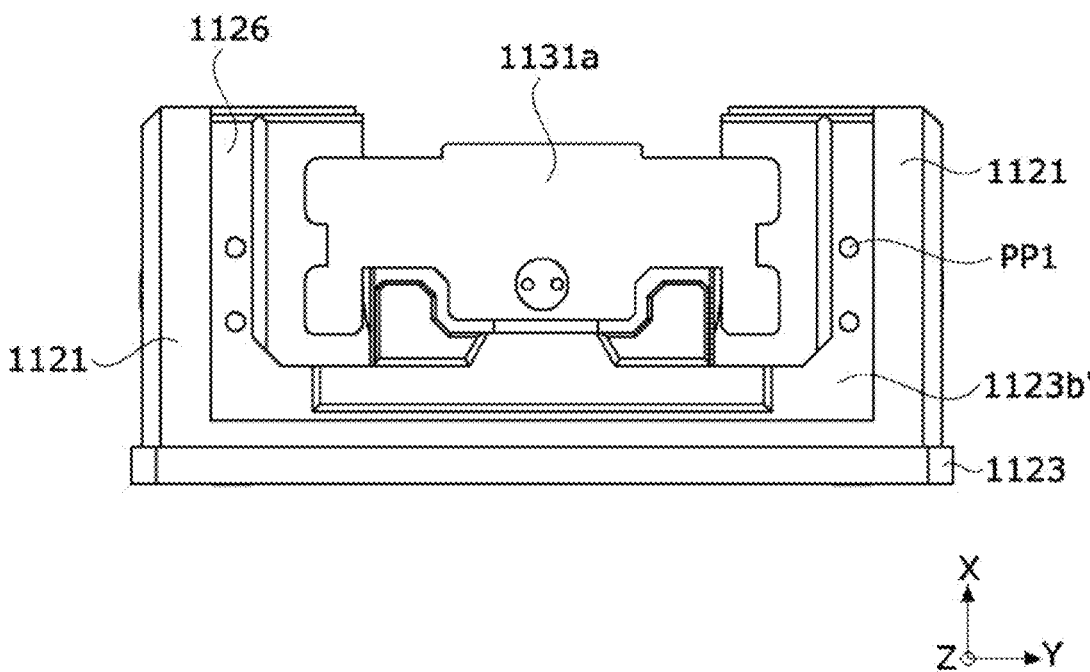
【Fig.8】
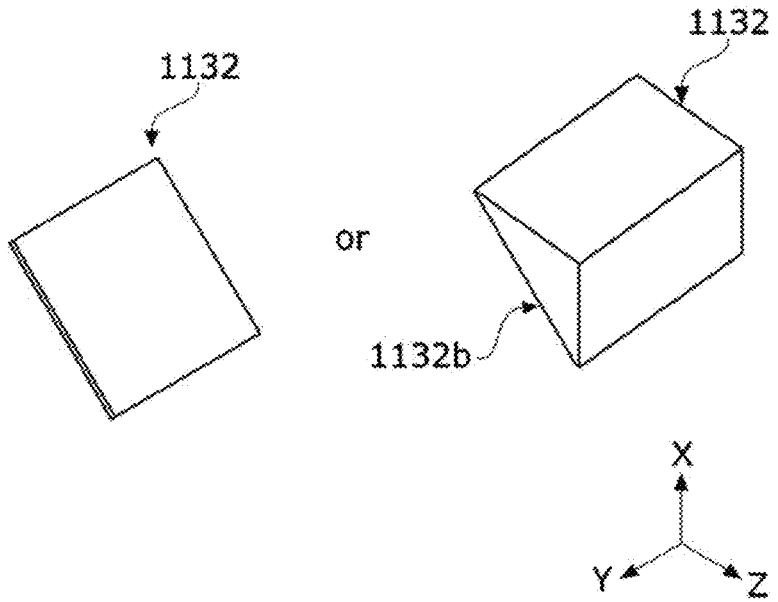

【Fig.9】
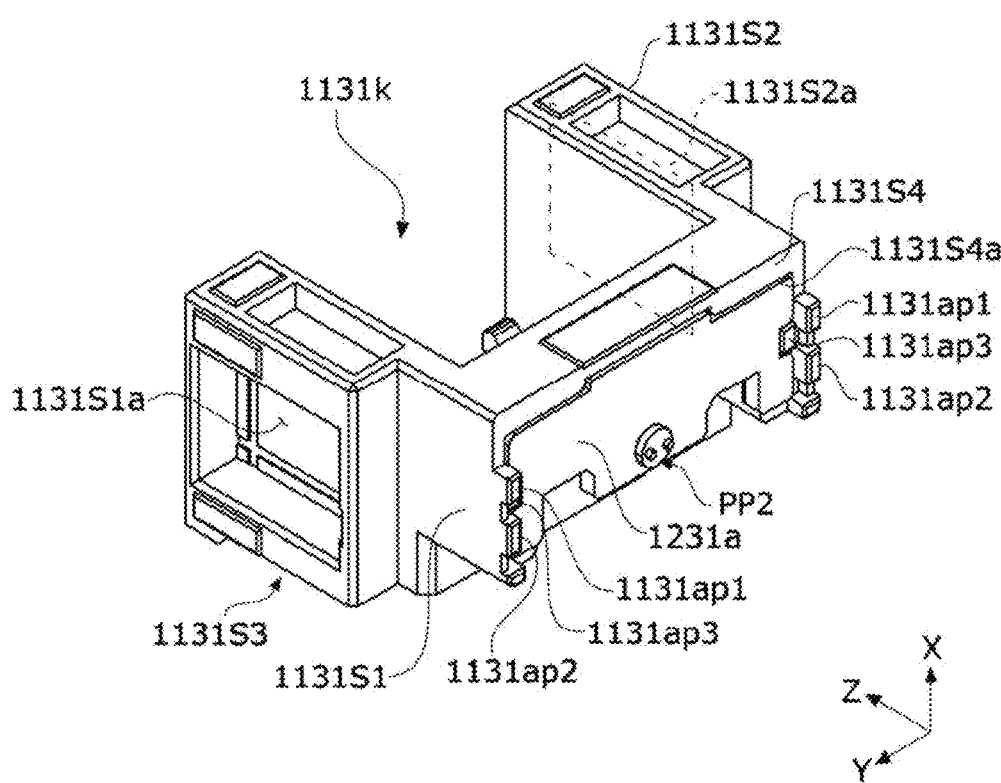
【Fig.10】
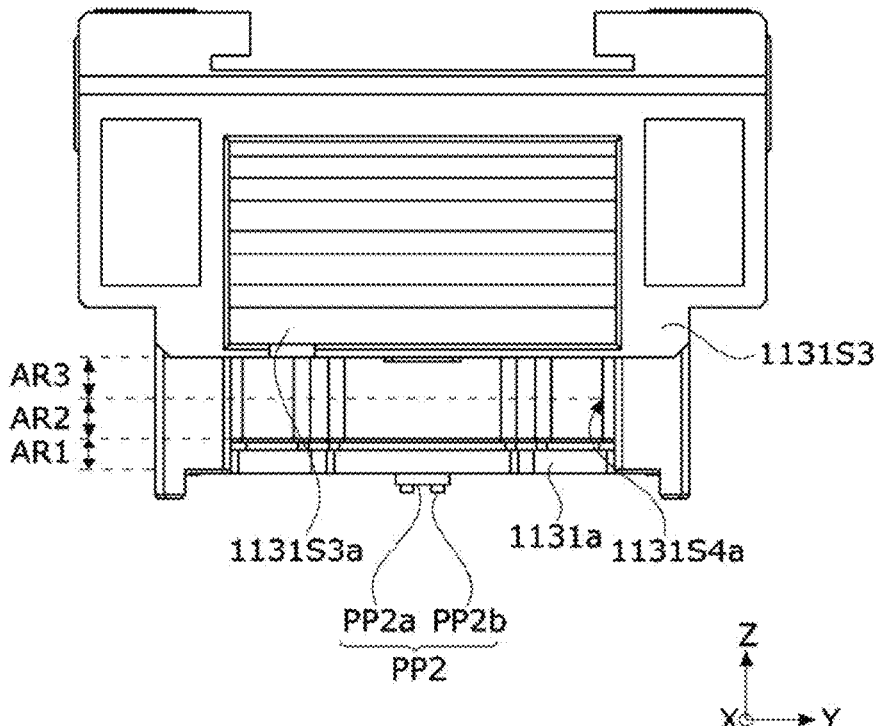

【Fig.11】
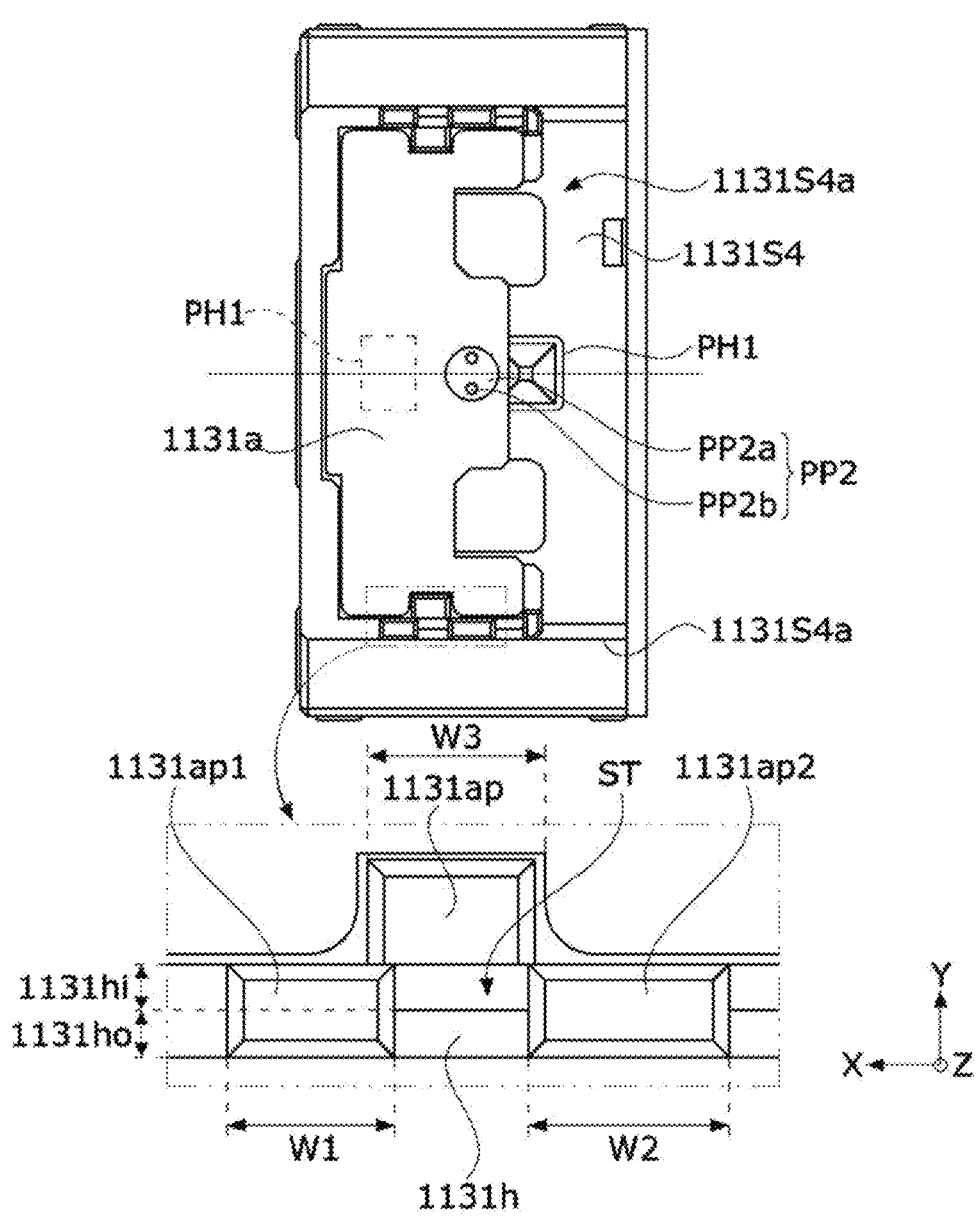

【Fig.12】
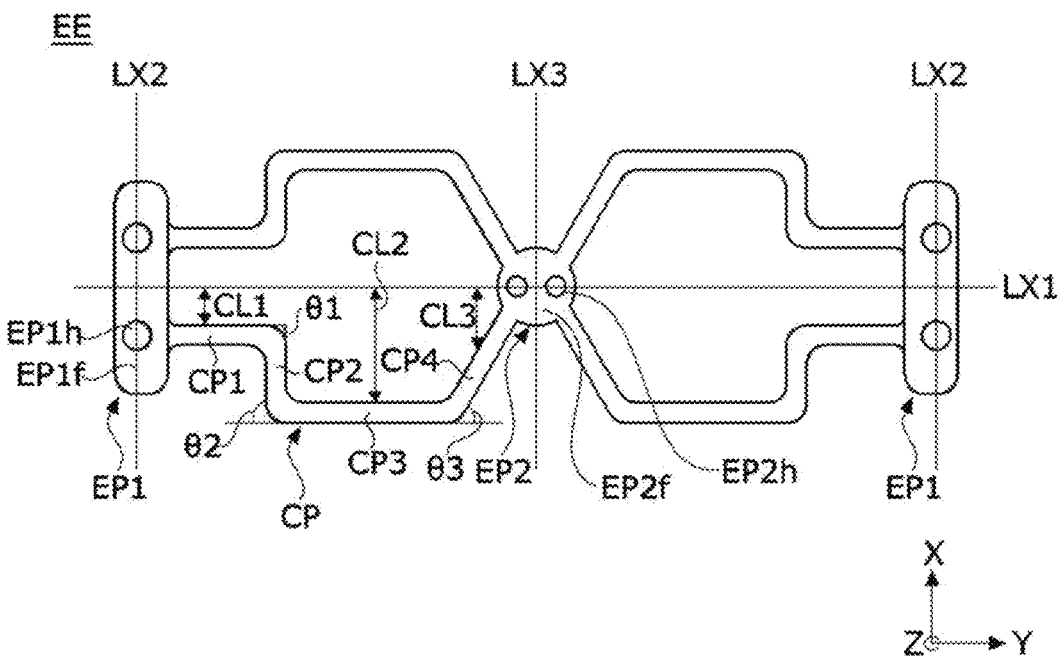

【Fig.13】
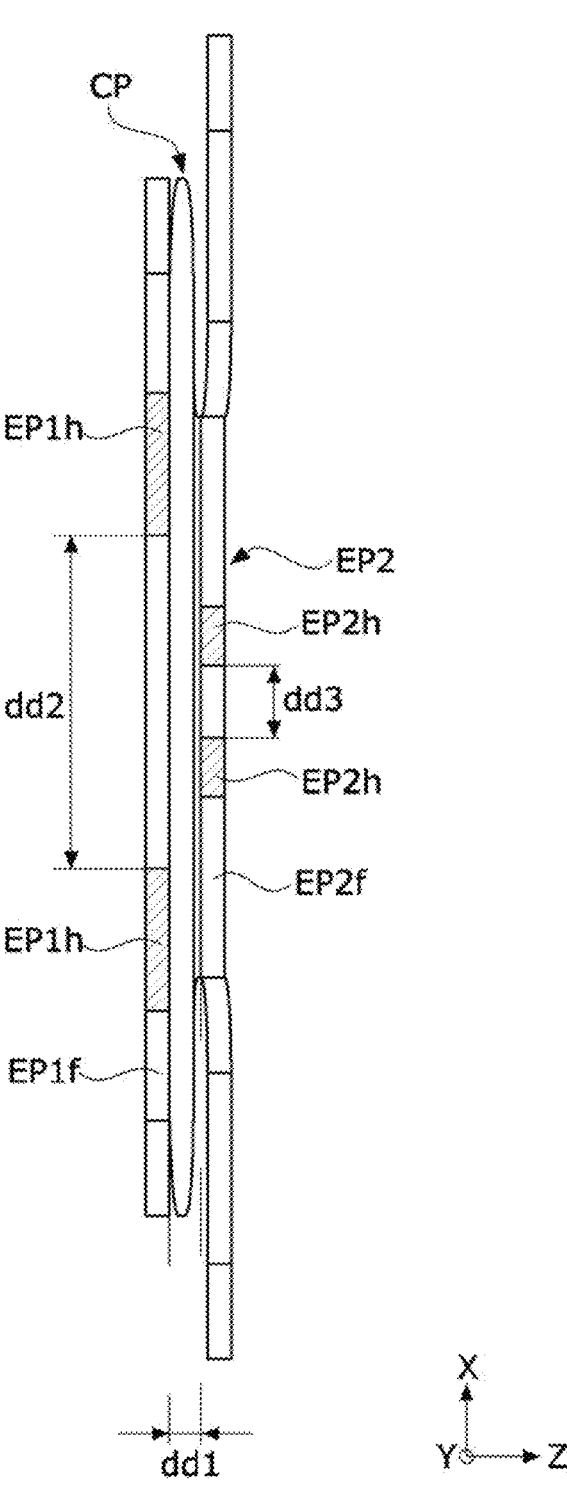

【Fig.14】
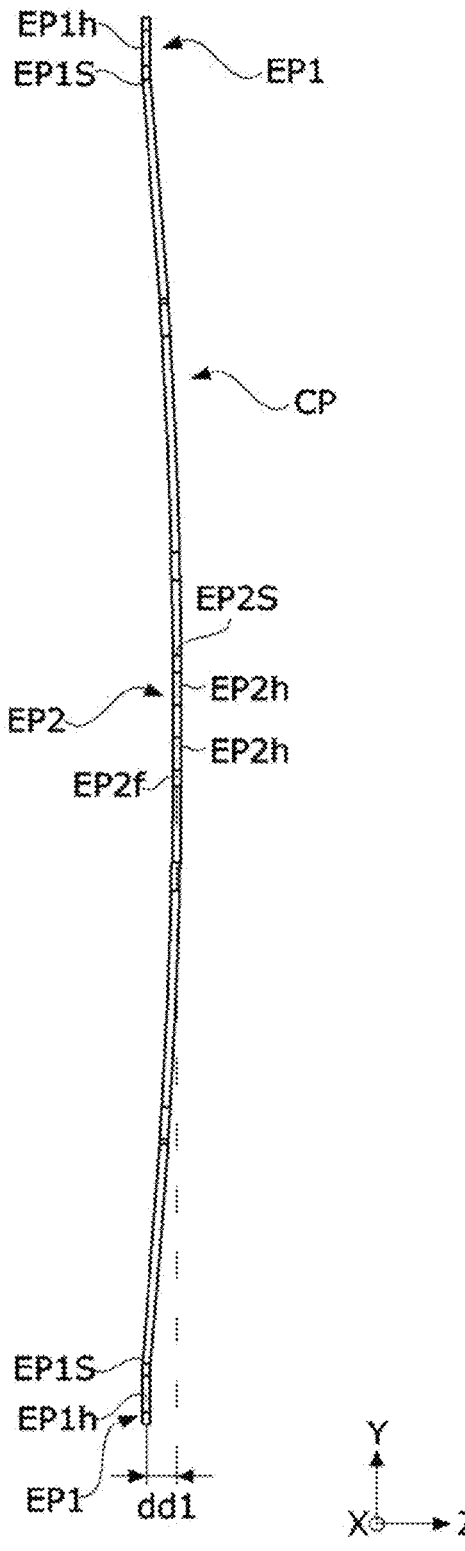

【Fig.15】
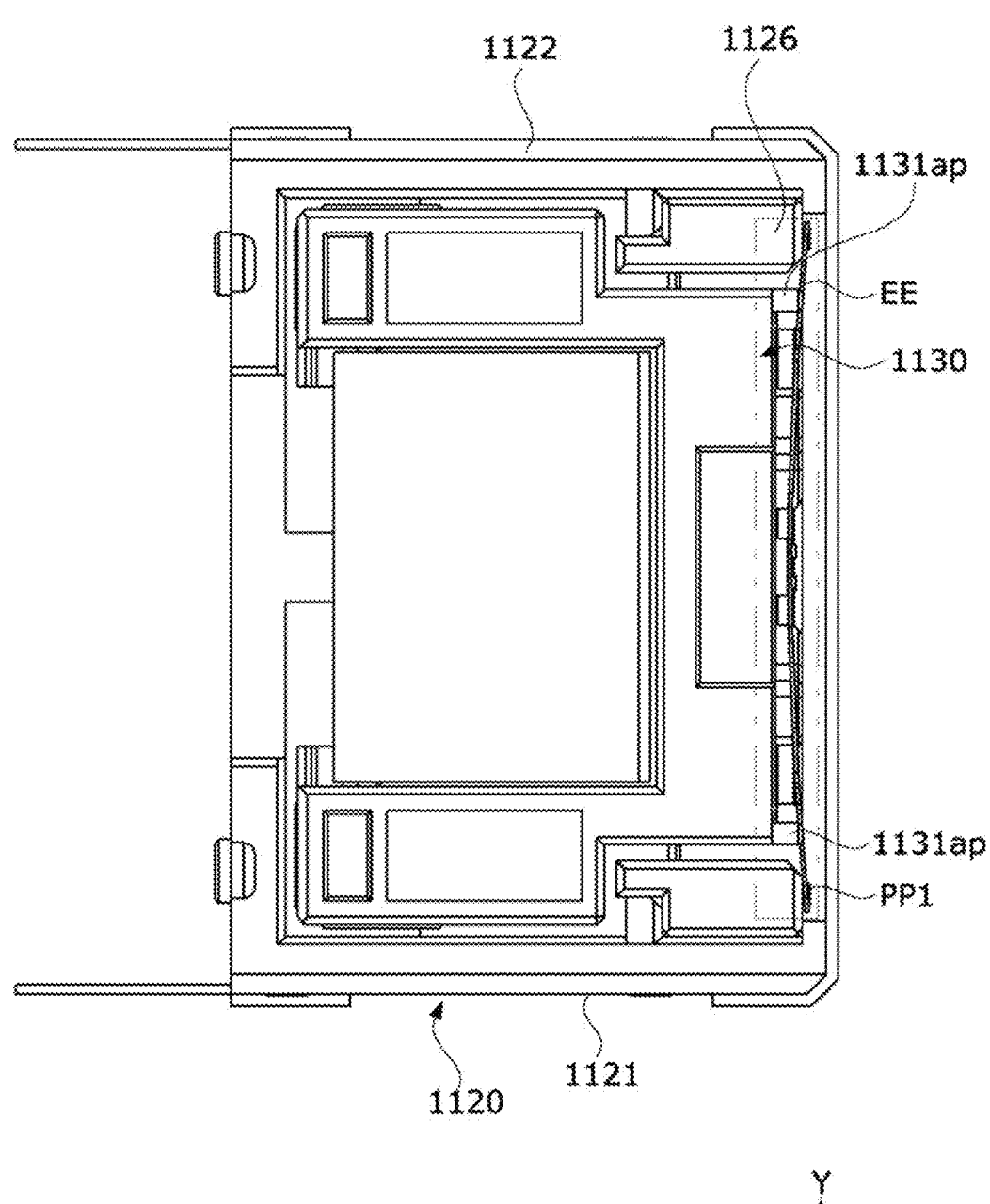

【Fig.16】
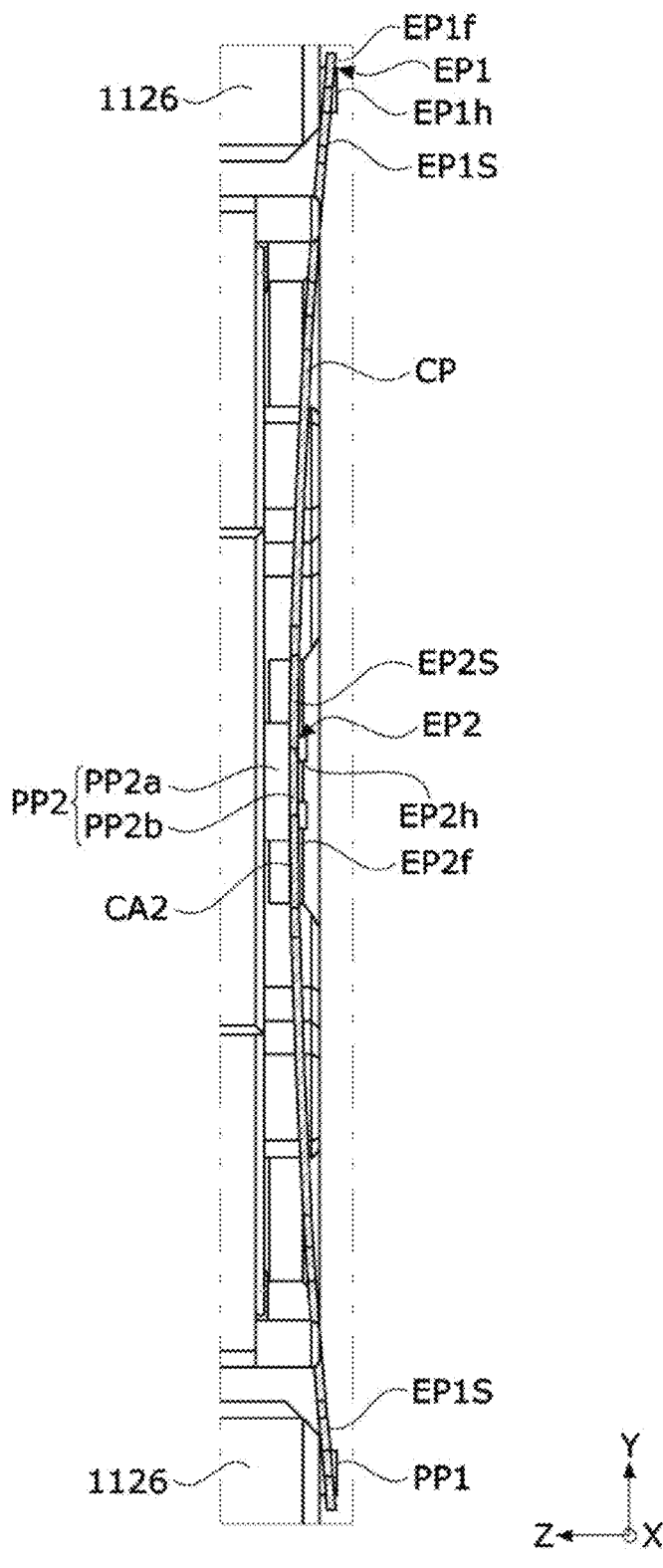

【Fig.17a】
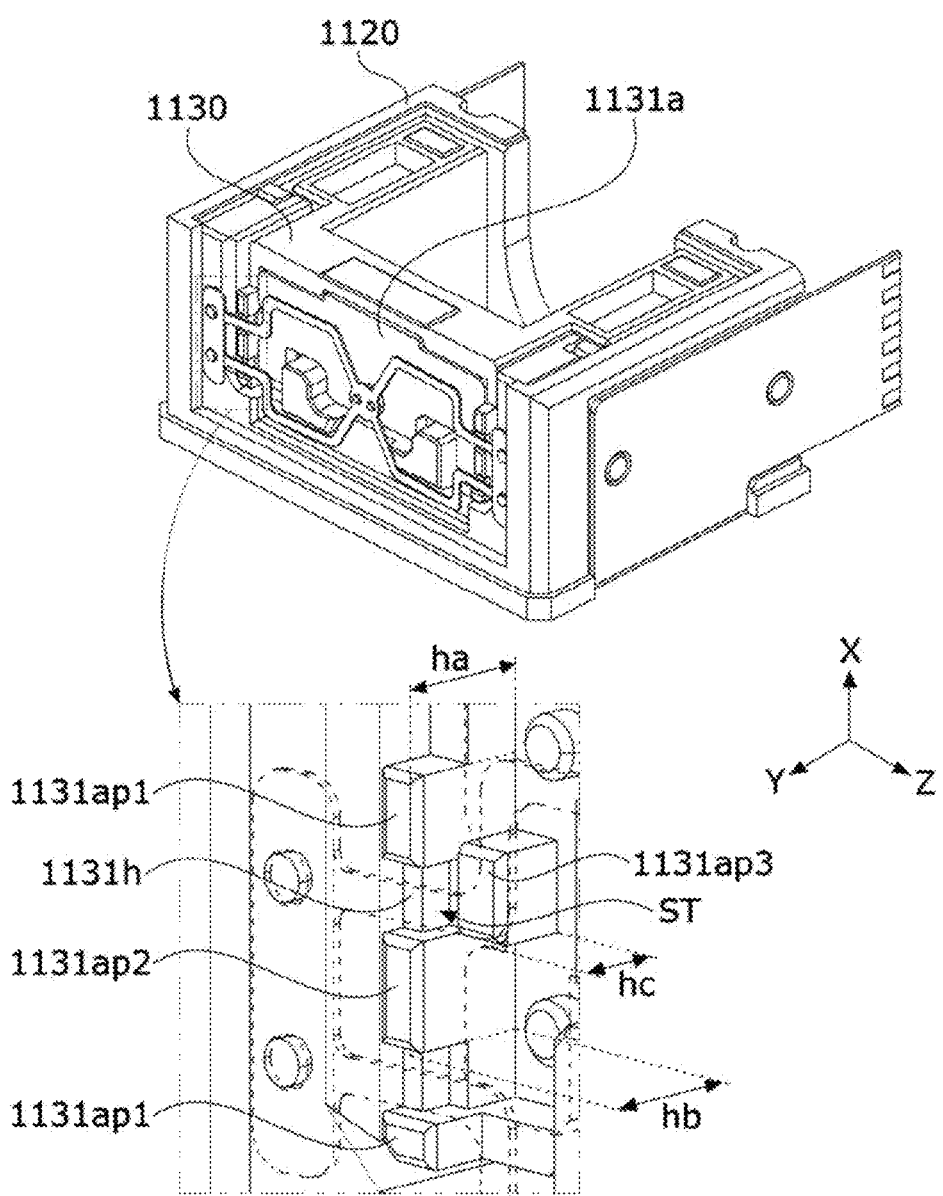

【Fig.17b】
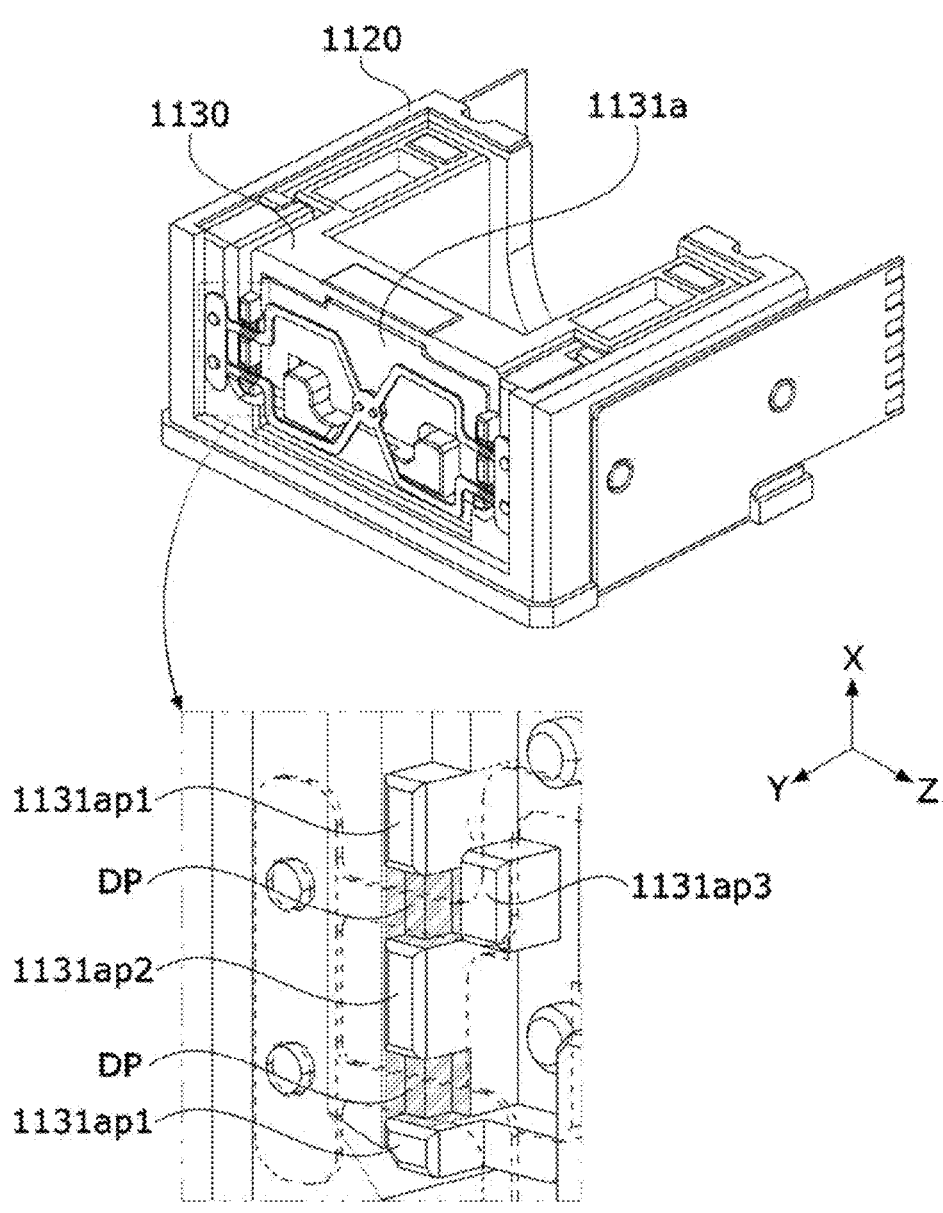

【Fig.17c】
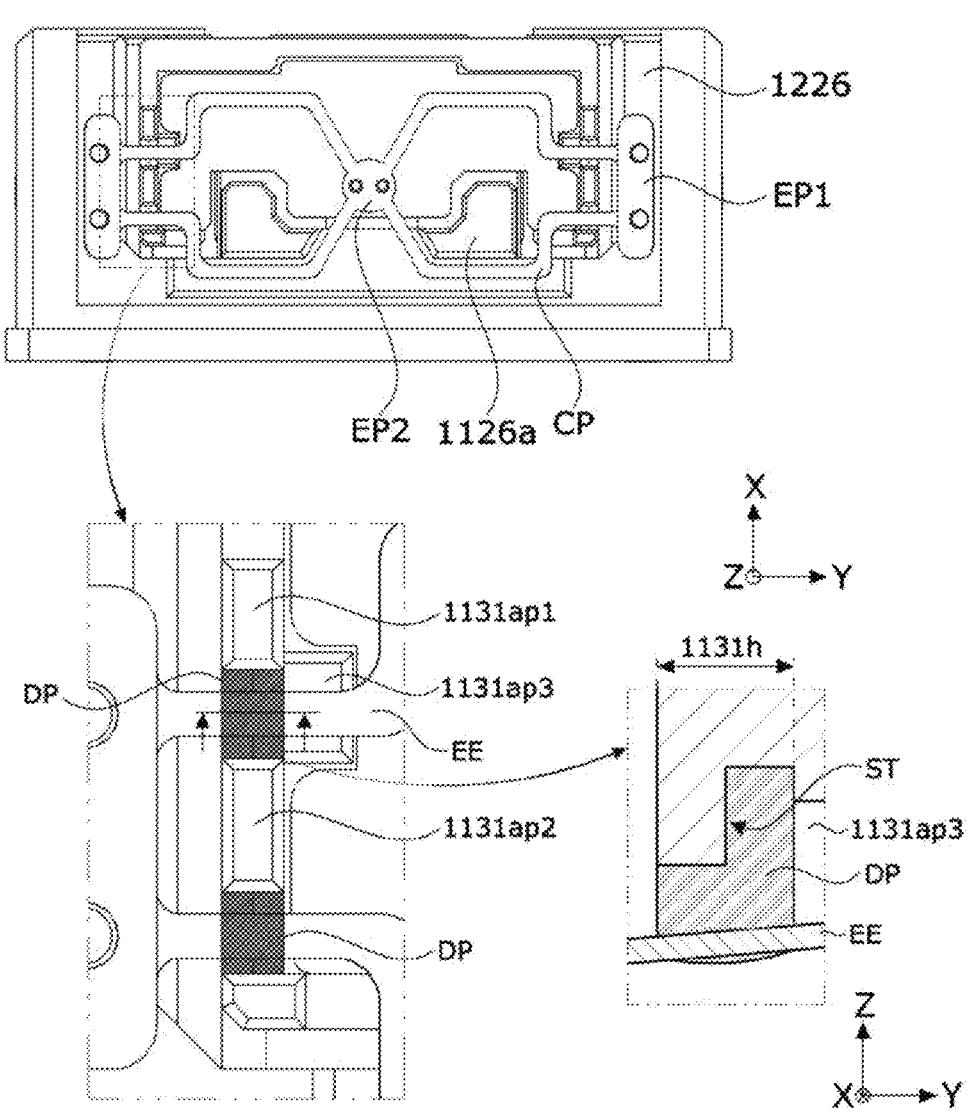

【Fig.17d】
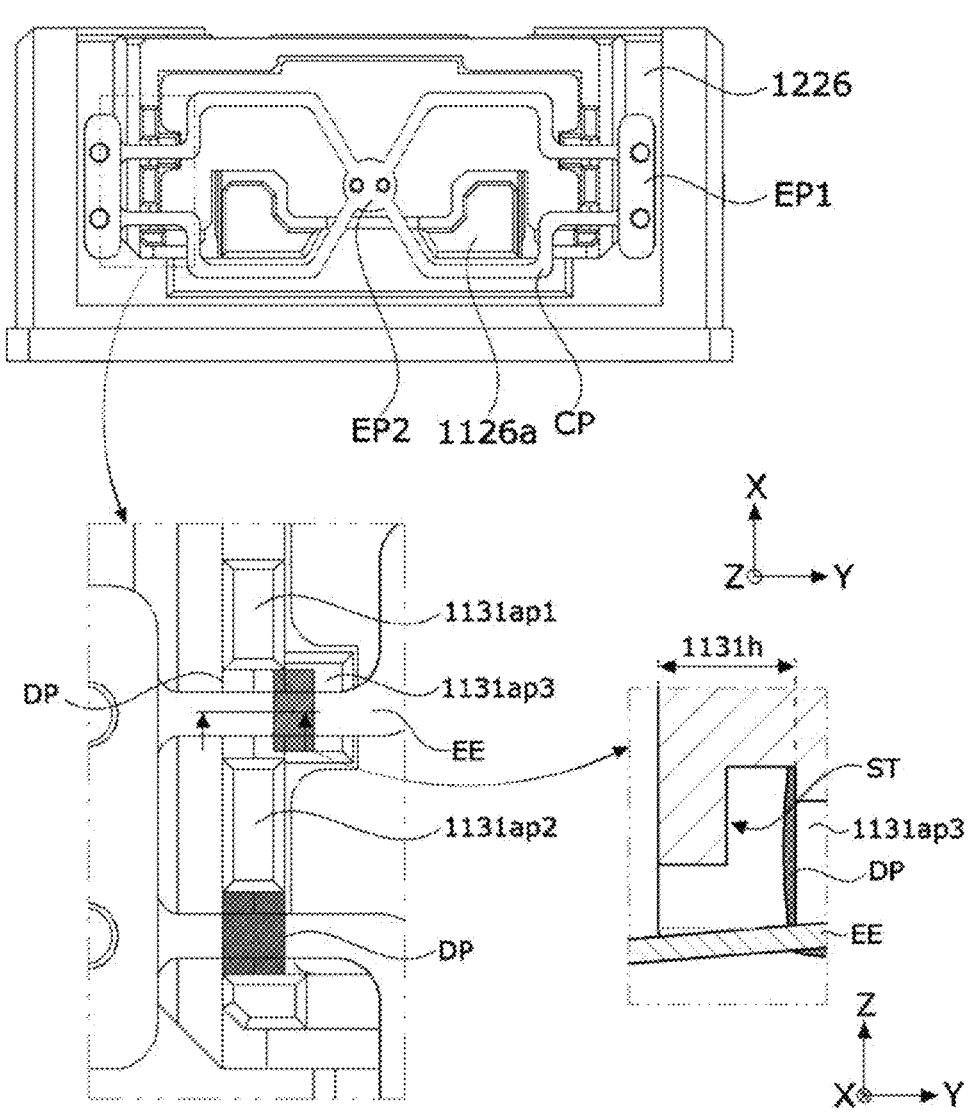

【Fig.17e】
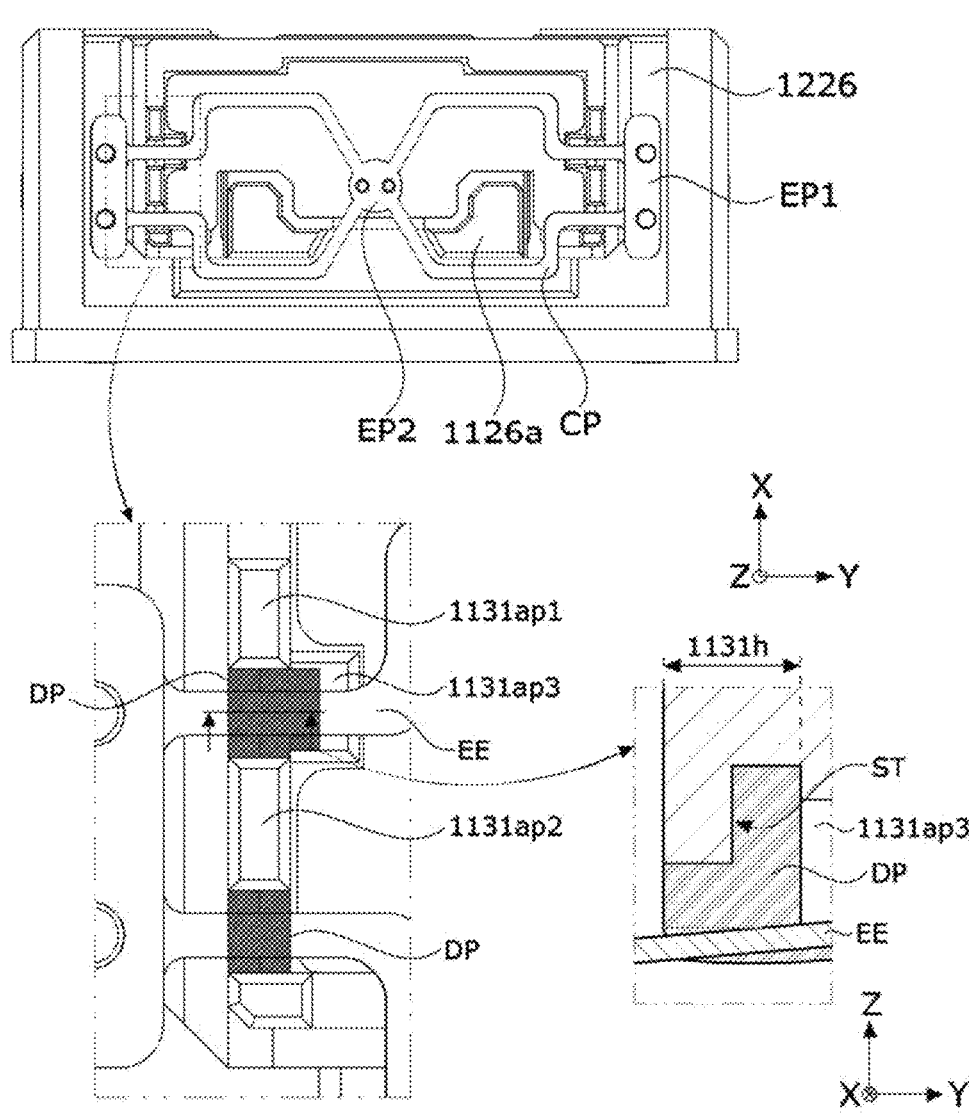

【Fig.18】
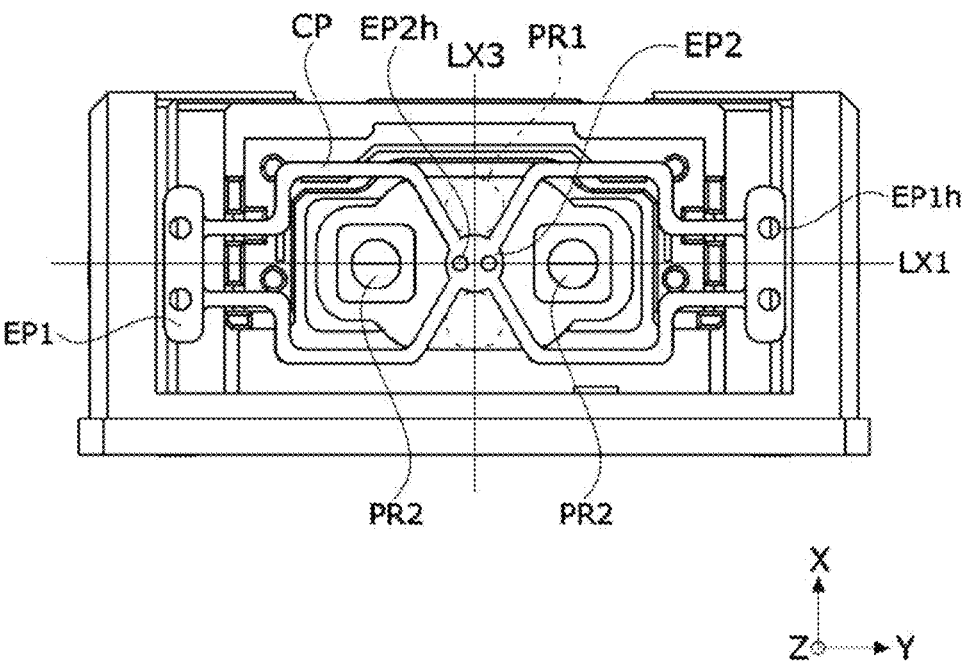
【Fig.19】
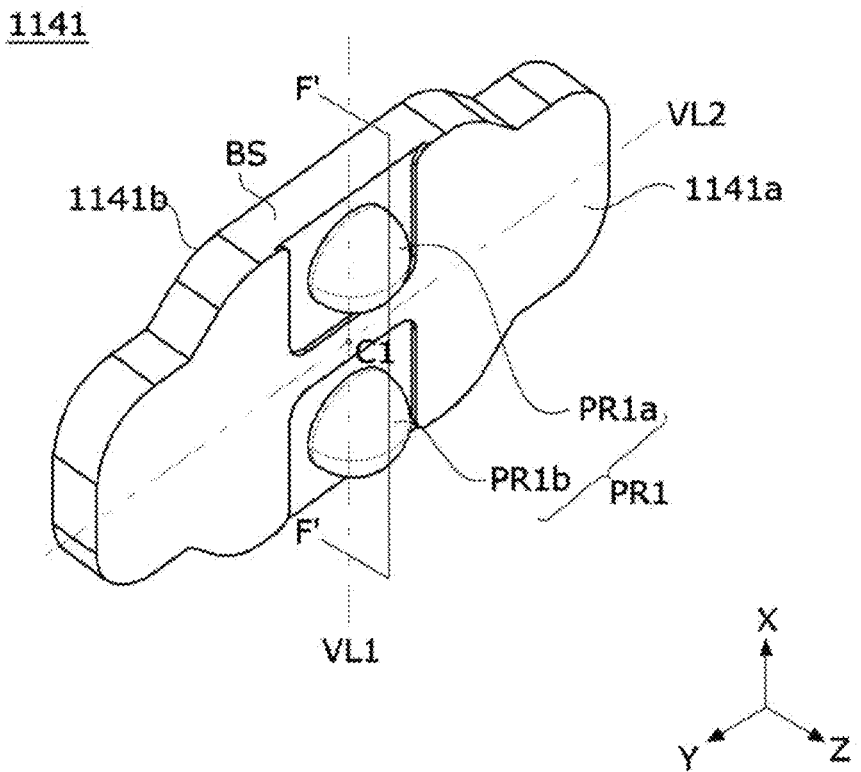

【Fig.20】
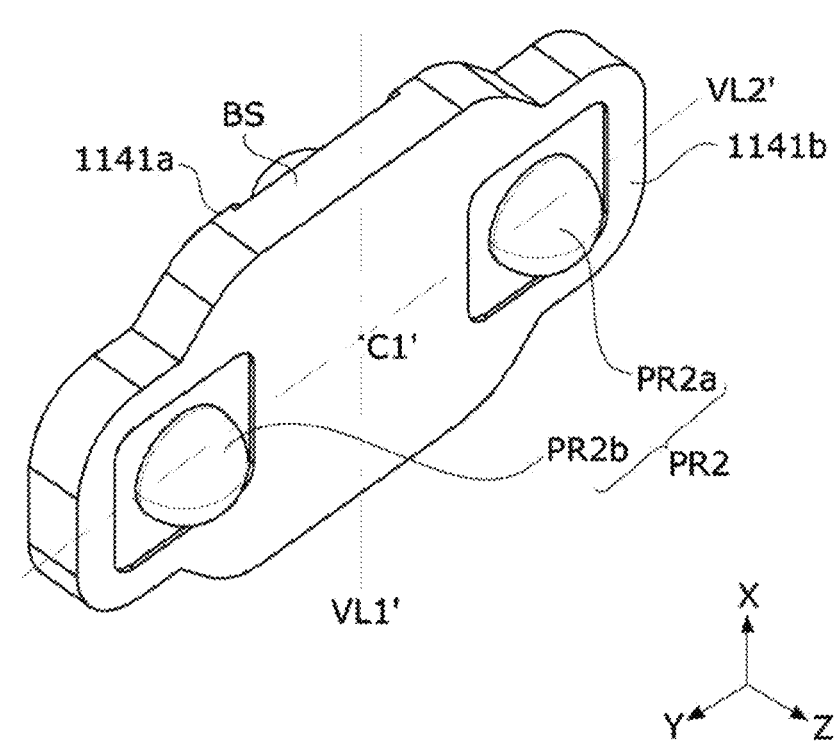

【Fig.21】
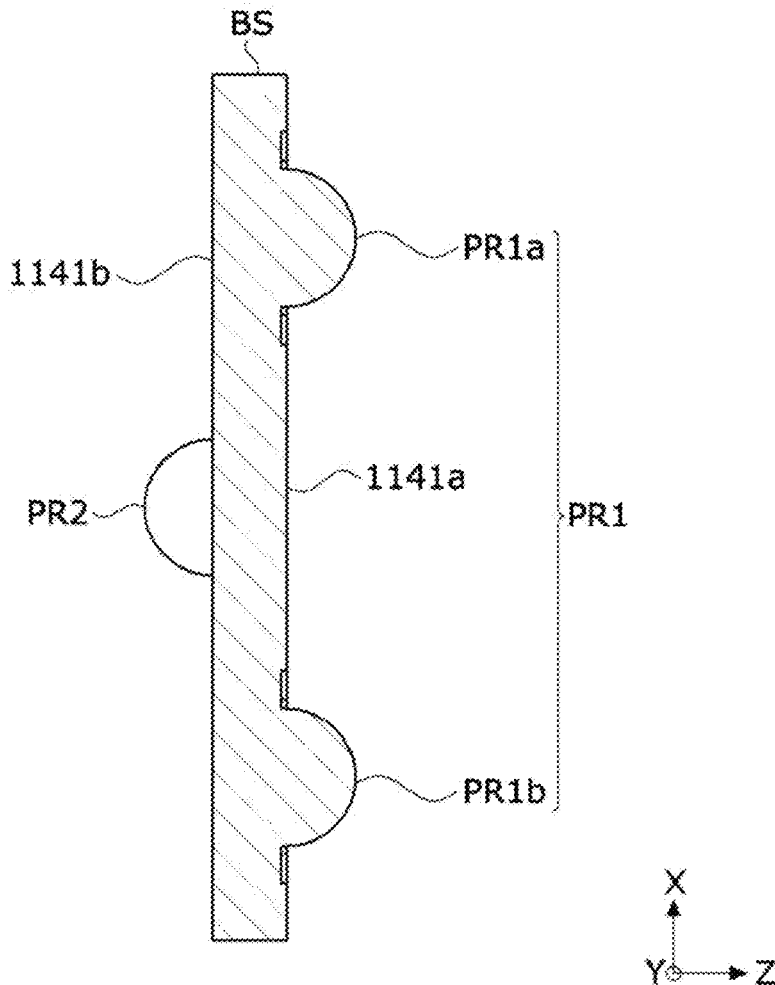

【Fig.22】
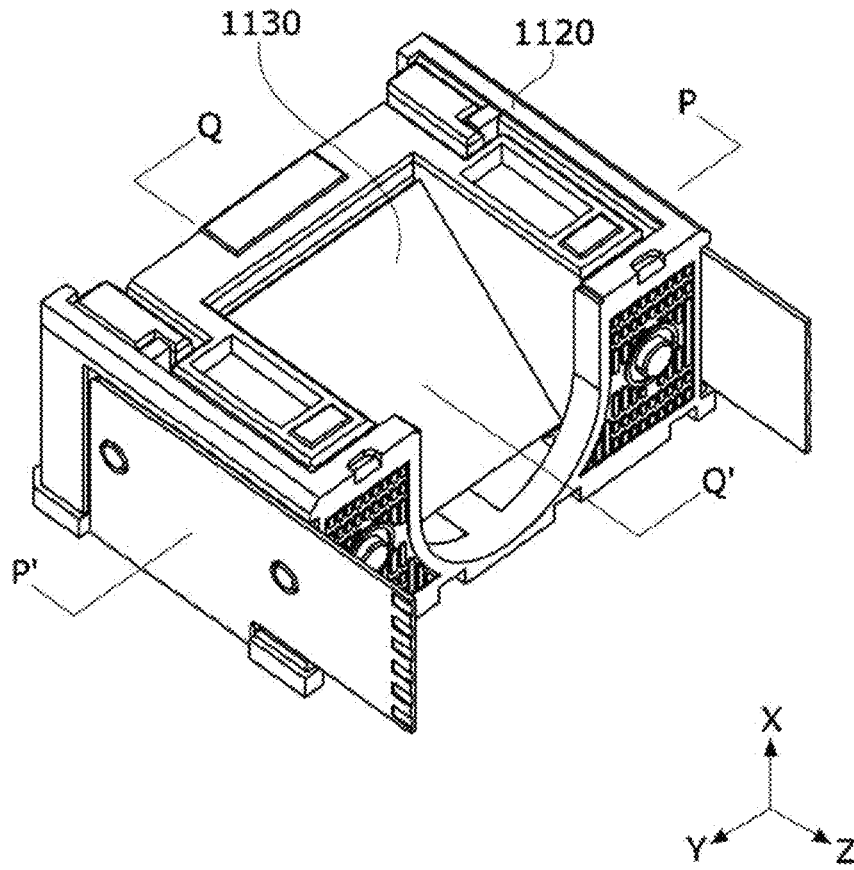

【Fig.23】
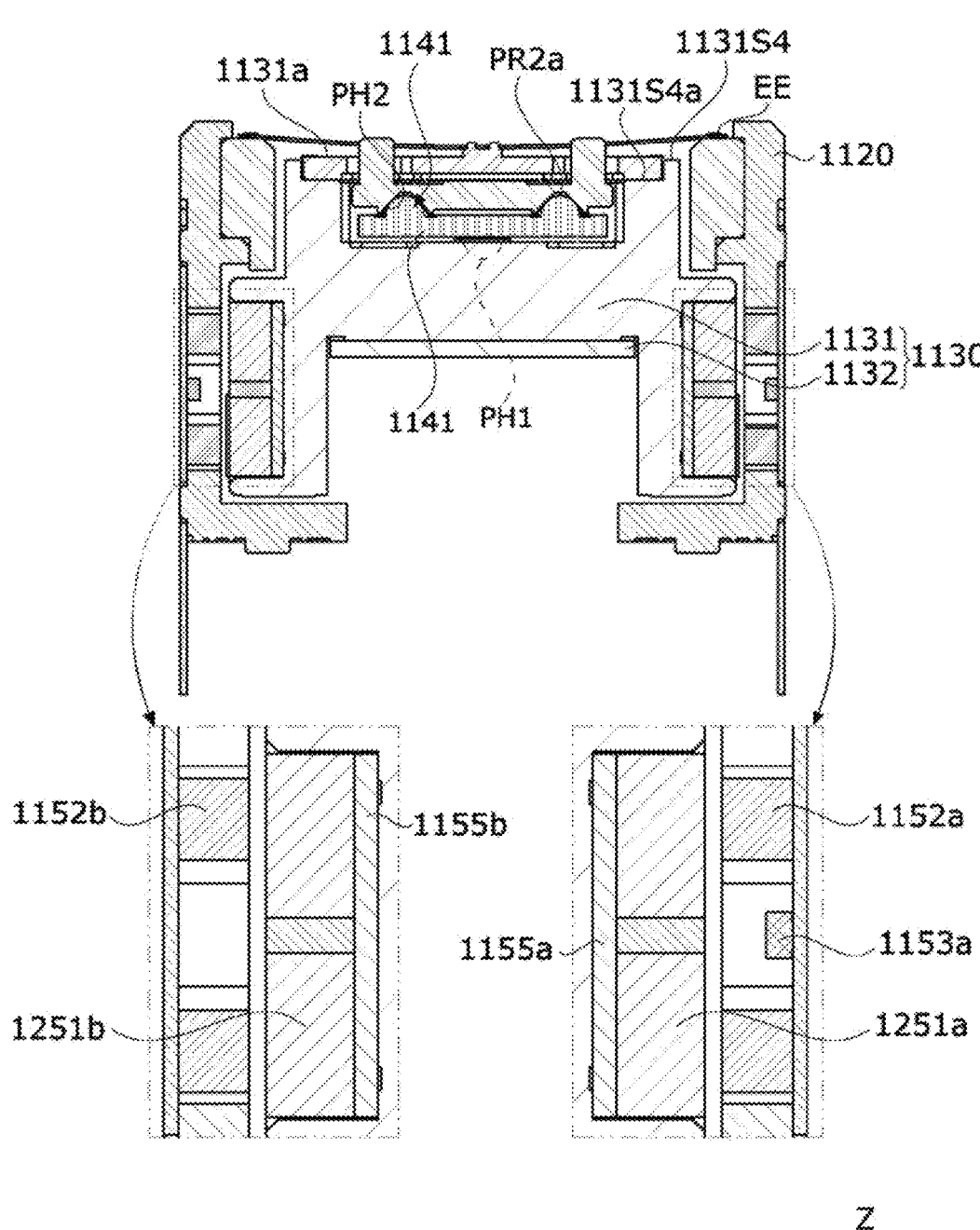

【Fig.24】
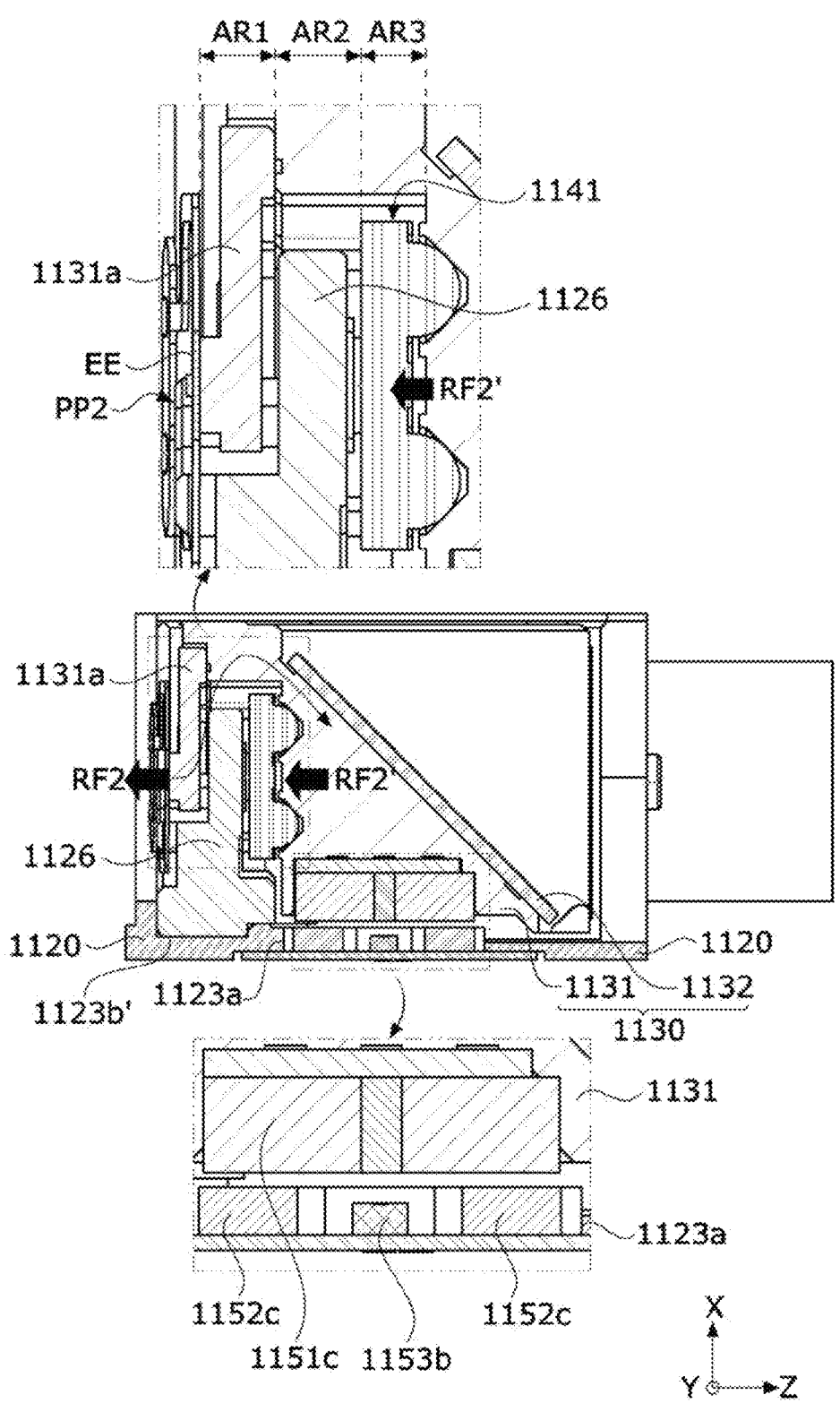

【Fig.25】
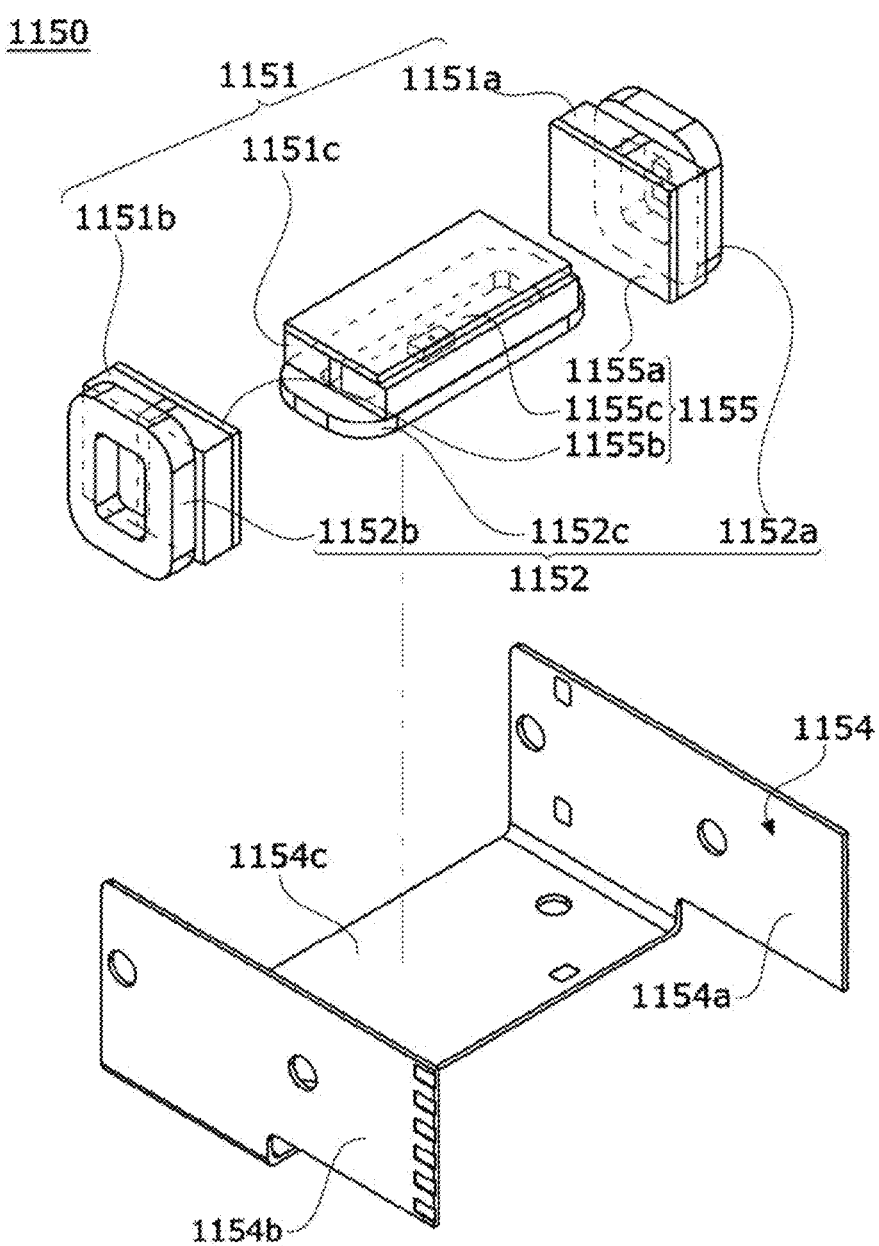

【Fig.26】
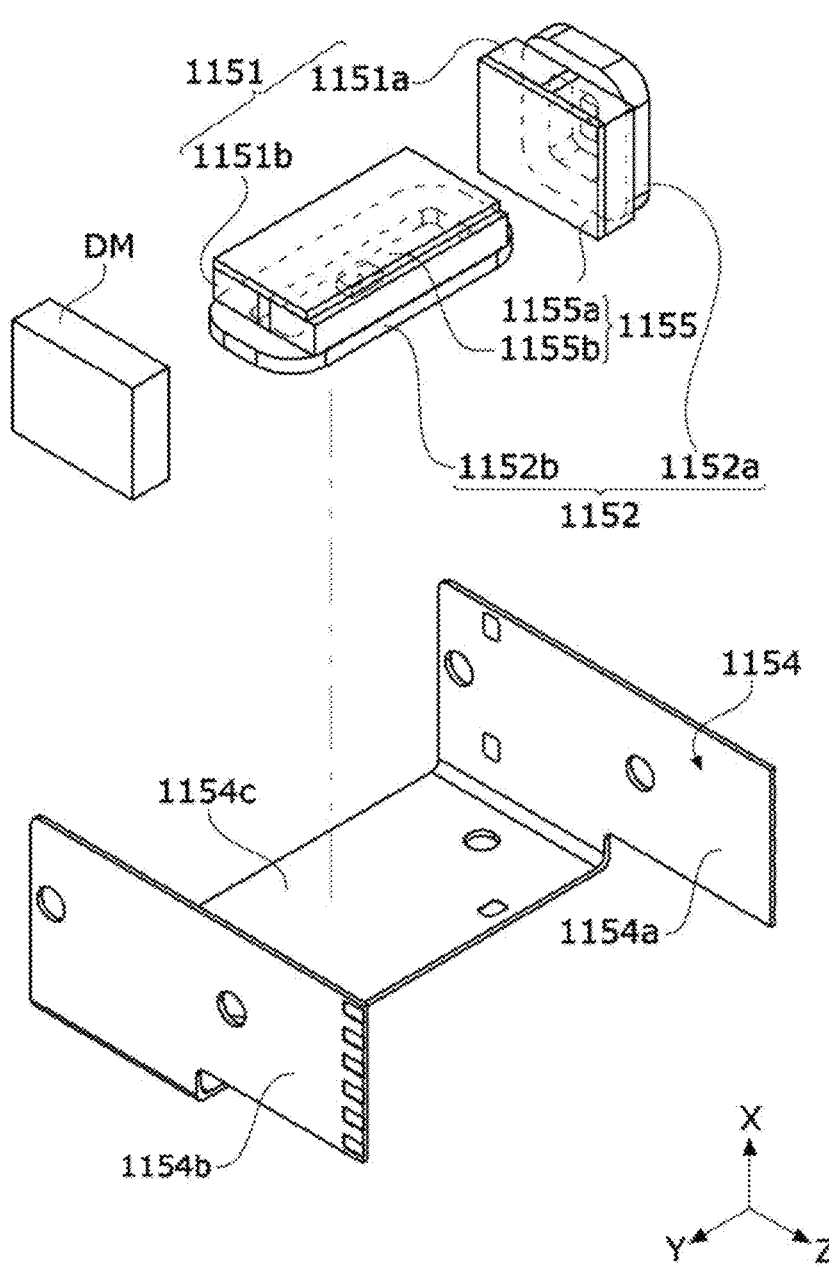

【Fig.27】
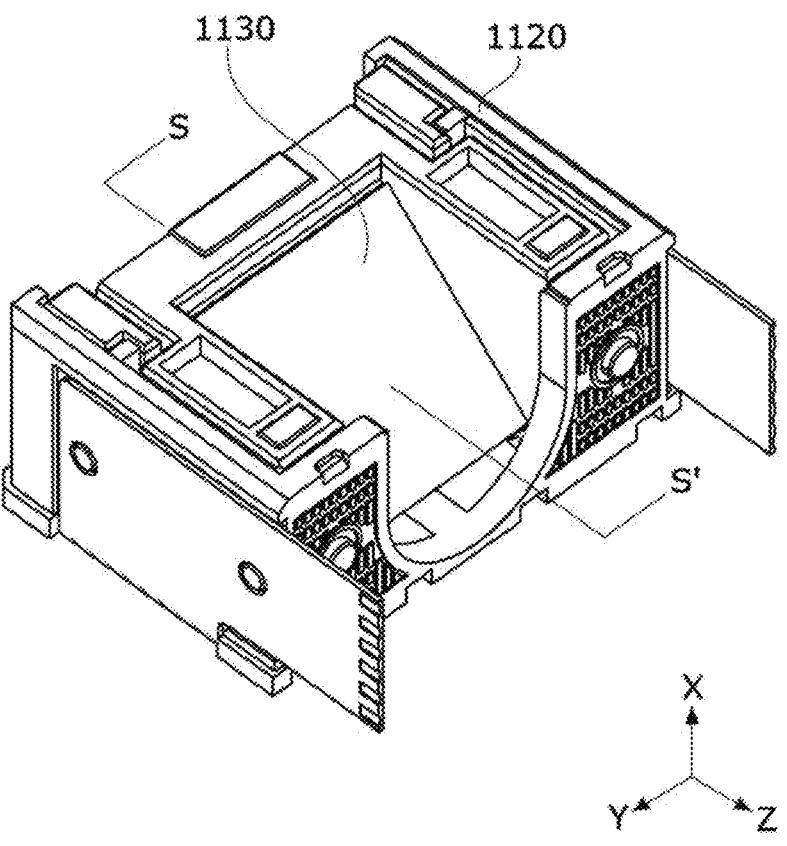
【Fig.28】
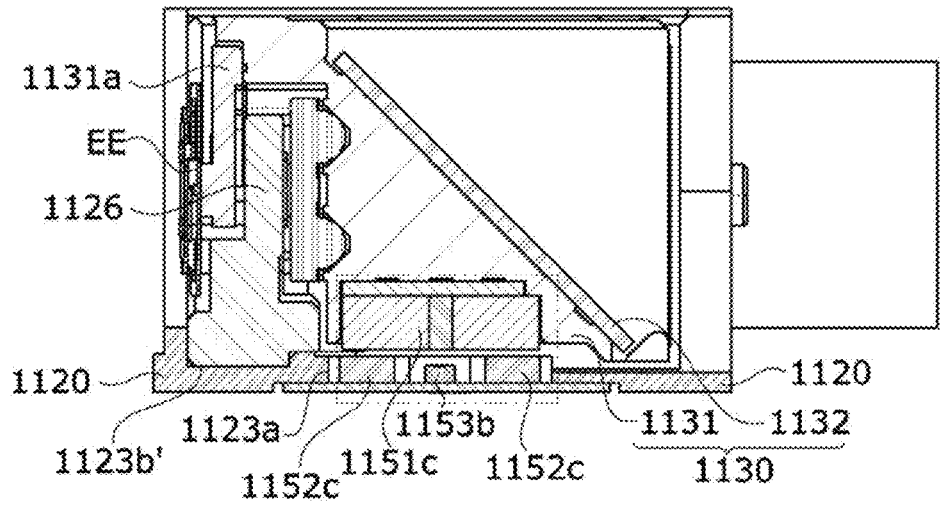

【Fig.29】
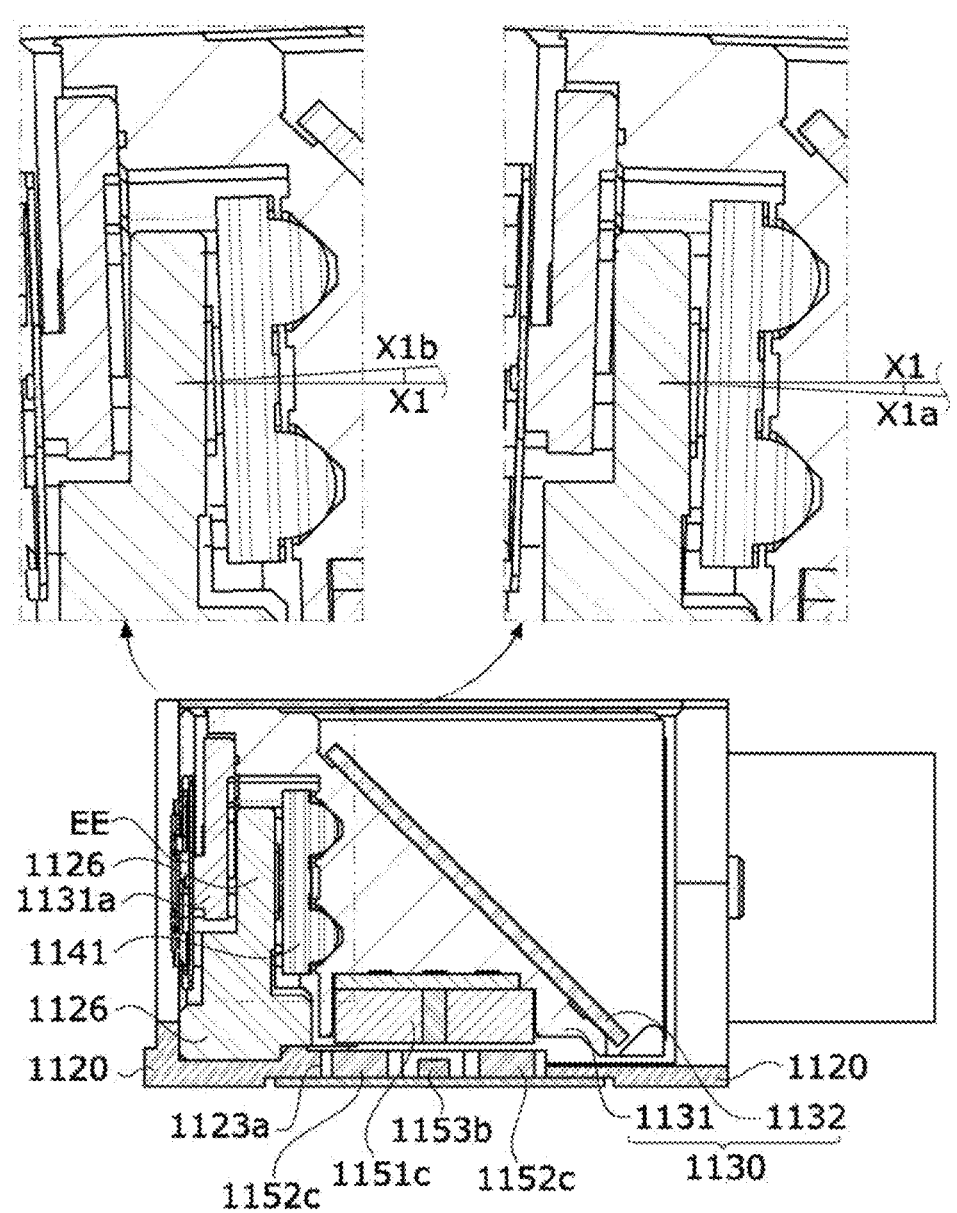

【Fig.30】
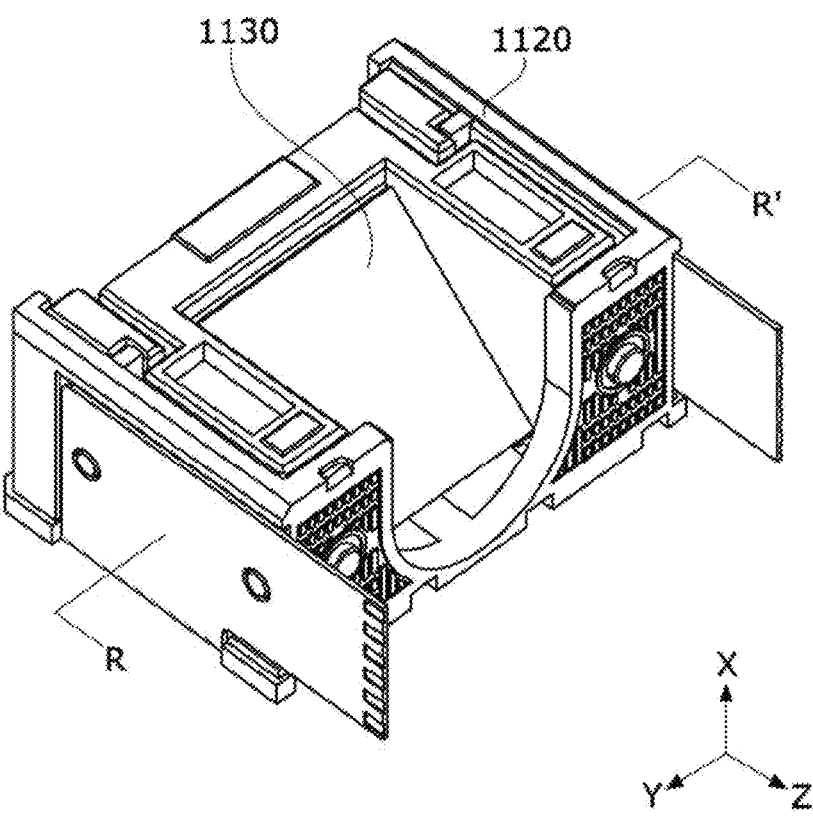

【Fig.31】
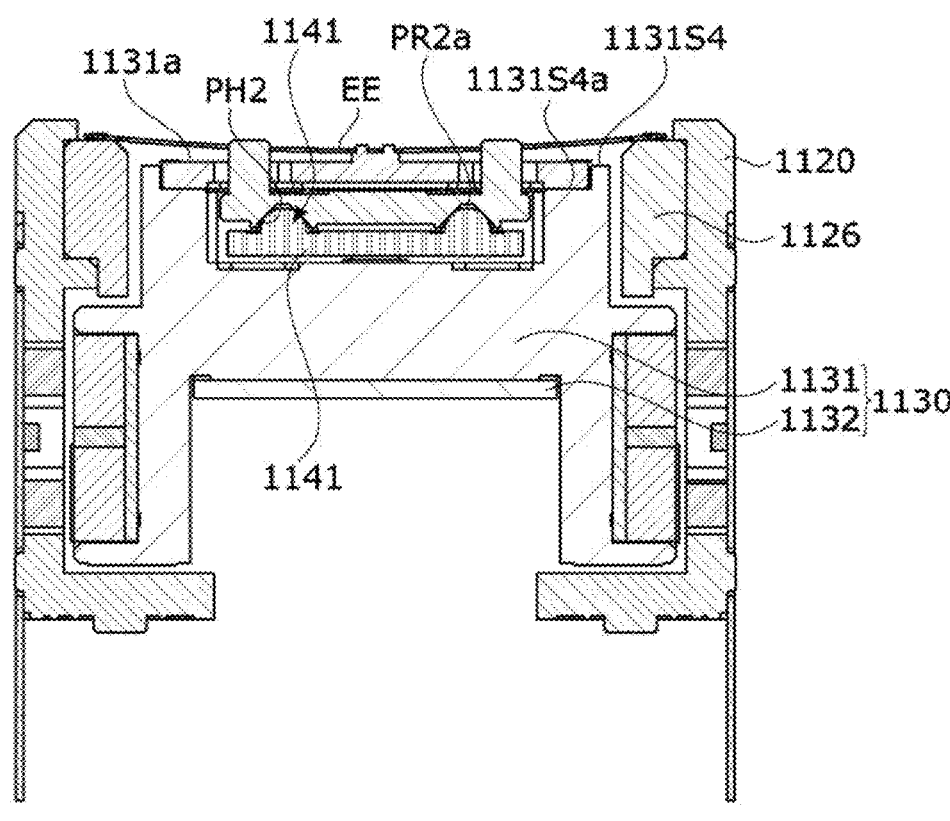

【Fig.32】
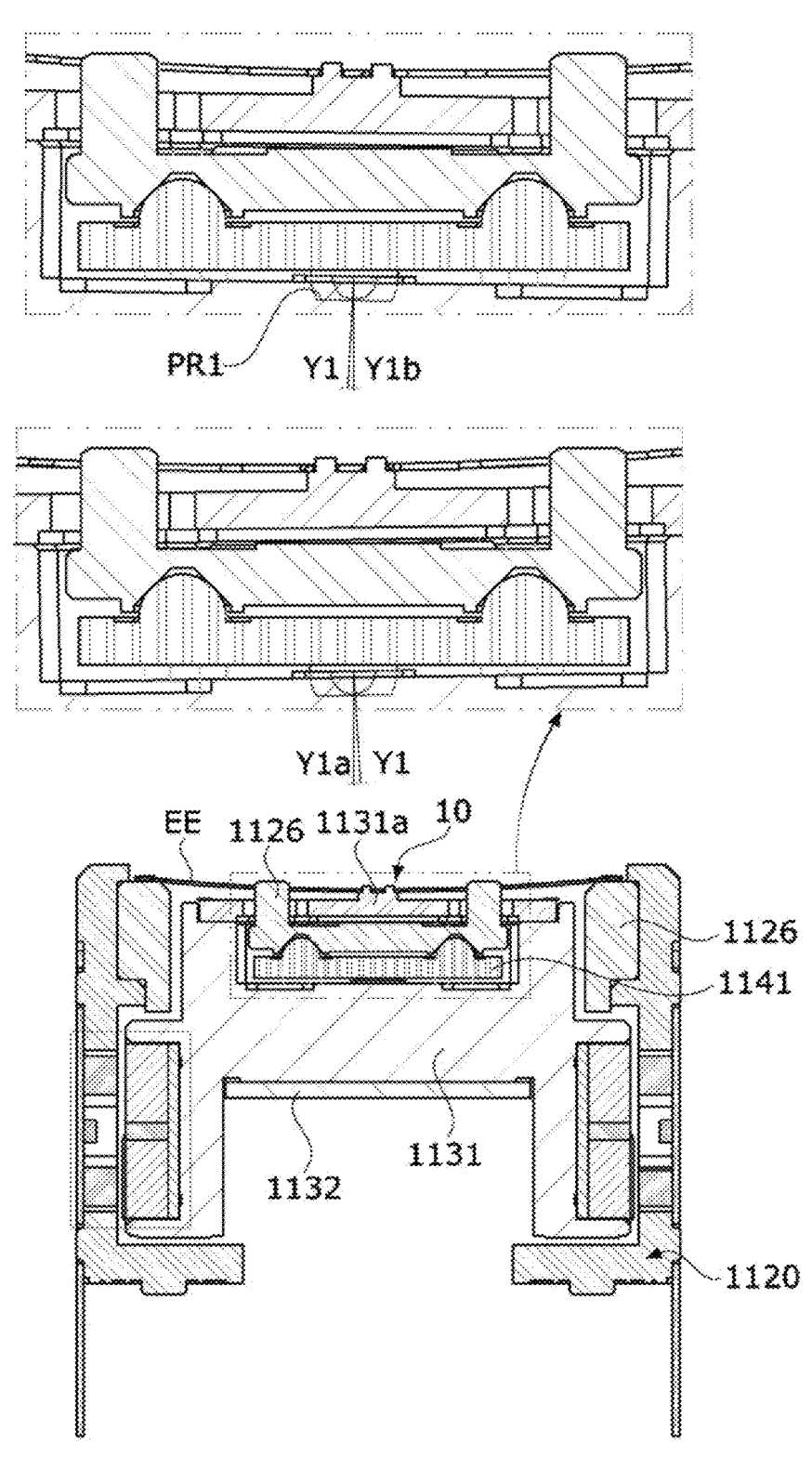

【Fig.33】
1100A
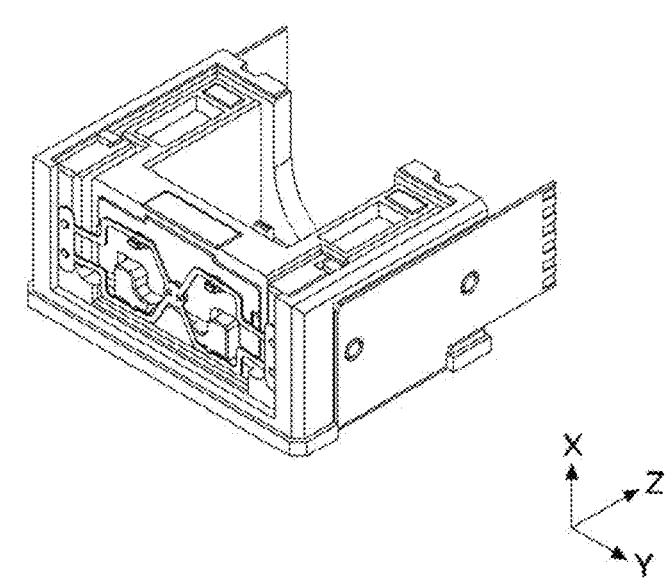
【Fig.34】
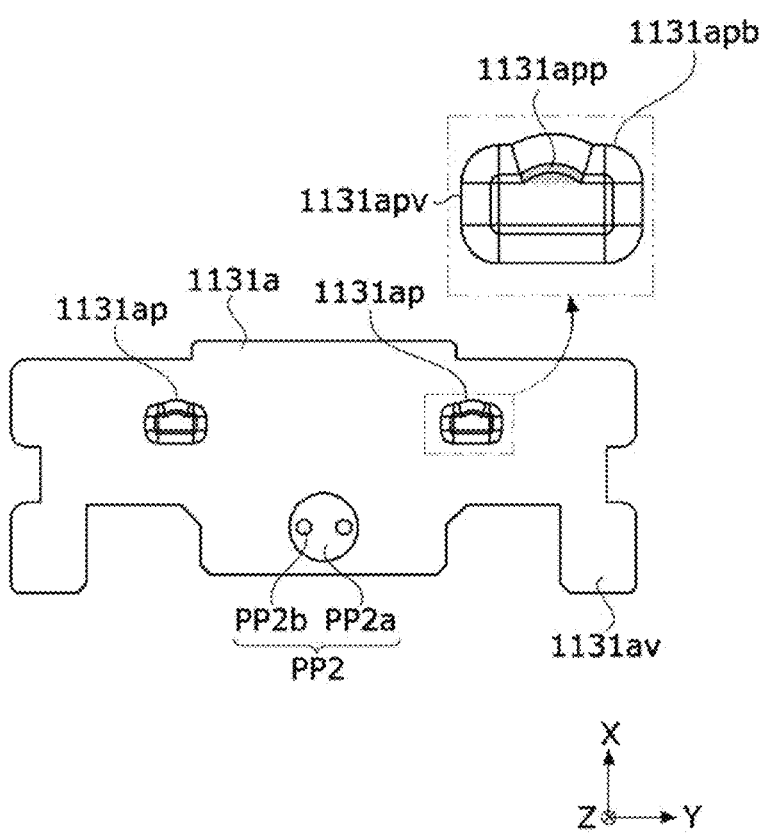

【Fig.35】
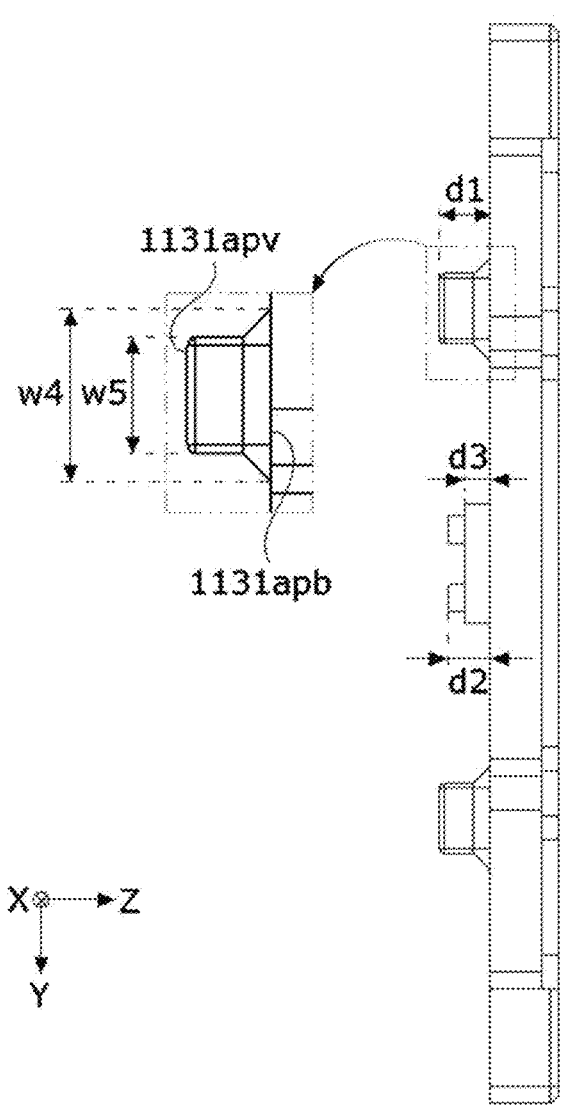

【Fig.36】
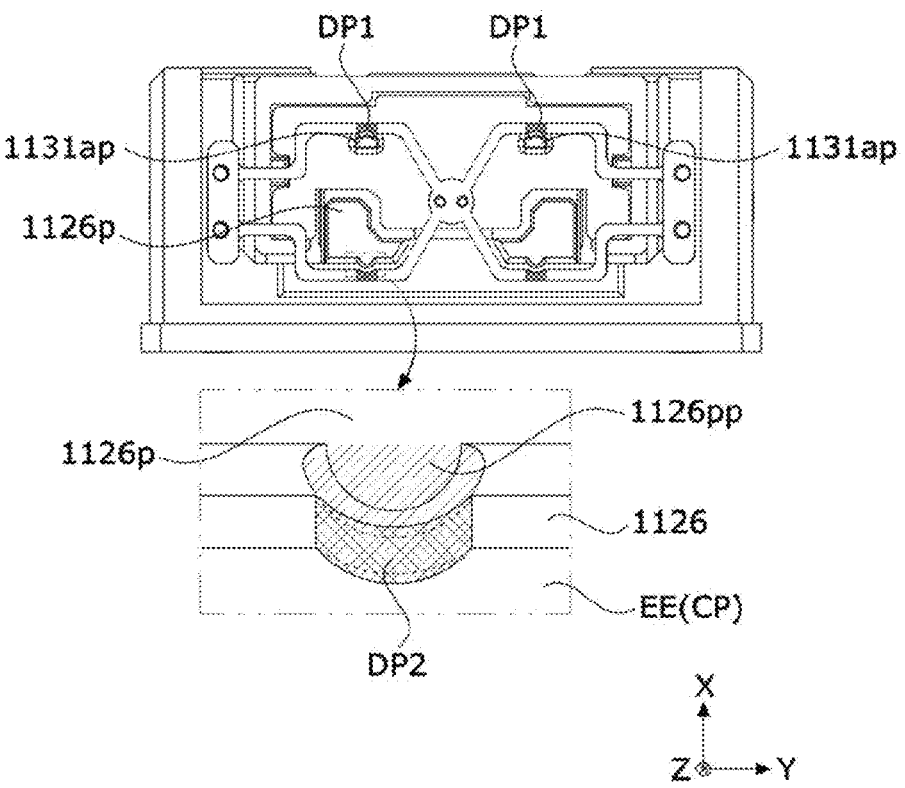
【Fig.37】
<u>1100B</u>
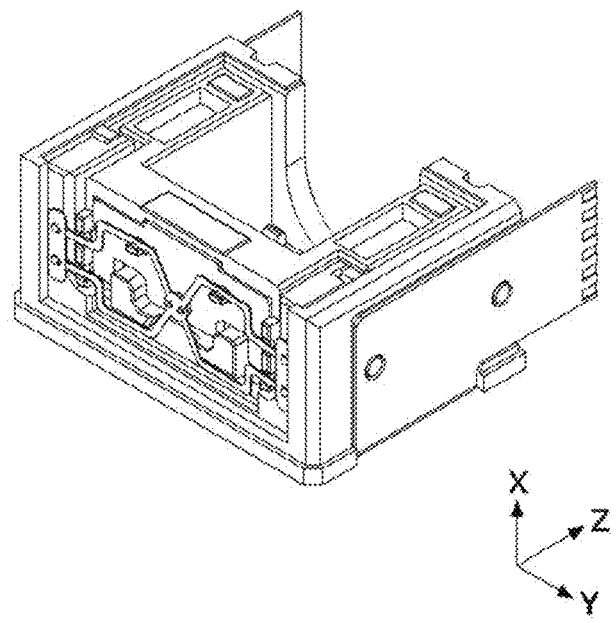

【Fig.38】
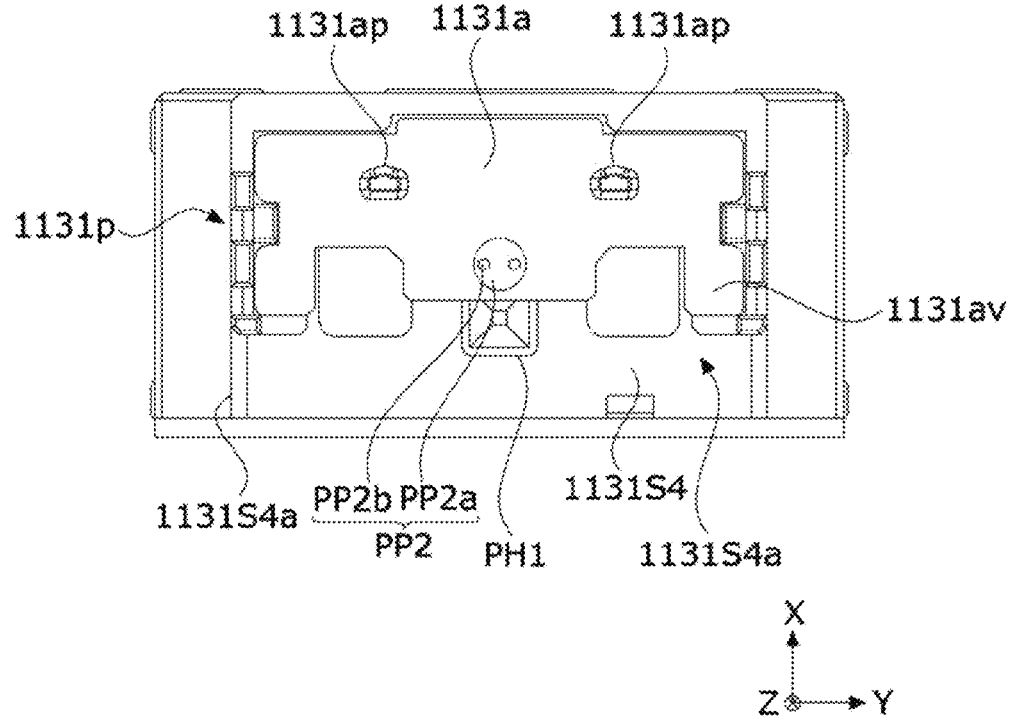
【Fig.39】
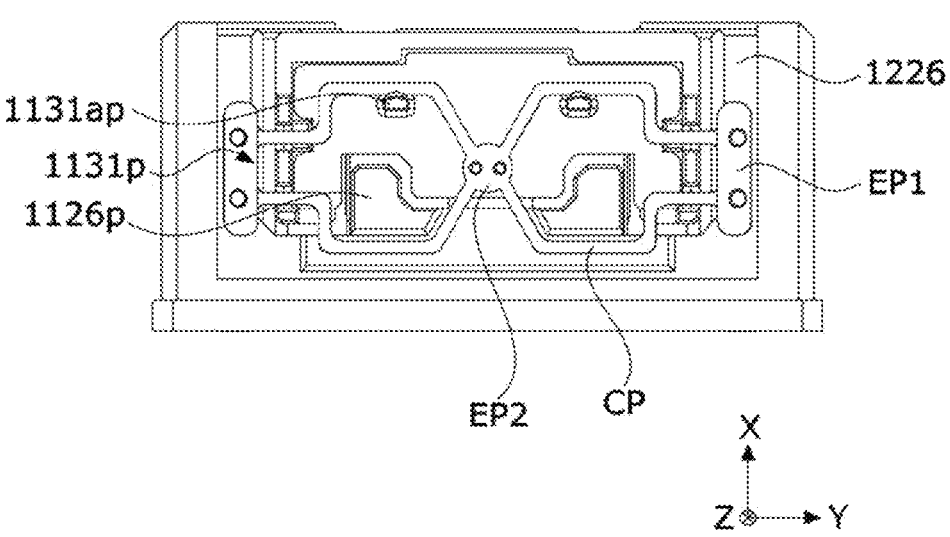

【Fig.40】
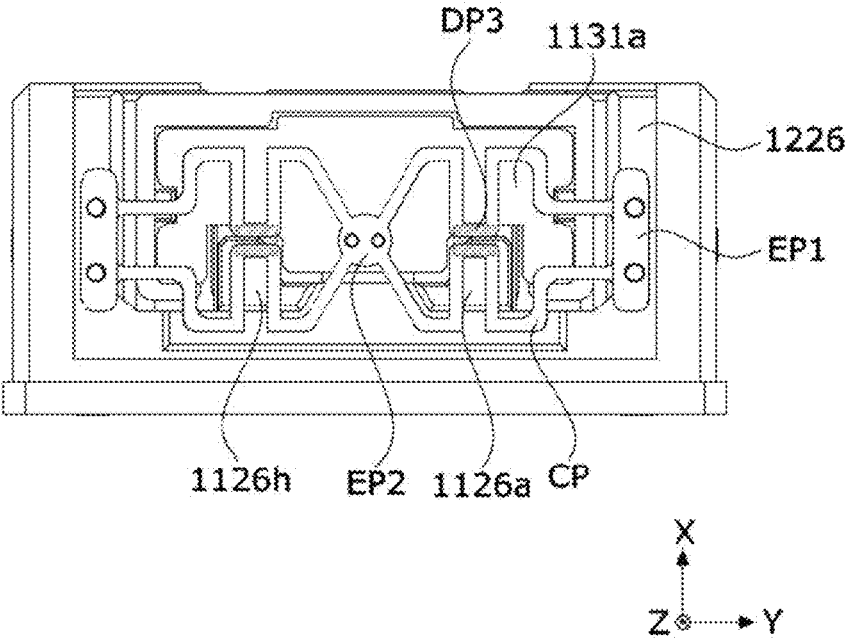
【Fig.41】
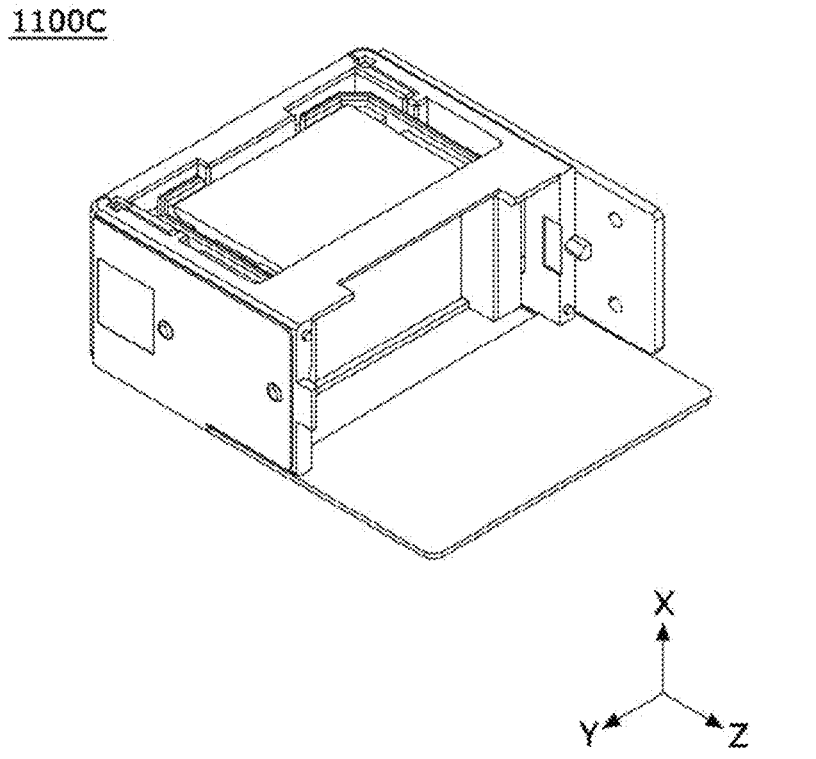

【Fig.42】
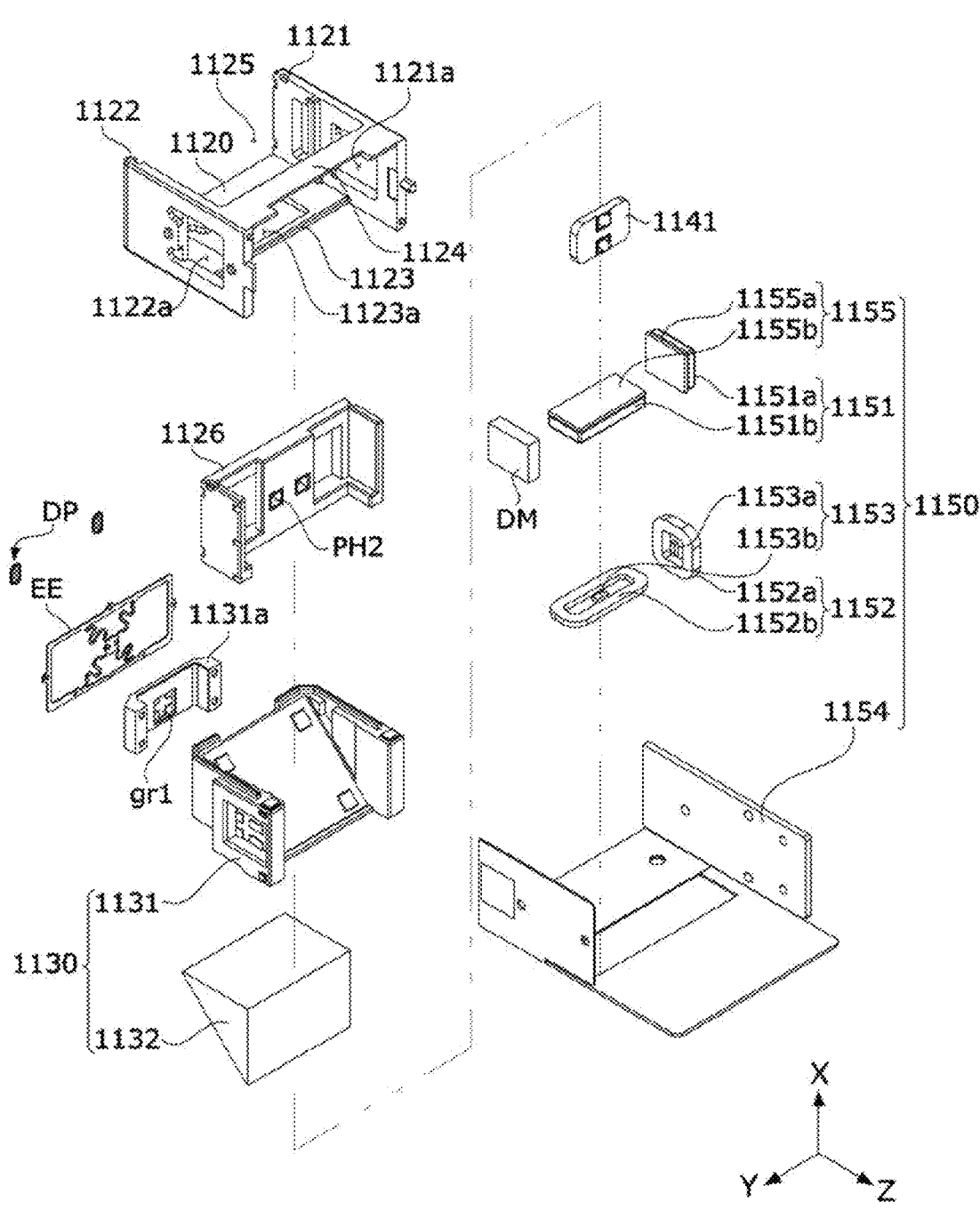

【Fig.43a】
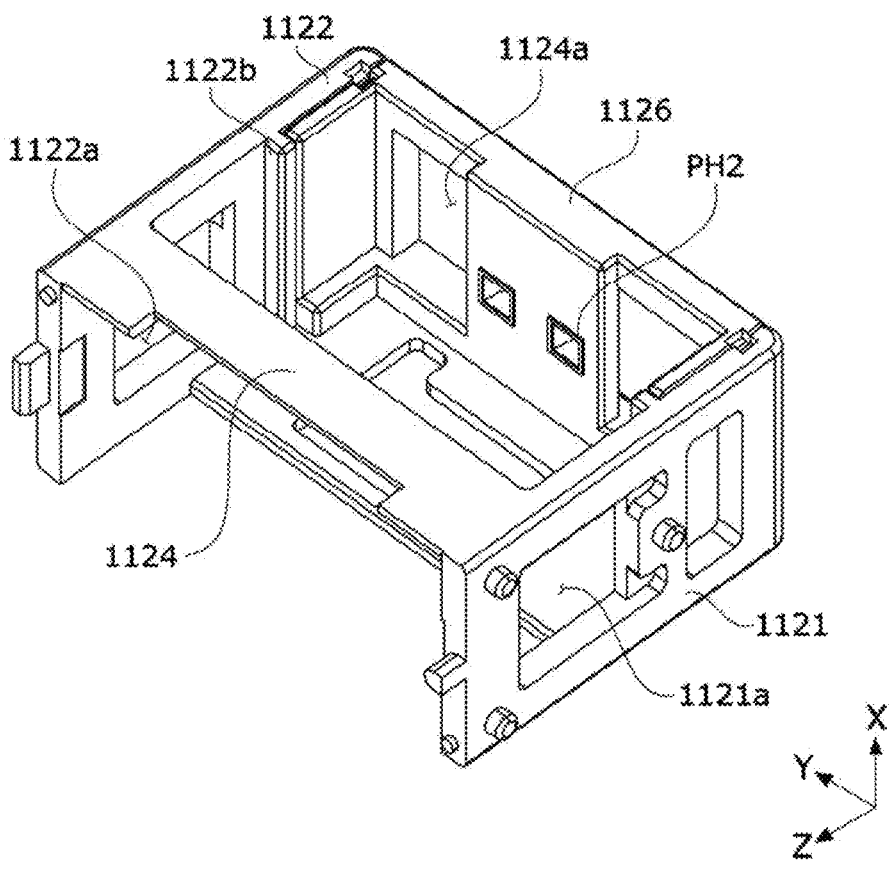

【Fig.43b】
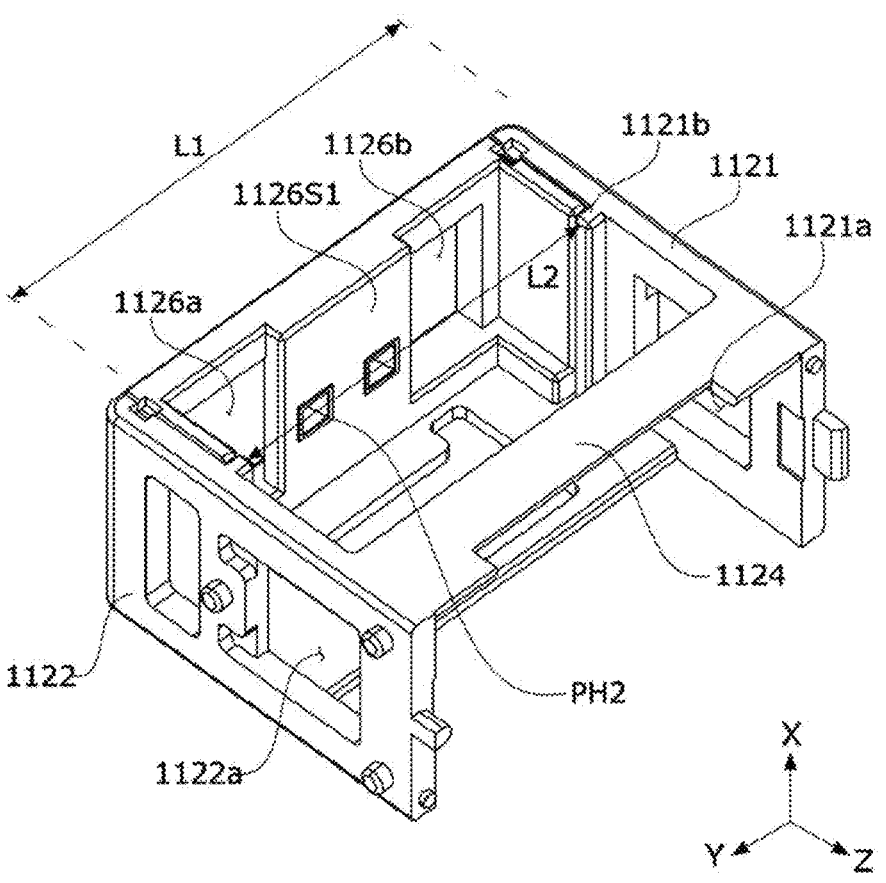
【Fig.43c】
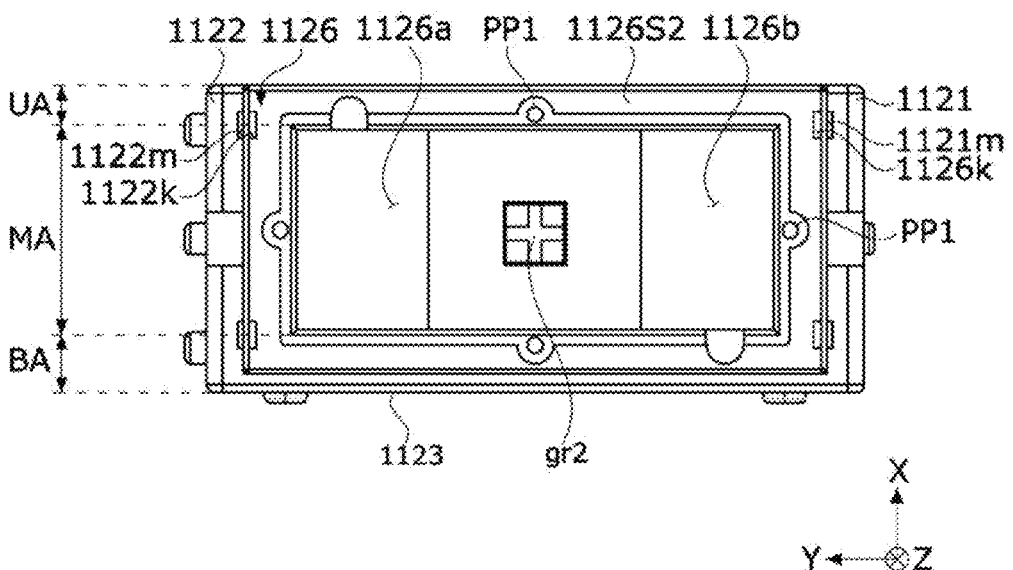

【Fig.44a】
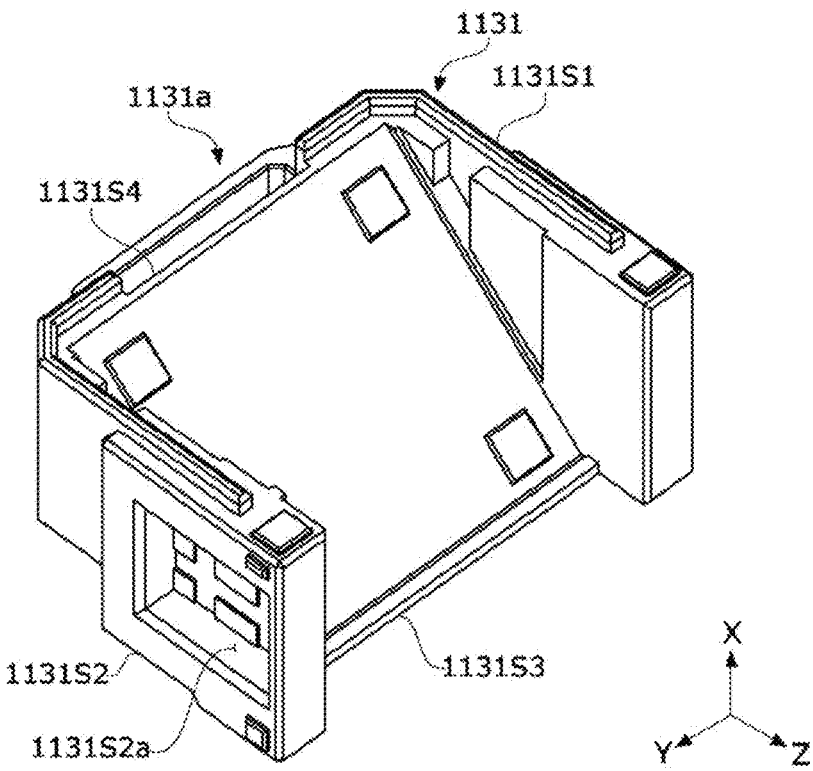
【Fig.44b】
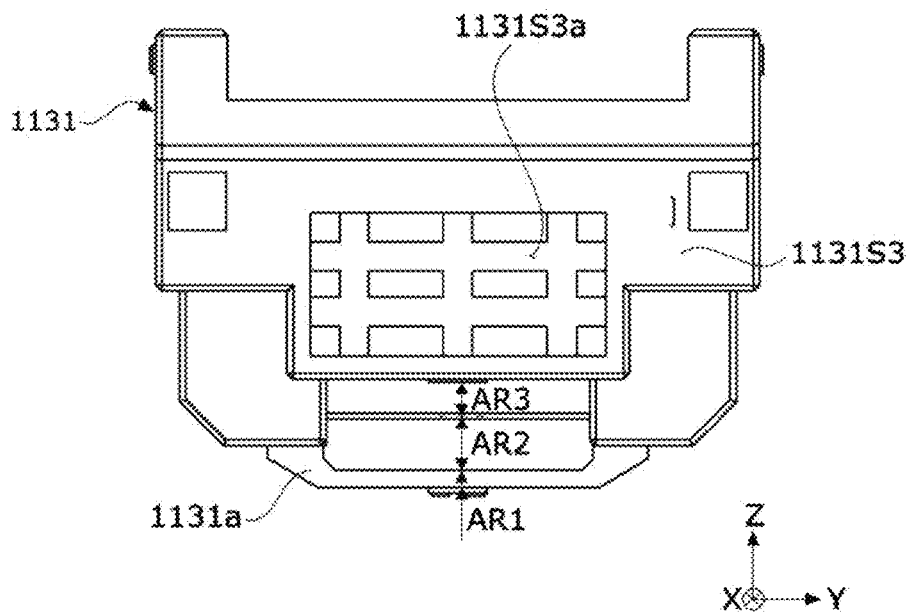

【Fig.44c】
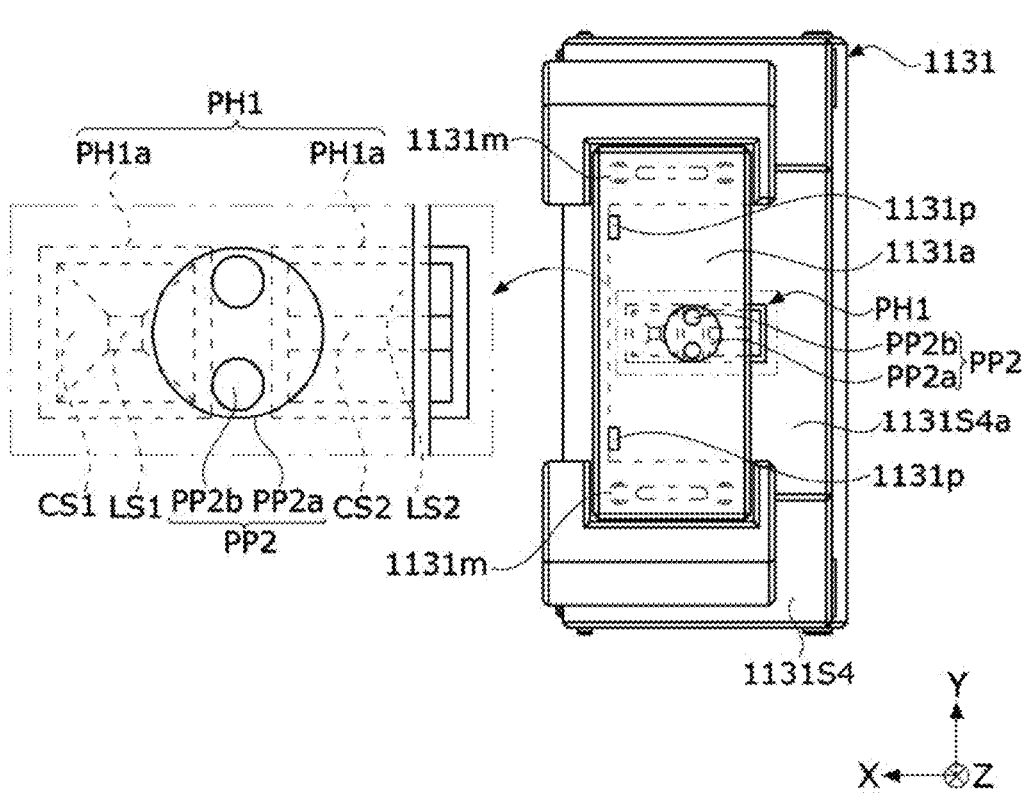
【Fig.44d】
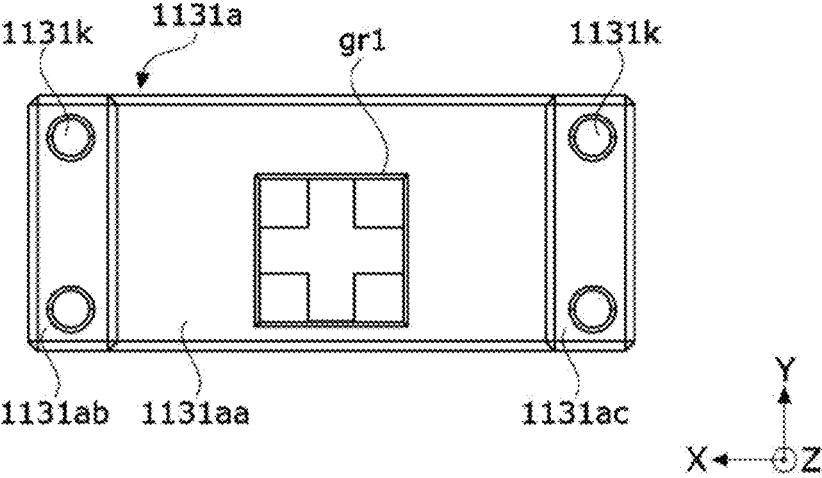

【Fig.44e】
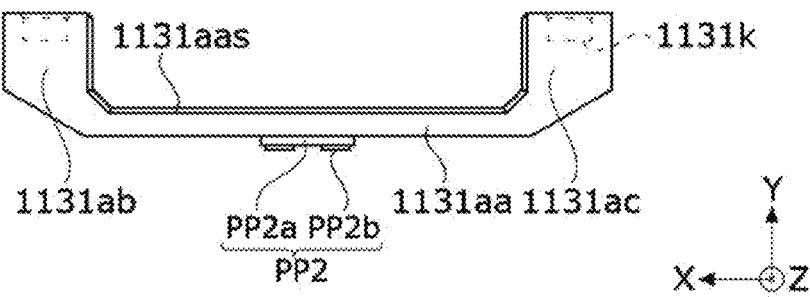
【Fig.45a】
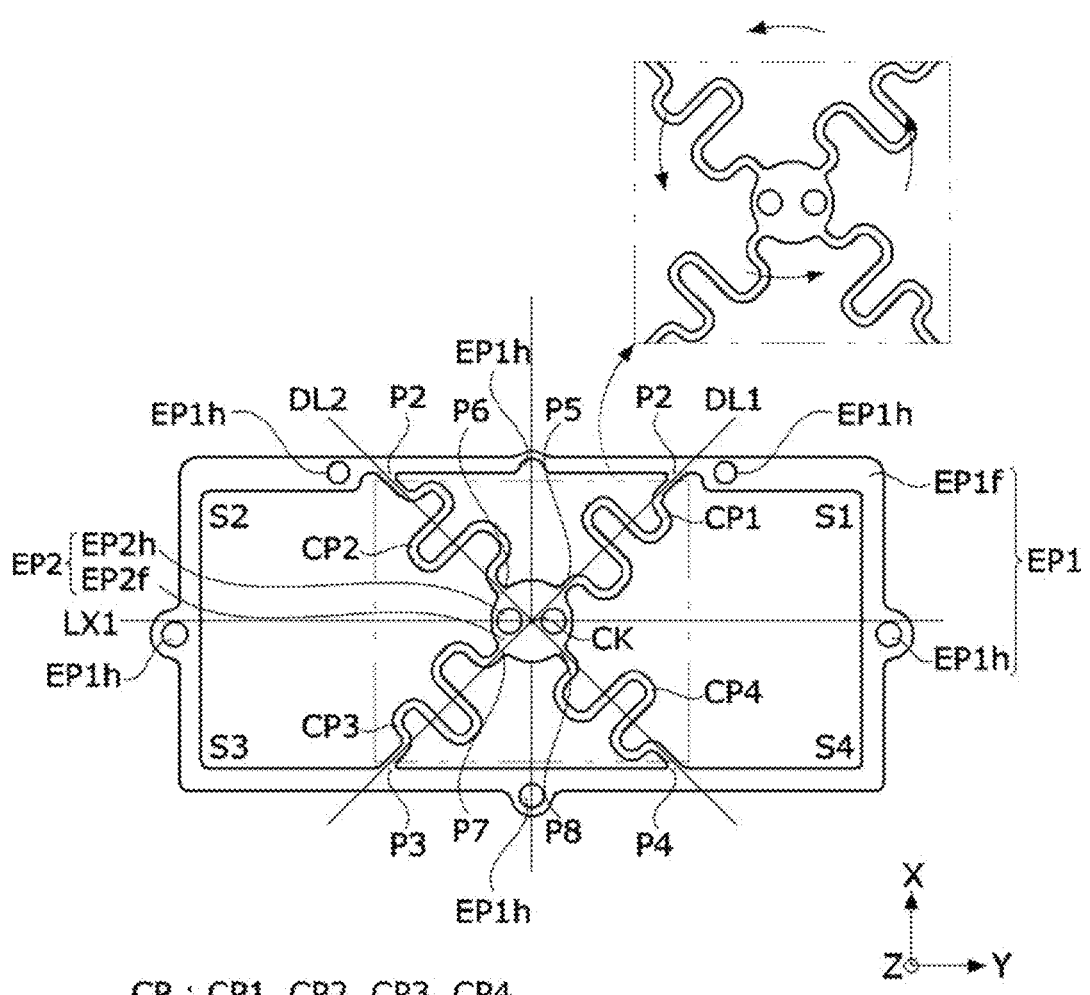
CP : CP1, CP2, CP3, CP4

【Fig.45b】
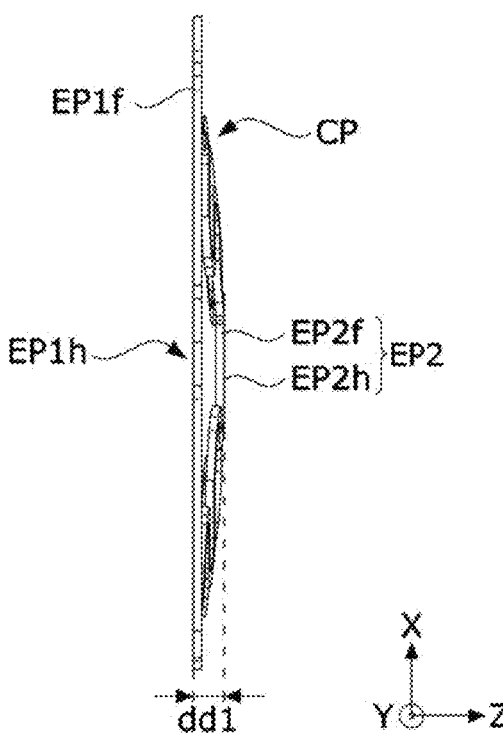

【Fig.45c】
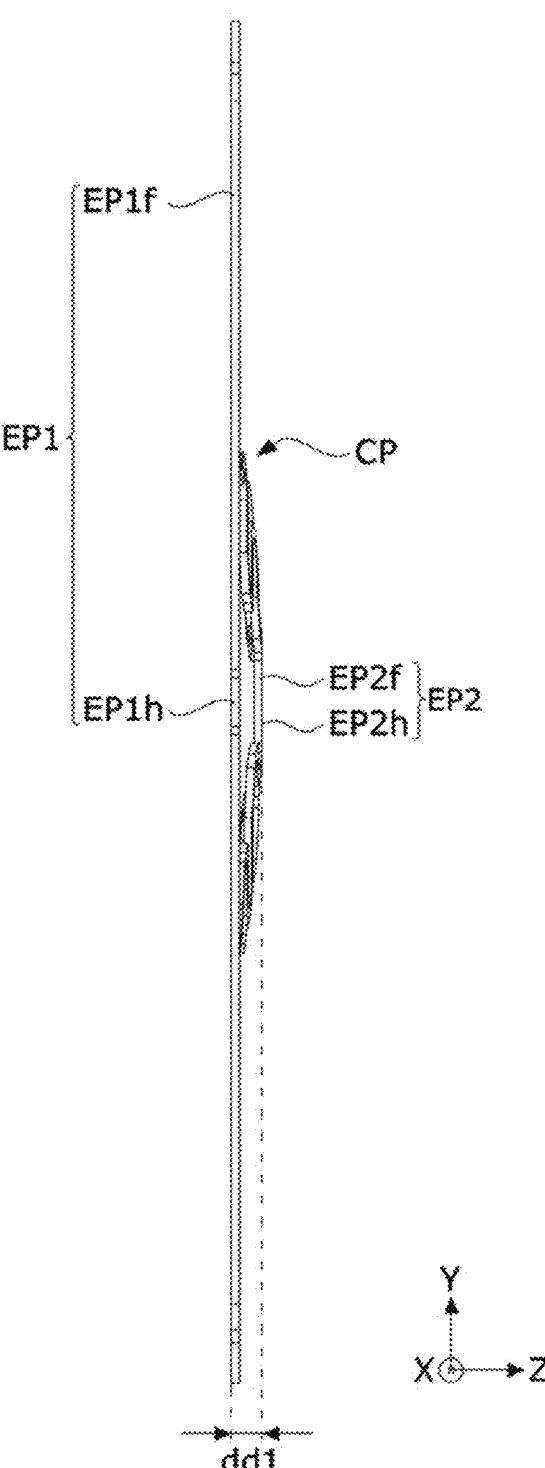

【Fig.45d】
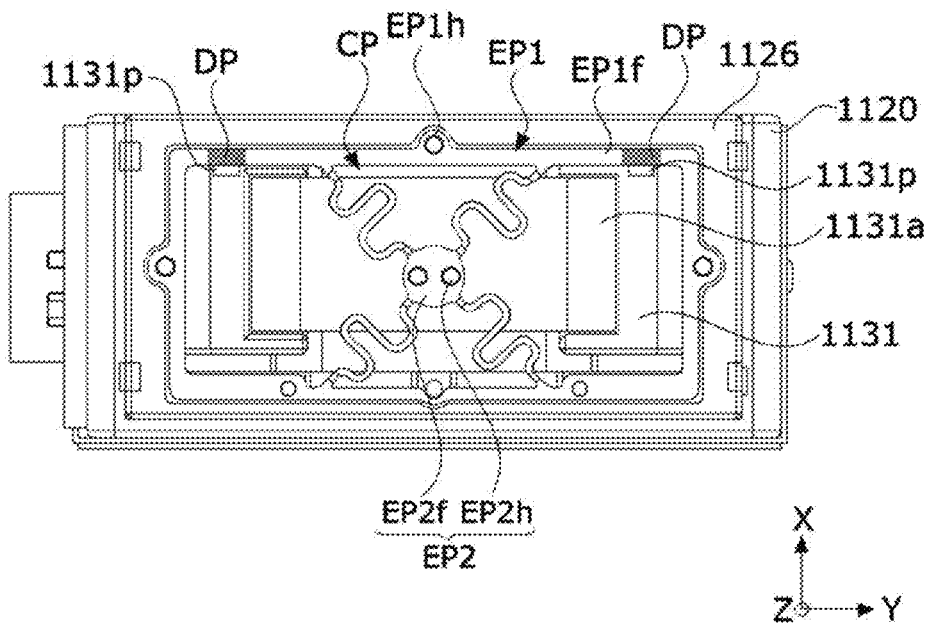
【Fig.45e】
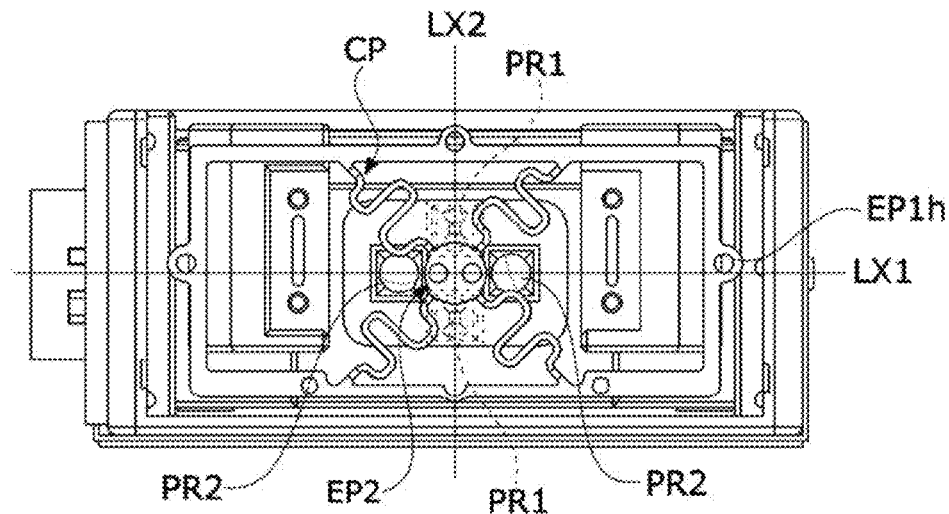

【Fig.46】
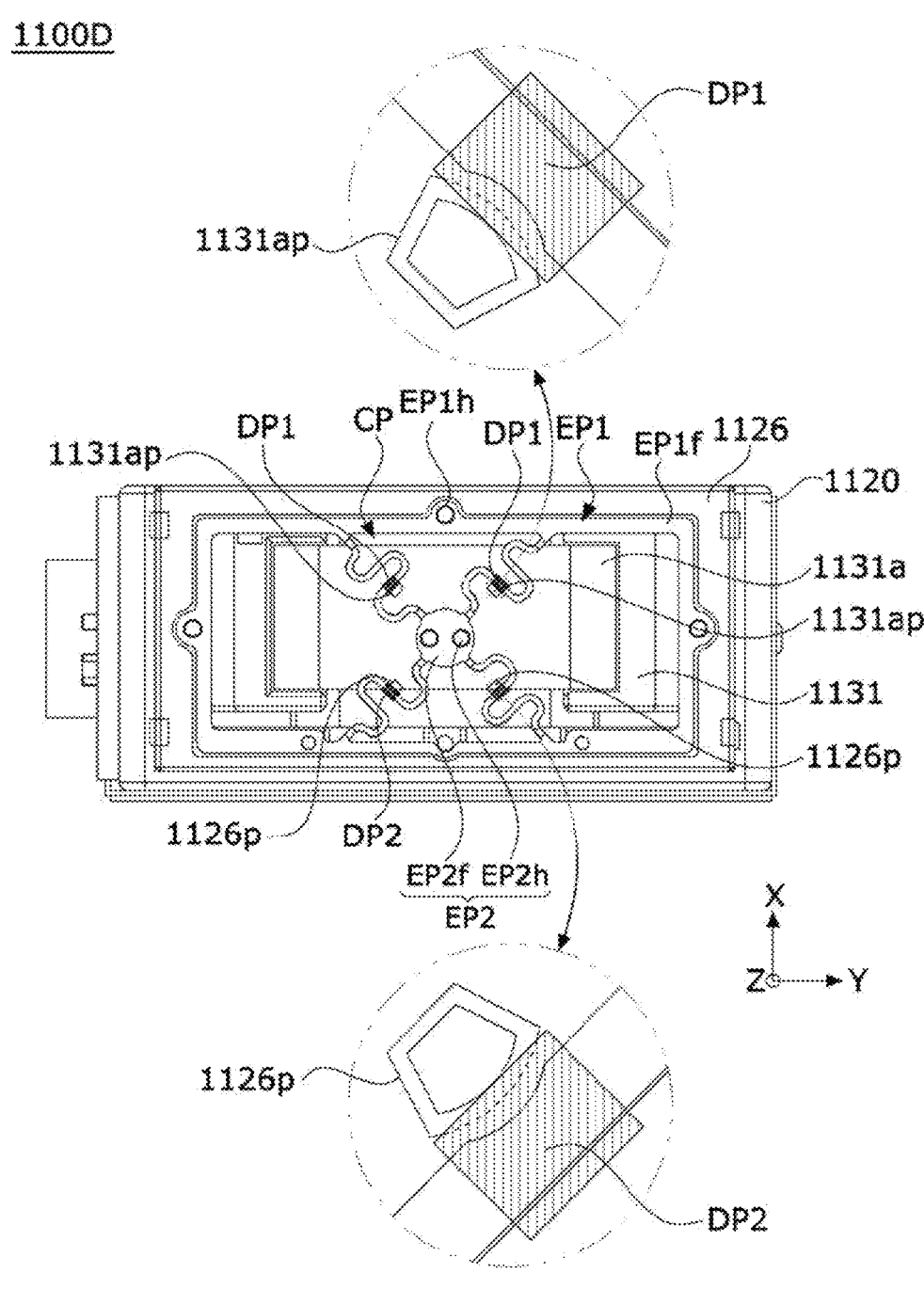

【Fig.47】
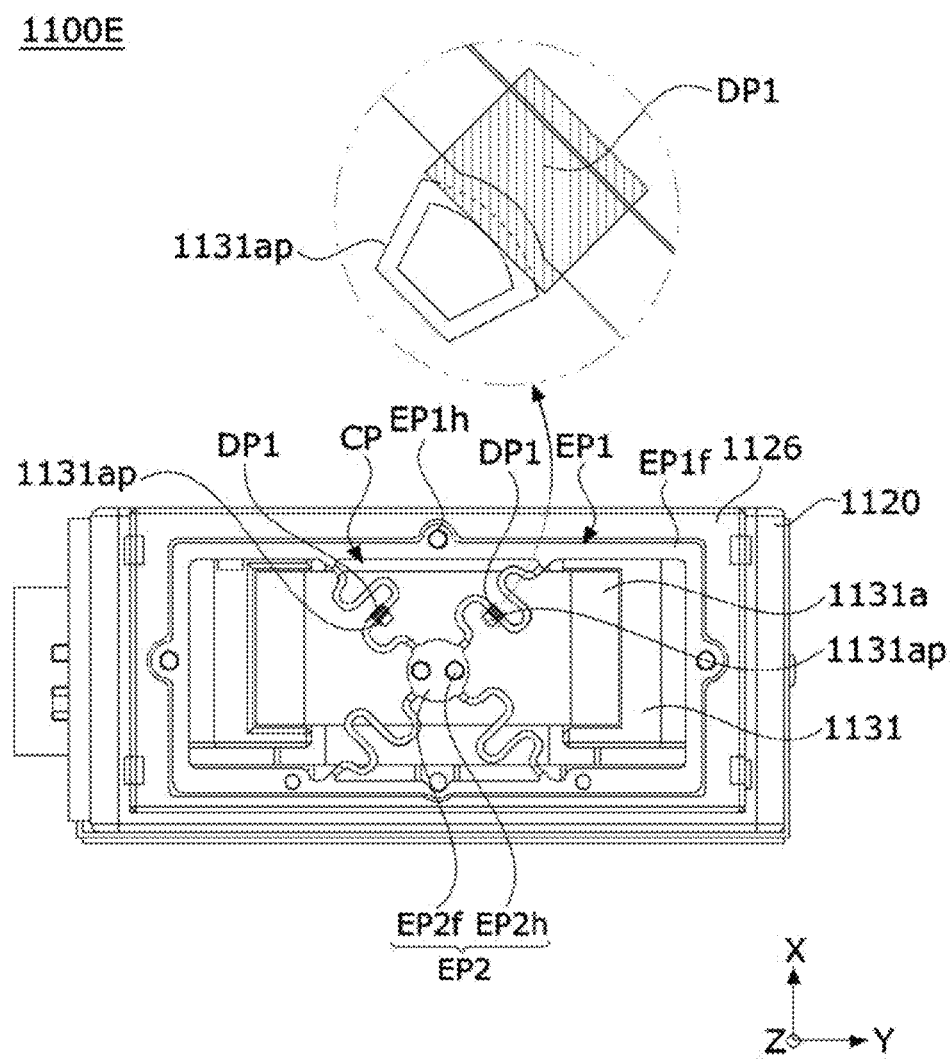

【Fig.48】
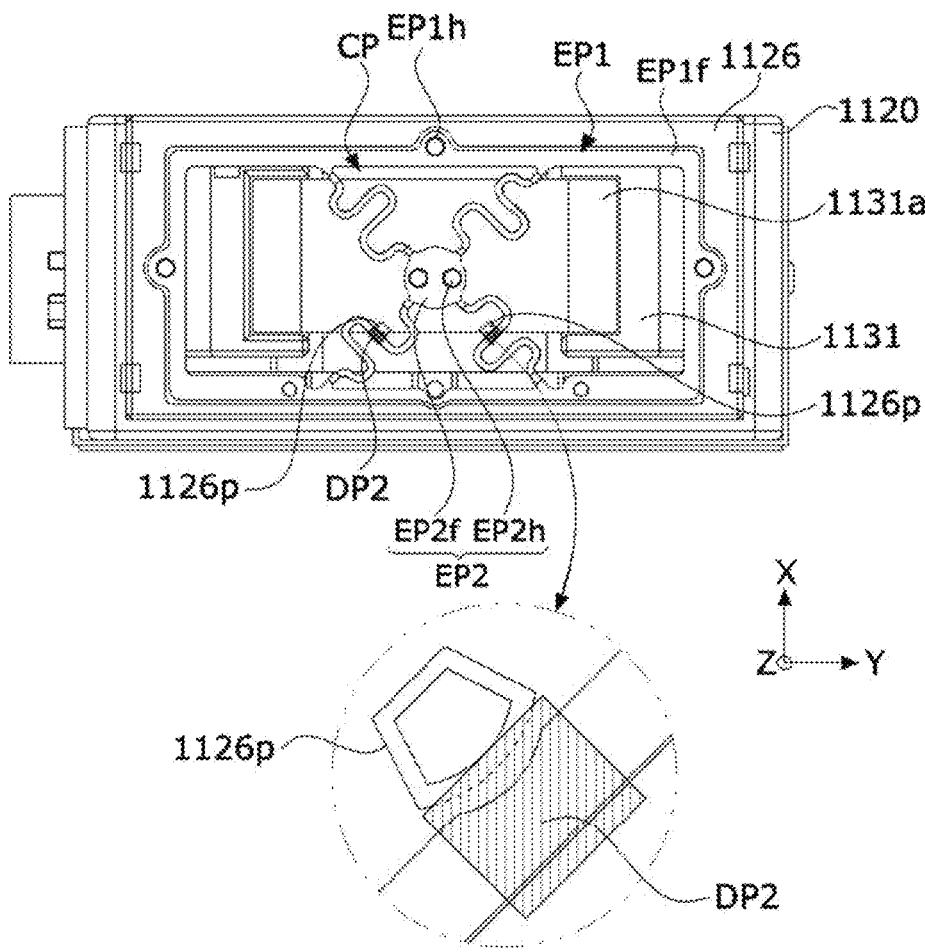

【Fig.49】
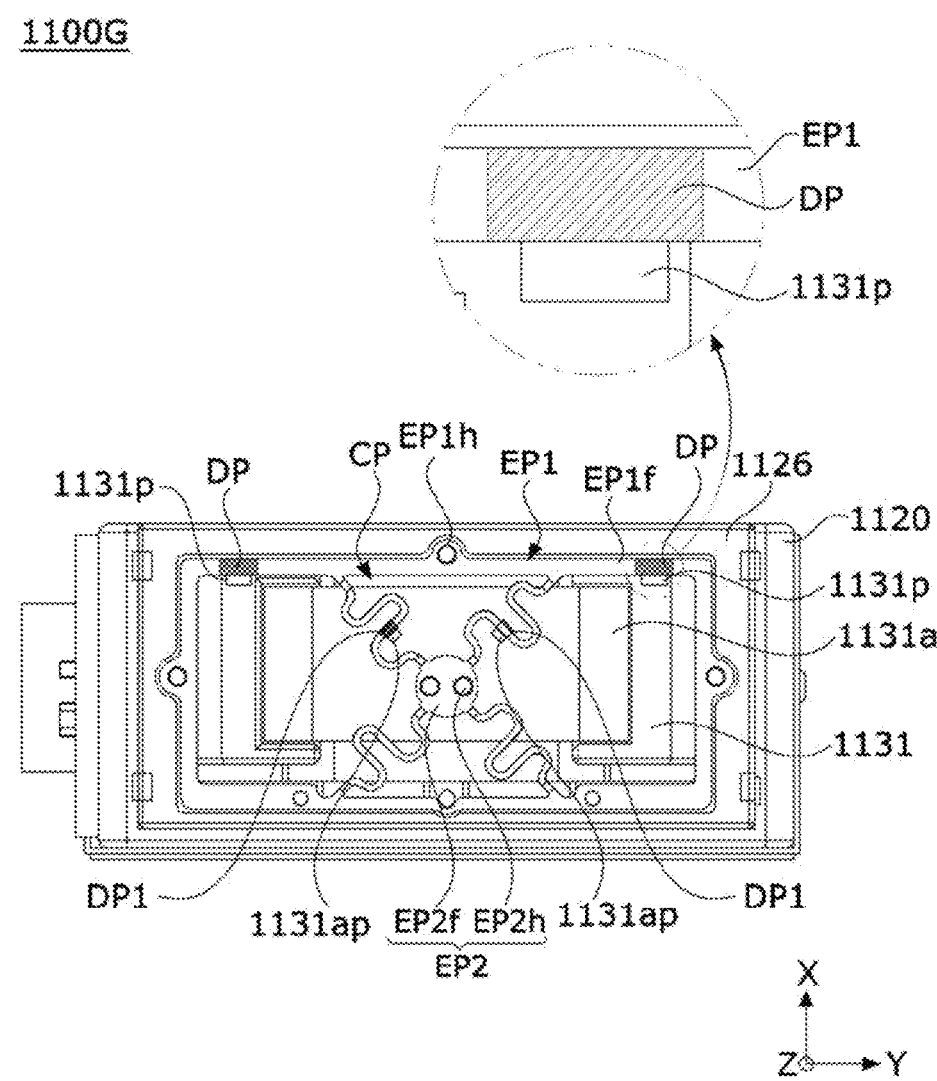

【Fig.50】
1200
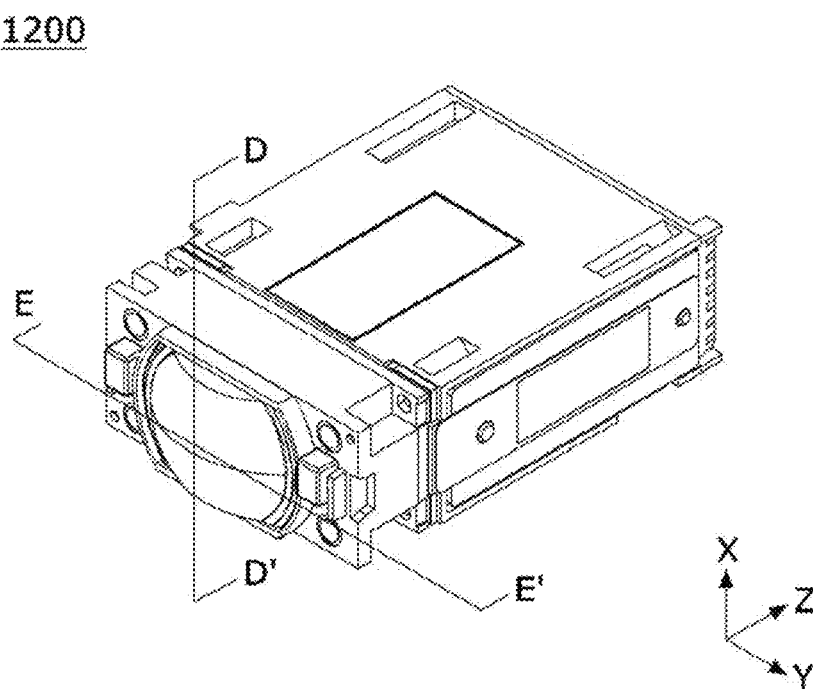

【Fig.51】
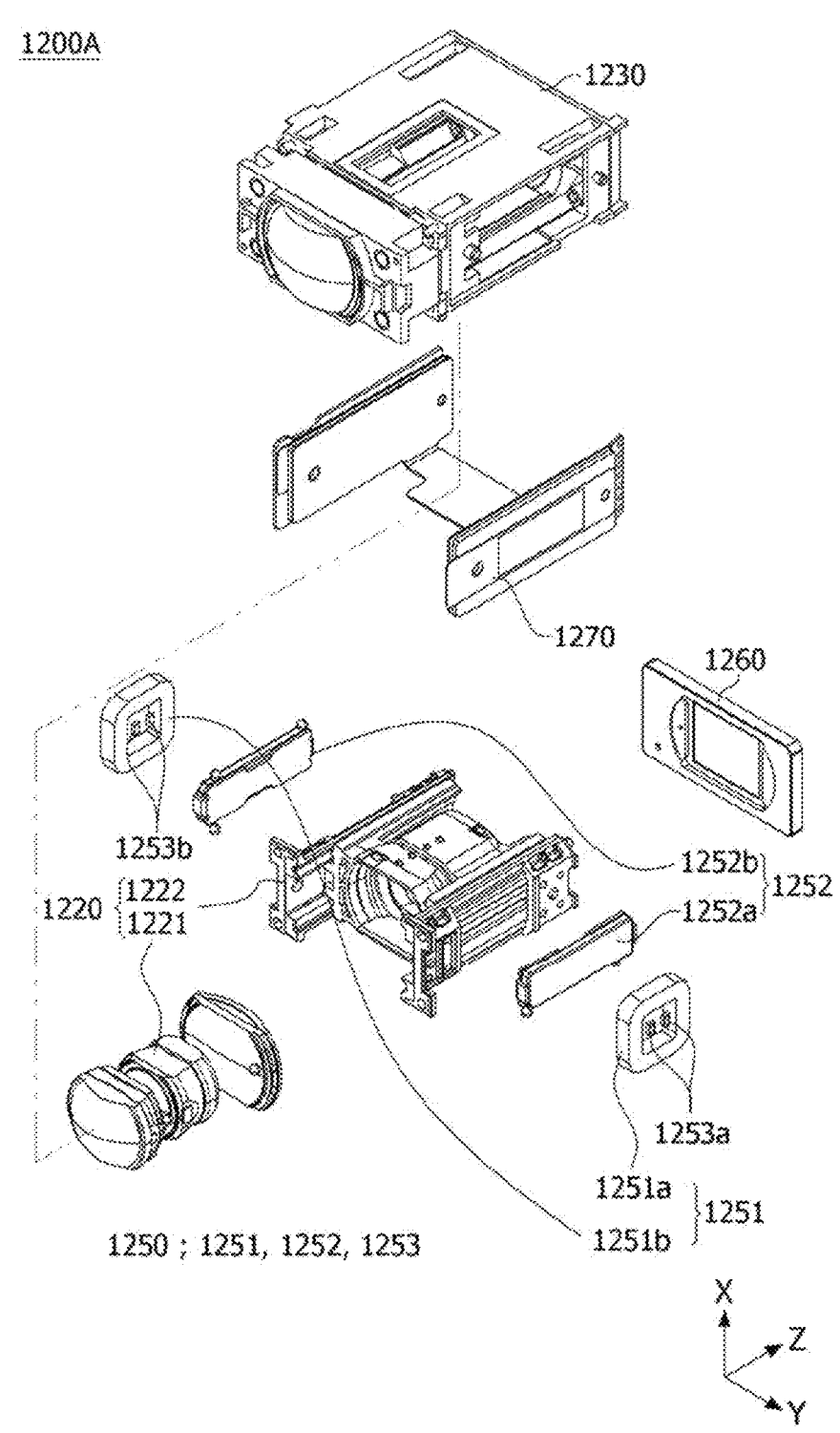

【Fig.52】
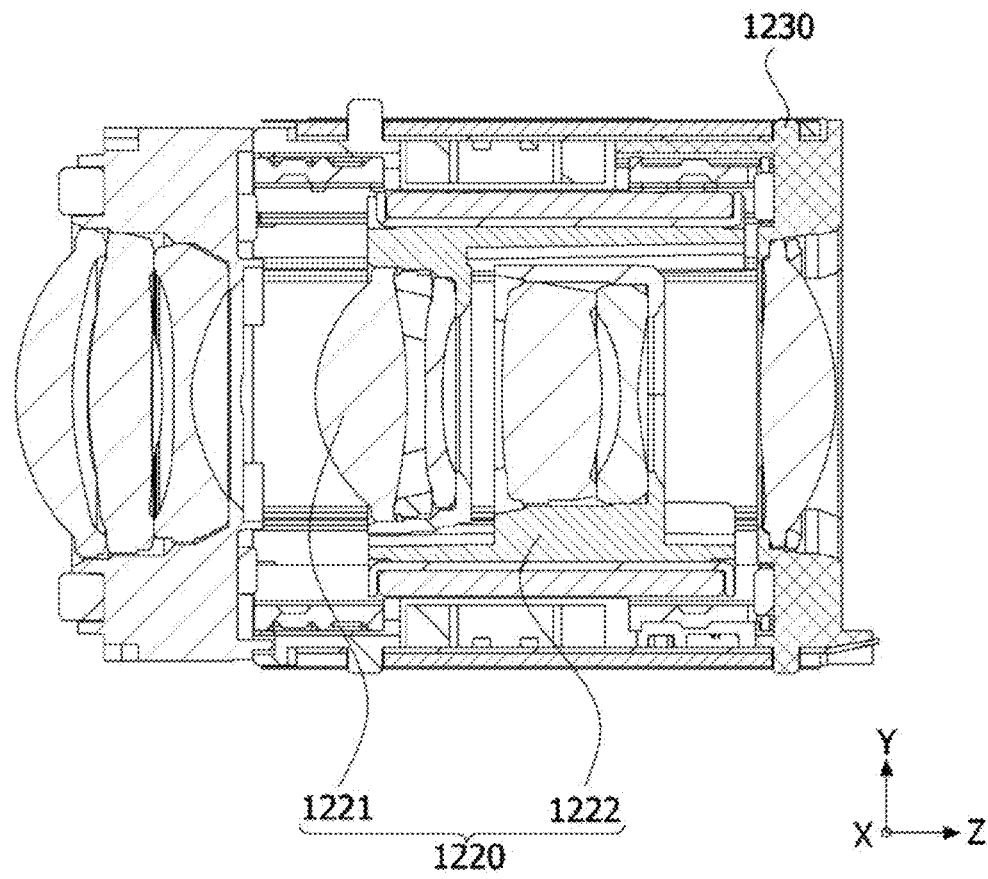

【Fig.53】
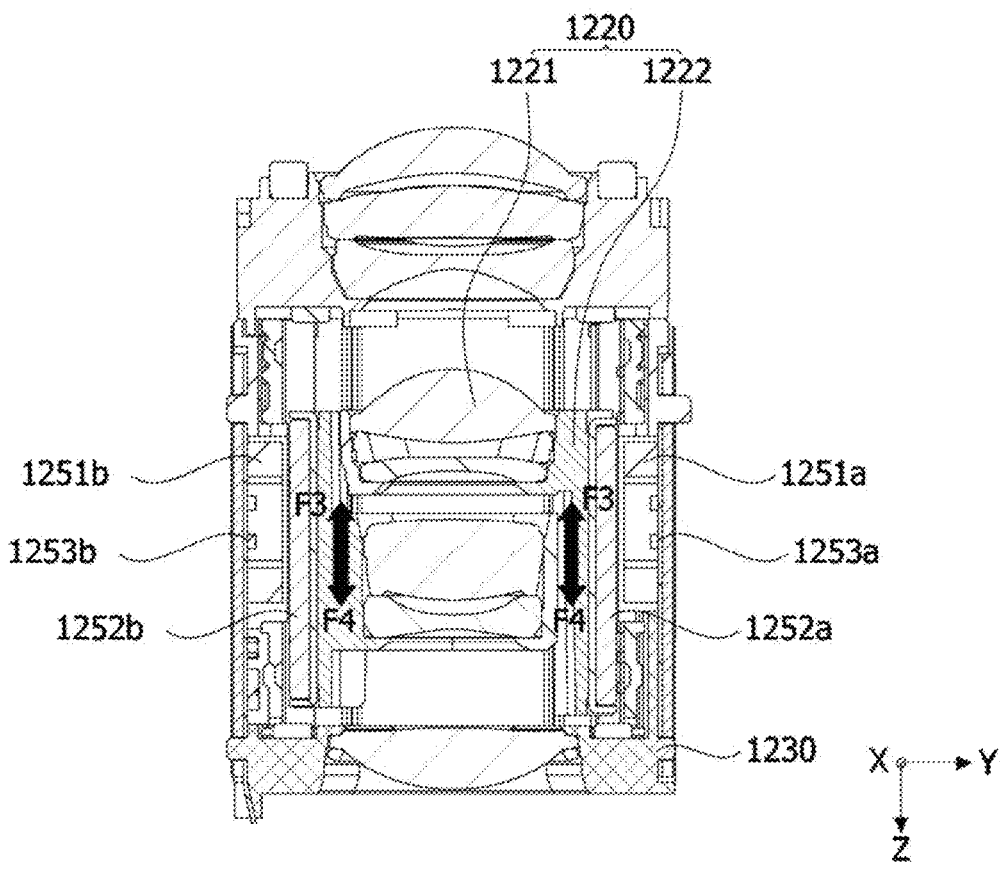
【Fig.54】
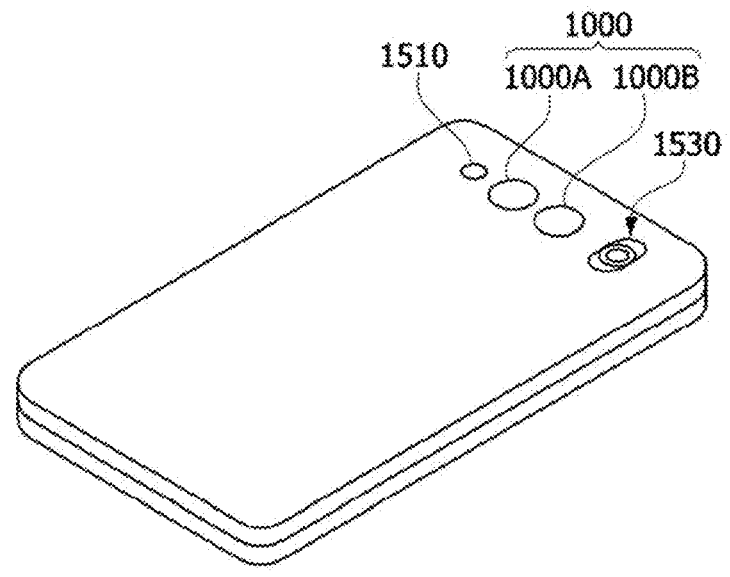

【Fig.55】
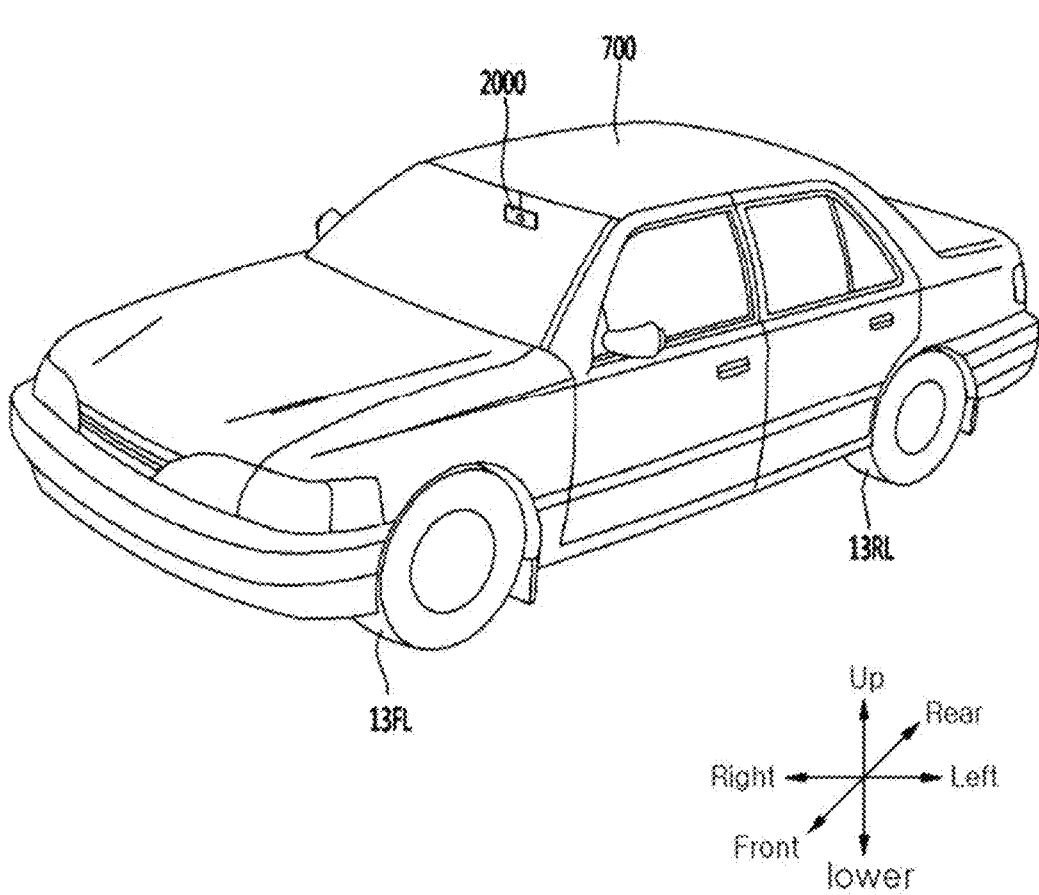

CAMERA ACTUATOR AND CAMERA MODULE COMPRISING SAME

CROSS REFERENCE TO RELATED APPLICATIONS

This application is the National Phase of PCT International Application No. PCT/KR2021/009544, filed on Jul. 23, 2021, which claims priority under 35 U.S.C. 119(a) to Patent Application Nos. 10-2020-0091615, filed in the Republic of Korea on Jul. 23, 2020 and 10-2021-0096523, filed in the Republic of Korea on Jul. 22, 2021, all of which are hereby expressly incorporated by reference into the present application.

TECHNICAL FIELD

The present invention relates to a camera actuator and a camera module including the same.

BACKGROUND ART

A camera is a device for taking pictures or videos of subjects and is mounted on a portable device, a drone, a vehicle, or the like. A camera module may have an image stabilization (IS) function of correcting or preventing the image shake caused by the movement of a user in order to improve the quality of the image, an auto focusing (AF) function of aligning a focal length of a lens by automatically adjusting an interval between an image sensor and the lens, and a zooming function of capturing a remote subject by increasing or decreasing the magnification of the remote subject through a zoom lens.

Meanwhile, a pixel density of the image sensor increases as a resolution of the camera increases, and thus a size of the pixel becomes smaller, and as the pixel becomes smaller, the amount of light received for the same time decreases. Therefore, as the camera has a higher pixel density, the image shake caused by hand shaking due to a shutter speed decreased in a dark environment may more severely occur. As a representative IS technique, there is an optical image stabilizer (OIS) technique of correcting motion by changing a path of light.

According to the general OIS technique, the motion of the camera may be detected through a gyro sensor or the like, and a lens may tilt or move, or a camera module including a lens and an image sensor may tilt or move based on the detected motion. When the lens or the camera module including the lens and the image sensor tilts or moves for an OIS, it is necessary to additionally secure a space for tilting or moving around the lens or the camera module.

Meanwhile, actuators for an OIS may be disposed around the lens. In this case, the actuators for an OIS may be actuators capable of two axes (i.e., an X axis and a Y axis perpendicular to a Z-axis that is an optical axis) tiling.

However, according to the needs of ultra-slim and ultra-small camera modules, there is a large space constraint for arranging actuators for an OIS, and it may be difficult to secure a sufficient space only for a camera module including a lens or the lens and an image sensor that will tilt or move for an OIS. In addition, as a camera has a higher pixel density, it is preferable that a size of a lens be increased to increase the amount of received light, and there may be a limit to increasing the size of the lens due to a space for actuators for an OIS.

In addition, when a zooming function, an AF function, and an OIS function are all included in a camera module, there is also a problem that an OIS magnet and an AF or zoom magnet are disposed close to each other to cause magnetic field interference.

In addition, a problem that oscillation occurs during the OIS function is performed.

Technical Problem

The present invention is directed to providing a camera actuator in which oscillation due to an elastic member is suppressed through a damper member while having a retention force in an optical image stabilizer (OIS) actuator using elasticity of the elastic member.

In addition, the present invention is directed to providing a camera actuator with improved reliability and durability through a coupling force between various components and an elastic member due to a damper member.

In addition, the present invention is directed to providing a camera actuator applicable to ultra-slim, ultra-small, and high resolution cameras.

In addition, the present invention is directed to providing a camera actuator for stably holding a tilting guide unit.

An object of the embodiment is not limited thereto and will also include objects or effects which can be identified from solutions or embodiments described below.

Technical Solution

A camera actuator according to an embodiment of the present invention includes a housing, a mover disposed in the housing, a tilting guide unit disposed between the housing and the mover, a driving unit disposed in the housing and for driving the mover, an elastic member that allows the tilting guide unit to be in close contact with the mover, and a damper member coupled to at least one group of the elastic member the housing.

The mover may include a seating groove for accommodating the tilting guide unit, and the camera actuator may include a first member accommodated in the seating groove, disposed outside the tilting guide unit, and coupled to the mover.

The camera actuator may include a second member, at least a portion of which is disposed between the tilting guide unit and the first member and coupled to the housing.

The first member and the second member may be accommodated in the seating groove.

The elastic member may include a first bonding portion connected to the housing, a second bonding portion connected to the first member, and a connecting portion connecting the first bonding portion and the second bonding portion.

The mover may include a plurality of mover protrusions protruding toward the elastic member, and the damper member may be disposed in a mover groove positioned between the plurality of mover protrusions and may be in contact with the mover.

At least a portion of the connecting portion may be disposed in the mover groove, and the connecting portion may be in contact with the damper member.

The protrusion may include a first protrusion and a second protrusion disposed to be separated in a first direction, the connecting portion may pass through the mover groove, and the mover groove may be positioned between the first protrusion and the second protrusion.

The protrusion may include a third protrusion disposed inside the mover groove.

A height of the third protrusion may be smaller than a height of the first protrusion or the second protrusion.

The first member may include a member protrusion disposed adjacent to the connecting portion.

At least a portion of the member protrusion may overlap the connecting portion in an optical axis direction, and at least a portion of the connecting portion may be curved to correspond to an outer surface of the member protrusion.

The damper member may be coupled to the member protrusion and the connecting portion.

The member protrusion may be positioned between the first bonding portion and the second bonding portion.

The second member may include a housing protrusion disposed adjacent to the connecting portion.

At least a portion of the housing protrusion may overlap the connecting portion in an optical axis direction.

At least a portion of the connecting portion may be curved to correspond to an outer surface of the housing protrusion.

The damper member may be coupled to the housing protrusion and the connecting portion.

At least a portion of the housing protrusion may overlap the damper member in a first direction.

The damper member may be coupled to legs of the connecting portion.

The second bonding portion may be disposed between the mover and the first bonding portion.

In addition, a camera actuator according to another embodiment includes a housing, a mover disposed in the housing and including an optical member, a tilting guide unit disposed between the housing and the mover, a driving unit disposed in the housing and for driving the mover, and an elastic member disposed between the tilting guide unit and the housing, wherein the driving unit includes a first magnet disposed on a first side surface of the mover and a dummy member disposed on a second side surface facing the first side surface.

The driving unit may further include a second magnet disposed under the mover, a first coil facing the first magnet, and a second coil facing the second magnet.

The camera actuator may further include a board unit electrically connected to the driving unit, wherein the board unit may include a first board side portion, a second board side portion opposite to the first board side portion, and a third board side portion disposed between the first board side portion and the second board side portion, and the first board side portion may be electrically connected to the first coil, the third board side portion may be electrically connected to the second coil, and a driving driver may be disposed on any one of the first board side portion and the third board side portion.

The second board side portion may be a dummy board.

The driving driver may provide a current to the first coil and the second coil.

The elastic member may allow the tilting guide unit to be in close contact with the mover.

The camera actuator may further include a first member connected to the housing and a second member coupled to the mover, wherein the second member may be disposed between the first member and the mover, and the elastic member may include a first bonding portion connected to the housing, a second bonding portion connected to the first member, and a connecting portion connecting the first bonding portion and the second bonding portion.

The second bonding portion may be disposed between the mover and the first bonding portion.

The tilting guide unit may include a base, a first protrusion protruding from a first surface of the base, and a second protrusion protruding from a second surface of the base, and the mover may tilt to a first axis with respect to the first protrusion and tilt to a second axis with respect to the second protrusion.

The connecting portion may include a first connecting portion to a fourth connecting portion respectively disposed in a first quadrant region to a fourth quadrant region partitioned by a first bisector and a second bisector, wherein the first quadrant region to the fourth quadrant region may be positioned counterclockwise, the first connecting portion and the third connecting portion may be symmetrical with respect to the first bisector and the second bisector, the second connecting portion and the fourth connecting portion may be symmetrical with respect to the first bisector and the second bisector, the first bisector may be a line bisecting the elastic member in a first direction, and the second bisector may be a line bisecting the elastic member in a second direction.

An electronic device according to an embodiment includes a first camera module in which an opening through which light enters and an image sensor overlap at least partially in an optical axis direction and a second camera module including an optical member for changing an optical path of incident light, wherein the second camera module includes a first side surface adjacent to the first camera module, a second side surface facing the first side surface, a driving unit for moving the optical member between the optical member and the second side surface, and a dummy member between the optical member and the first side surface.

Advantageous Effects

According to embodiments of the present invention, it is possible to implement a camera actuator in which oscillation due to an elastic member is suppressed through a damper member while having a retention force in an optical image stabilizer (OIS) actuator using elasticity of the elastic member.

In addition, it is possible to implement a camera actuator with improved reliability and durability through a coupling force between various components and an elastic member due to a damper member.

In addition, it is possible to provide a camera actuator applicable to ultra-slim, ultra-small, and high-resolution cameras. In particular, it is possible to efficiently arrange actuators for an OIS even without an increase in the overall size of a camera module.

In addition, according to an embodiment of the present invention, it is possible to improve driving stability of the camera actuator.

In addition, tilting in an X-axis direction and tilting in a Y-axis direction do not cause magnetic field interference with each other, it is possible to implement the tilting in the X-axis direction and the tilting in the Y-axis direction in a stable structure, and it is possible to precisely control an OIS function because magnetic field interference with an auto focusing (AF) or zooming actuator does not occur.

According to the embodiment of the present invention, it is possible to secure a sufficient amount of light by eliminating the size limitation of the lens and implement an OIS with low power consumption.

Various and beneficial advantages and effects of the present invention are not limited to the above-described contents and will be more easily understood in the process of describing specific embodiments of the present invention.

DESCRIPTION OF DRAWINGS

FIG. 1 is a perspective view of a camera module according to an embodiment.

FIG. 2 is an exploded perspective view of the camera module according to the embodiment.

FIG. 3 is a cross-sectional view along line A-A' in FIG. 1.

FIG. 4 is a perspective view of a first camera actuator according to a first embodiment.

FIG. 5 is an exploded perspective view of the first camera actuator according to the first embodiment.

FIG. 6 is a perspective view of a housing according to an embodiment.

FIG. 7 is a view of the housing according to the embodiment.

FIG. 8 is a perspective view of a mover according to an embodiment.

FIG. 9 is a perspective view of a holder according to an embodiment.

FIG. 10 is a bottom view of the holder according to the embodiment.

FIG. 11 is a side view of the holder according to the embodiment.

FIG. 12 is a plan view of an elastic member according to an embodiment.

FIG. 13 is a side view of the elastic member according to the embodiment.

FIG. 14 is a top view of the elastic member according to the embodiment.

FIG. 15 is a view for describing coupling between a first member, a second member, and the elastic member in the first camera actuator according to the first embodiment.

FIG. 16 is an enlarged view of portion K in FIG. 15.

FIG. 17A is a perspective view before a damper member is applied on the first camera actuator according to the first embodiment.

FIG. 17B is a perspective view after the damper member is applied on the first camera actuator according to the first embodiment.

FIG. 17C is a view showing coupling between the first member, the second member, and the elastic member in the first camera actuator according to the first embodiment.

FIG. 17D is a view of another aspect of FIG. 17C.

FIG. 17E is a view of still another aspect of FIG. 17C.

FIG. 18 is a view illustrating FIG. 17C from which the first member is removed.

FIG. 19 is a perspective view of a tilting guide unit according to an embodiment.

FIG. 20 is a perspective view of the tilting guide unit in a direction different from that of FIG. 19.

FIG. 21 is a cross-sectional view of the tilting guide unit along line F-F' in FIG. 19.

FIG. 22 is a perspective view of the first camera actuator according to the first embodiment from which a shield can and a board are removed.

FIG. 23 is a cross-sectional view along line P-P' in FIG. 22.

FIG. 24 is a cross-sectional view along line Q-Q' in FIG. 22.

FIG. 25 is a view showing a driving unit according to an embodiment.

FIG. 26 is a view showing a driving unit according to a modified example.

FIG. 27 is a perspective view of the first camera actuator according to the first embodiment.

FIG. 28 is a cross-sectional view along line S-S' in FIG. 27.

FIG. 29 is an exemplary view of movement of the first camera actuator shown in FIG. 28.

FIG. 30 is a perspective view of the first camera actuator according to the first embodiment.

FIG. 31 is a cross-sectional view along line R-R' in FIG. 30.

FIG. 32 is an exemplary view of the movement of the first camera actuator shown in FIG. 31.

FIG. 33 is a perspective view of a first camera actuator according to a second embodiment.

FIG. 34 is a view showing a first member in the first camera actuator according to the second embodiment.

FIG. 35 is a top view of the first member in the first camera actuator according to the second embodiment.

FIG. 36 is a side view of the first camera actuator according to the second embodiment.

FIG. 37 is a perspective view of a first camera actuator according to a third embodiment.

FIG. 38 is a diagram showing the first camera actuator according to the third embodiment.

FIG. 39 is a side view of the first camera actuator according to the third embodiment.

FIG. 40 is a view showing a first camera actuator according to a modified example.

FIG. 41 is a perspective view of a first camera actuator according to a fourth embodiment.

FIG. 42 is an exploded perspective view of the first camera actuator according to the fourth embodiment.

FIG. 43A is a perspective view of a housing of the first camera actuator according to the fourth embodiment.

FIG. 43B is a perspective view of the housing in a direction different from that of FIG. 43A.

FIG. 43C is a front view of the housing of the first camera actuator according to the fourth embodiment.

FIG. 44A is a perspective view of a holder of the first camera actuator according to the fourth embodiment.

FIG. 44B is a bottom view of the holder of the first camera actuator according to the fourth embodiment.

FIG. 44C is a front view of the holder of the first camera actuator according to the fourth embodiment.

FIG. 44D is a rear view of a second member of the first camera actuator according to the fourth embodiment.

FIG. 44E is a bottom view of the second member of the first camera actuator according to the fourth embodiment.

FIG. 45A is a plan view of an elastic member according to the embodiment.

FIG. 45B is a side view of the elastic member according to the embodiment.

FIG. 45C is a top view of the elastic member according to the embodiment.

FIG. 45D is a view for describing coupling between a first member, the second member, and the elastic member in the first camera actuator according to the fourth embodiment.

FIG. 45E is a view illustrating FIG. 45D from which the first member and the second member are removed.

FIG. 46 is a view of a first camera actuator according to a fifth embodiment.

FIG. 47 is a view of a first camera actuator according to a sixth embodiment.

FIG. 48 is a view of a first camera actuator according to a seventh embodiment.

FIG. 49 is a view of a first camera actuator according to an eighth embodiment.

FIG. 50 is a perspective view of a second camera actuator according to the eighth embodiment.

FIG. 51 is an exploded perspective view of the second camera actuator according to the embodiment.

FIG. 52 is a cross-sectional view along line D-D' in FIG. 50.

FIG. 53 is a cross-sectional view along line E-E' in FIG. 50.

FIG. 54 is a perspective view of a portable terminal to which the camera module according to the embodiment is applied.

FIG. 55 is a perspective view of a vehicle to which the camera module according to the embodiment is applied.

MODES OF THE INVENTION

Since the present invention may have various changes and various embodiments, specific embodiments are illustrated and described in the accompanying drawings. However, it should be understood that it is not intended to limit specific embodiments, and it should be understood to include all modifications, equivalents, and substitutes included in the spirit and scope of the present invention.

Terms including ordinal numbers such as second or first may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. The term "and/or" includes a combination of a plurality of related listed items or any of the plurality of related listed items.

When a certain component is described as being "connected" or "coupled" to another component, it is understood that it may be directly connected or coupled to another component or other components may also be disposed therebetween. On the other hand, when a certain component is described as being "directly connected" or "directly coupled" to another component, it should be understood that other components are not disposed therebetween.

The terms used in the application are only used to describe specific embodiments and are not intended to limit the present invention. The singular expression includes the plural expression unless the context clearly dictates otherwise. In the application, it should be understood that terms such as "comprise" or "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

Unless defined otherwise, all terms used herein, including technical or scientific terms, have the same meaning as commonly understood by those of ordinary skill in the art to which the present invention pertains. Terms such as those defined in a commonly used dictionary should be construed as having a meaning consistent with the meaning in the context of the related art and should not be construed in an ideal or excessively formal meaning unless explicitly defined in the application.

Hereinafter, embodiments will be described in detail with reference to the accompanying drawings, and the same or corresponding components are given the same reference numerals regardless of the reference numerals, and overlapping descriptions thereof will be omitted.

FIG. 1 is a perspective view of a camera module according to an embodiment, FIG. 2 is an exploded perspective view of a camera module according to the embodiment, and FIG. 3 is a cross-sectional view along line A-A' in FIG. 1.

Referring to FIGS. 1 and 2, a camera module 1000 according to the embodiment may include a cover CV, a first camera actuator 1100, a second camera actuator 1200, and a circuit board 1300. Here, the first camera actuator 1100 may be used interchangeably with a "first actuator," and the second camera actuator 1200 may be used interchangeably with a "second actuator."

The cover CV may cover the first camera actuator 1100 and the second camera actuator 1200. It is possible to increase a coupling force between the first camera actuator 1100 and the second camera actuator 1200 by the cover CV.

Furthermore, the cover CV may be made of a material which blocks electromagnetic waves. Therefore, it is possible to easily protect the first camera actuator 1100 and the second camera actuator 1200 in the cover CV.

In addition, the first camera actuator 1100 may be an optical image stabilizer (OIS) actuator. For example, the first camera actuator 1100 may move an optical member in a direction perpendicular to an optical axis.

The first camera actuator 1100 may include a fixed focal length lens disposed in a predetermined barrel (not shown). The fixed focal length lens may be referred to as a "single focal length lens" or a "single lens."

The first camera actuator 1100 may change an optical path. In the embodiment, the first camera actuator 1100 may change the optical path vertically through an optical member (e.g., a prism or a mirror) therein. With this configuration, even when a thickness of a mobile terminal is decreased, a lens with a focal length that is greater than the thickness of the mobile terminal is disposed in the mobile terminal through a change in the optical path so that zooming, auto focusing (AF), and OIS functions may be performed.

However, the present invention is not limited thereto, and the first camera actuator 1100 may change the optical path at a right angle or a predetermined angle a plurality of times.

The second camera actuator 1200 may be disposed at a rear end of the first camera actuator 1100. The second camera actuator 1200 may be coupled to the first camera actuator 1100. In addition, mutual coupling may be performed by various methods.

In addition, the second camera actuator 1200 may be a zoom actuator or an AF actuator. For example, the second camera actuator 1200 may support one or more lenses and perform an AF function or a zooming function by moving the lenses according to a predetermined control signal of a control part.

In addition, the one or more lenses independently or separately move in an optical axis direction.

The circuit board 1300 may be disposed at a rear end of the second camera actuator 1200. The circuit board 1300 may be electrically connected to the second camera actuator 1200 and the first camera actuator 1100. In addition, a plurality of circuit boards 1300 may be provided. The circuit board 1300 may include an image sensor and the like and include a connector electrically connected to external other camera modules or a processor of a terminal.

The camera module according to the embodiment may be formed as a single camera module or a plurality of camera modules. For example, the plurality of camera modules may include a first camera module and a second camera module.

In addition, the first camera module may include a single actuator or a plurality of actuators. For example, the first camera module may include the first camera actuator 1100 and the second camera actuator 1200.

In addition, the second camera module may be disposed in a predetermined housing (not shown) and include an actuator (not shown) which may drive a lens unit. The actuator may be a voice coil motor, a micro actuator, a silicone actuator, or the like and applied in various methods, such as an electrostatic method, a thermal method, a bimorph method, and an electrostatic force method but is not limited thereto. In addition, in the specification, the camera actuator may be referred to as an actuator or the like. In addition, a camera module including a plurality of camera modules may be mounted in various electronic devices such as a mobile terminal. For example, the electronic device may include any of smartphones, portable terminals (e.g., phones), mobile terminals, and the like.

Referring to FIG. 3, the camera module according to the embodiment may include the first camera actuator 1100 for performing the OIS function and the second camera actuator 1200 for performing the zooming function and the AF function.

Light may enter the camera module or the first camera actuator through an opening region positioned in an upper surface of the first camera actuator 1100. In other words, the light enter the first camera actuator 1100 in an optical axis direction (e.g., an X-axis direction), and the optical path may be changed in a vertical direction (e.g., a Z-axis direction) through the optical member. In addition, the optical axis direction (Z-axis direction) may correspond to a moving direction of the light reflected by the optical member and will be described based on this. In addition, the light may pass through the second camera actuator 1200 and may be incident on an image sensor IS positioned at one end of the second camera actuator 1200 (PATH).

In the specification, the bottom surface refers to one side in a first direction. In addition, the first direction is the X-axis direction in the drawings and may be used interchangeably with a second axis direction or the like. A second direction is a Y-axis direction in the drawings and may be used interchangeably with a first axis direction or the like. The second direction is a direction perpendicular to the first direction. In addition, a third direction is the Z-axis direction in the drawings and may be used interchangeably with a third axis direction or the like. In addition, the third direction is perpendicular to both the first direction and the second direction. Here, the third direction (Z-axis direction) corresponds to the optical axis direction, and the first direction (X-axis direction) and the second direction (Y-axis direction) are directions perpendicular to the optical axis and may be tilted by the second camera actuator. In addition, hereinafter, the optical axis direction is a third direction (Z-axis direction) in the description of the first camera actuator 1100 or the second camera actuator 1200 and will be described below based on this.

In addition, in the specification, an inward direction may be a direction from the cover CV toward the first camera actuator, and an outward direction may be a direction opposite to the inward direction. In other words, the first camera actuator and the second camera actuator may be positioned inward from the cover CV, and the cover CV may be positioned outward from the first camera actuator or the second camera actuator.

In addition, with this configuration, the camera module according to the embodiment may reduce the spatial limitations of the first camera actuator and the second camera actuator by changing the optical path. In other words, the camera module according to the embodiment may extend the optical path while minimizing the thickness of the camera module in response to the change in the optical path. Furthermore, it should be understood that the second camera actuator may provide a high magnification by controlling a focus or the like in the extended optical path.

In addition, the camera module according to the embodiment may implement an OIS by controlling the optical path through the first camera actuator, thereby minimizing the occurrence of a decentering or tilting phenomenon and providing the best optical characteristics.

Furthermore, the second camera actuator 1200 may include an optical system and a lens driving unit. For example, at least one of a first lens assembly, a second lens assembly, a third lens assembly, and a guide pin may be disposed in the second camera actuator 1200.

In addition, the second camera actuator 1200 may include a coil and a magnet and perform a high-magnification zooming function.

For example, the first lens assembly and the second lens assembly may be moving lenses that each move through the coil, the magnet, and a guide pin, and the third lens assembly may be a fixed lens, but the present invention is not limited thereto. For example, the third lens assembly may perform a function of a focator which collects light to form an image at a specific position, and the first lens assembly may perform a function of a variator for re-forming an image formed at the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed at the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed at the first lens assembly which is the variator. For example, the first lens assembly and the second lens assembly may be driven by an electromagnetic force due to the interaction between the coil and the magnet. The above description may be applied to a lens assembly to be described below. In addition, the first lens assembly to the third lens assembly may move in the optical axis direction, that is, the third direction. In addition, the first lens assembly to the third lens assembly may move in the third direction independently of or depending on each other.

Meanwhile, when the OIS actuator and the AF actuator or the zoom actuator are disposed according to the embodiment of the present invention, the magnetic field interference with an AF magnet or a zoom magnet can be prevented when an OIS is driven. Since a first driving magnet of the first camera actuator 1100 is disposed separately from the second camera actuator 1200, the magnetic field interference between the first camera actuator 1100 and the second camera actuator 1200 can be prevented. In the specification, an OIS may be used interchangeably with terms such as hand shaking correction, optical image stabilization, optical image correction, shake correction, or the like.

FIG. 4 is a perspective view of a first camera actuator according to a first embodiment, FIG. 5 is an exploded perspective view of the first camera actuator according to the first embodiment, FIG. 6 is a perspective view of a housing according to the embodiment, and FIG. 7 is a view of the housing according to the embodiment.

Referring to FIGS. 4 to 7, a first camera actuator 1100 according to the first embodiment includes a shield can 1110, a housing 1120, a mover 1130, a rotational unit 1140, an elastic member EE, a first driving unit 1150, a first member 1131a, a second member 1126, and a damper member DP.

The mover 1130 may include a holder 1131 and an optical member 1132 seated on the holder 1131. In addition, the rotational unit 1140 may include a tilting guide unit 1141. In addition, the first driving unit 1150 includes a driving magnet 1151, a driving coil 1152, a Hall sensor unit 1153, a board unit 1154, and a yoke unit 1155.

The shield can 1110 may be positioned at an outermost side of the first camera actuator 1100 and positioned to surround the rotational unit 1140, the first driving unit 1150, the housing 1120, and the like, which will be described below.

The shield can 1110 may block or reduce the influence of electromagnetic waves generated from the outside. In other words, the shield can 1110 may reduce the number of occurrences of the malfunction of the rotational unit 1140 or the first driving unit 1150.

The housing 1120 may be positioned inside the shield can 1110. In addition, the housing 1120 may be positioned inside the board unit 1154 to be described below. The housing 1120 may be fastened by being fitted into or engaged with the shield can 1110. The housing 1120 may be used interchangeably with a "first housing."

The housing 1120 may include a first housing side portion 1121, a second housing side portion 1122, a third housing side portion 1123, and a fourth housing side portion 1124.

The first housing side portion 1121 and the second housing side portion 1122 may be disposed to face each other. In addition, the third housing side portion 1123 and the fourth housing side portion 1124 may be disposed between the first housing side portion 1121 and the second housing side portion 1122.

The third housing side portion 1123 may be in contact with the first housing side portion 1121, the second housing side portion 1122, and the fourth housing side portion 1124. In addition, the third housing side portion 1123 may have a bottom surface of the housing 1120. In addition, the first housing side portion 1121, the second housing side portion 1122, and the fourth housing side portion 1124 may have side surfaces.

In addition, as described above, the third direction (Z-axis direction) may correspond to the optical axis direction (with respect to moving light reflected from the optical member), and the first direction (X-axis direction) and the second direction (Y-axis direction) are directions perpendicular to the optical axis and may be tilted by the first camera actuator. A detailed description thereof will be given below.

In addition, the first housing side portion 1121 may include a first housing hole 1121a. A first coil 1152a to be described below may be positioned in the first housing hole 1121a.

In addition, the second housing side portion 1122 may include a second housing hole 1122a. A second coil 1152b to be described below may be positioned in the second housing hole 1122a.

The first coil 1152a and the second coil 1152b may be coupled to the board unit 1154. In an embodiment, the first coil 1152a and the second coil 1152b may be electrically connected to the board unit 1154, and a current may flow therethrough. The current is an element of an electromagnetic force by which the first camera actuator may tilt with respect to the X-axis.

In addition, the third housing side portion 1123 may include a third housing hole 1123a and a housing groove 1123b'.

A third coil 1152c to be described below may be positioned in the third housing hole 1123a. The third coil 1152c may be coupled to the board unit 1154. In addition, the third coil 1152c may be electrically connected to the board unit 1154 and a current may flow therethrough. The current is an element of an electromagnetic force by which the first camera actuator may tilt with respect to the Y-axis.

A second member 1126 to be described below may be seated in the housing groove 1123b'. The second member 1126 may be used interchangeably with a "housing rigid" or a "housing additional member."

In addition, the housing groove 1123b' may extend from the third housing side portion 1123 to the first housing side portion 1121 and the second housing side portion 1122. In other words, the housing groove 1123b' may be positioned in the first housing side portion 1121, the second housing side portion 1122, and the third housing side portion 1123. Therefore, the second member 1126 may be coupled to the first housing side portion 1121, the second housing side portion 1122, and the third housing side portion 1123. As in the first camera actuator according to the embodiment, the second member 1126 may be seated in a housing groove formed by a protrusion or the like and coupled to the housing 1120. The second member 1126 may be coupled to the housing 1120 by the above description. However, the mover 1130, the tilting guide unit 1141, the second member 1126, and the first member 1131a, which will be described below, may sequentially be stacked on the fourth housing side portion 1124 due to the coupling using the housing groove. Therefore, it is possible to improve the ease of assembly. Alternatively, the second member 1126 may also be integrally formed with the housing 1120. In addition, the first member 1131a may be used interchangeably with a "mover rigid" or a "mover additional member."

In addition, the camera module according to the embodiment may include a fixed member, and the fixed member may be a component that does not move when first axis tilting or second axis tilting of the camera actuator is performed. In an embodiment, the fixed member may include at least one of the housing 1120 and the second member 1126. The following specification will be described based on this.

The elastic member EE may be positioned between the mover 1130 and the fixed member. In addition, the tilting guide unit 1141 may be positioned between the fixed member and the mover. In addition, the elastic member EE may allow the tilting guide unit 1141 to be in close contact with the fixed member and the mover by pulling the mover 1130 to the fixed member. In other words, the elastic member EE pulls the mover 1130 to the fixed member, and thus the tilting guide unit 1141 may be pressed by the fixed member and the mover. In addition, the elastic member EE may allow the tilting guide unit 1141 to be in close contact with the mover 1130. In other words, the elastic member EE may pull the mover 1130 to the housing 1120 or the second member 1126, which is the fixed member. This structure will be described below.

In addition, the fourth housing side portion 1124 may be disposed between the first housing side portion 1121 and the second housing side portion 1122 and may be in contact with the first housing side portion 1121, the second housing side portion 1122, and the third housing side portion 1123.

The fourth housing side portion 1124 may be in contact with the second camera actuator connected to the first camera actuator. Therefore, the fourth housing side portion 1124 may include a protrusion and a groove or a plurality of grooves formed at an outer surface 1124b of the housing. Therefore, the fourth housing side portion may provide easy coupling with another camera actuator adjacent thereto. In other words, it is possible to further improve the coupling force between the second camera actuator and the first camera actuator through the fourth housing side portion 1124. In addition, with this configuration, the fourth housing side portion may provide an optical path and also improve the coupling force with another component to suppress the movement of an opening due to separation or the like, thereby minimizing a change in the optical path.

In addition, the fourth housing side portion 1124 may include an opening region 1124a. Light whose path has been changed may move from the optical member of the first camera actuator to the second camera actuator through the opening region 1124a. As described above, the auto focusing and/or zooming function may be performed by the second camera actuator, and the OIS function may be performed in the first camera actuator.

In addition, the housing 1120 may include an accommodating portion 1125 formed by the first housing side portion 1121 to the fourth housing side portion 1124. Components such as the second member 1126, the first member 1131a, the tilting guide unit 1141, the mover 1130, and the elastic member EE may be positioned in the accommodating portion 1125.

The second member 1126 may be disposed in and coupled to the housing 1120. The second member 1126 may be disposed within the housing or connected to the housing 1120. In addition, the second member 1126 may be easily coupled to the housing 1120. In an embodiment, the second member 1126 may be coupled to the third housing side portion 1123 by seating in or at least partially passing through the housing groove 1123b' formed in the third housing side portion 1123. Therefore, the second member 1126 may be coupled to the housing 1120 and may maintain fixation between the mover 1130 and the tilting guide unit 1141, which will be described below.

In addition, the second member 1126 may include first coupling portions PP1 disposed in regions adjacent to the first housing side portion 1121 and the second housing side portion 1122. As a modified example, the first coupling portion PP1 may also be disposed on an outer surface of the fourth housing side portion 1124 of the housing 1120. In addition, the first coupling portion PP1 may be formed as a protrusion. In addition, the first coupling portion PP1 may be coupled to a first bonding portion EP1. As will be described below, the first coupling portion PP1 may be inserted into a first bonding hole of the first bonding portion EP1.

In addition, the second member 1126 includes a second protrusion groove PH2 in which a second protrusion of the tilting guide unit is seated. Therefore, the second member 1126 causes the protrusion of the tilting guide unit to be disposed adjacent to the optical member within a fourth seating groove. Therefore, the protrusion serving as a reference axis of tilt may be disposed close to the center of gravity of the mover 1130. Therefore, since a moment for moving the mover 1130 for tilt is minimized when tilting is performed, it is also possible to minimize current consumption for driving the coil, thereby reducing power consumption.

In addition, the second member 1126 may be formed integrally with or separately from the housing 1120 as described above. When the second member 1126 and the housing 1120 are formed integrally, it is possible to improve a coupling force between the second member 1126 and the housing 1120, thereby improving the reliability of the camera actuator. In addition, when the second member 1126 and the housing 1120 are formed separately, it is possible to improve the ease of assembling and manufacturing the second member 1126 and the housing 1120. Hereinafter, description based on the second member 1126 and the housing formed separately will be given.

The mover 1130 includes the holder 1131 and the optical member 1132 seated on the holder 1131.

First, the holder 1131 may be seated in the accommodating portion 1125 of the housing 1120. The holder 1131 may include a first holder outer surface to a fourth holder outer surface corresponding to the first housing side portion 1121, the second housing side portion 1122, the third housing side portion 1123, and the fourth housing side portion 1124, respectively. In addition, the holder 1131 may include the first member 1131a disposed in a fourth seating groove 1131S4a. A detailed description thereof will be given below.

The optical member 1132 may be seated on the holder 1131. To this end, the holder 1131 may have a seating surface, and the seating surface may be formed by the accommodating groove. In an embodiment, the optical member 1132 may be formed as a mirror. Hereinafter, although shown based on a mirror, the optical member 1132 may also be formed as a plurality of lenses as in the above-described embodiment. For example, the optical member 1132 may include a reflector disposed therein. However, the present invention is not limited thereto. The optical member 1132 may reflect light reflected from the outside (e.g., an object) into the camera module. In other words, the optical member 1132 may reduce spatial limitations of the first camera actuator and the second camera actuator by changing the path of the reflected light. As described above, it should be understood that the camera module may also provide a high magnification by extending the optical path while minimizing the thickness.

Additionally, the first member 1131a may be coupled to the holder 1131. The first member 1131a may be in contact with a protrusion positioned in a region of the holder 1131 other than the fourth seating groove of the fourth holder outer surface. The first member 1131a may be formed integrally with the holder 1131. Alternatively, the first member 1131a may be formed in a structure separated from the holder 1131. Even when the first member 1131a and the holder 1131 are integrally coupled, the fourth seating groove may be positioned in the holder 1131. In addition, when the first member 1131a is not coupled to the holder 1131, the fourth seating groove is open downward and rearward, but when the first member 1131a is coupled, the fourth seating groove may be open downward.

The elastic member EE may be disposed between the tilting guide unit 1141 and the housing 1120. In particular, the elastic member EE may be sequentially disposed on the tilting guide unit 1141, the second member 1126, and the first member 1131a. Therefore, the elastic member EE may be disposed on the first member 1131a.

The elastic member EE may be made of an elastic material, may couple the second member 1126 with the first member 1131a, and provide an elastic force to the first member 1131a and the holder 1131 connected to the first member 1131a with respect to the second member 1126 fixed to the housing 1120.

Therefore, the elastic member EE may be coupled to the housing 1120 and the mover 1130 between the housing 1120 and the mover 1130 and may press the tilting guide unit 1141 through the mover 1130. Therefore, the mover 1130 may tilt to the X-axis and/or tilt to the Y-axis through the tilting guide unit 1141.

Portions of the elastic member EE that are in contact with the first member 1131*a* (or the holder 1131) and the housing 1120 may be spaced apart from each other in the third direction (Z-axis direction). The elastic member EE may have a preload due to a separated distance between the contacting portions described above (first and second bonding portions to be described below). In addition, the preload may be transmitted to the tilting guide unit 1141 through the mover 1130 and the second member 1126 through the tilting guide unit 1141. Therefore, the tilting guide unit 1141 disposed between the mover 1130 and the second member 1126 may be pressed by the elastic member EE. In other words, a force by which the tilting guide unit 1141 is positioned between the mover 1130 and the second member 1126 may be maintained. Therefore, the position of the tilting guide unit 1141 may be maintained between the mover 1130 and the housing 1120 without separation even when X-axis tilting or Y-axis tilting is performed.

In addition, the rotational unit 1140 may include the tilting guide unit 1141.

The tilting guide unit 1141 may be coupled to the mover 1130 and the housing 1120 described above. In addition, the tilting guide unit 1141 may be disposed between the mover 1130 and the second member 1126 and coupled to the mover 1130 and the housing 1120. In other words, the tilting guide unit 1141 may be disposed between the second member 1126 and the holder 1131. The tilting guide unit 1141 may be positioned between the second member 1126 and the fourth seating groove 1131S4*a* of the holder 1131.

Therefore, in the camera actuator according to the embodiment, the first member 1131*a*, the second member 1126, the tilting guide unit 1141, the holder 1131, and the fourth housing side portion 1124 may be disposed sequentially in the third direction (Z-axis direction).

In addition, the tilting guide unit 1141 may be disposed adjacent to the optical axis. Therefore, the camera actuator according to the embodiment may easily change the optical path according to the first axis tilt and the second axis tilt to be described below.

In an embodiment, the tilting guide unit 1141 may include first protrusions disposed to be spaced apart from each other in the first direction (X-axis direction) and second protrusions disposed to be spaced apart from each other in the second direction (Y-axis direction). In addition, the first protrusion and the second protrusion may protrude in opposite directions. A detailed description thereof will be given below. Furthermore, the tilting guide unit 1141 may include a hemisphere or a circle coupled to a base like the first protrusion and the second protrusion. In addition, the tilting guide unit 1141 may include the base or a plate and a plurality of spheres or balls passing through the plate.

The first driving unit 1150 includes the driving magnet 1151, the driving coil 1152, the Hall sensor unit 1153, the board unit 1154, and the yoke unit 1155. The above-described contents may be applied to a description thereof in the same manner.

The damper member DP may be disposed between at least one of the mover 1130 and the housing 1120 and the elastic member EE. Therefore, the damper member DP may be coupled to at least one of the mover 1130 and the housing 1120 and the elastic member EE. In addition, the damper member DP may be coupled to at least one group of the elastic member EE and the mover 1130 and the elastic member EE and the housing 1120. For example, the damper member DP may be coupled to the elastic member EE and the mover 1130. In addition, the damper member DP may be coupled to the elastic member EE and the housing 1120.

Furthermore, the first member 1131*a* and the second member 1126 may be considered as elements of the mover 1130 and the housing 1120, respectively. Therefore, the damper member DP may be coupled to the elastic member EE and the first member 1131*a* of the mover 1130. In addition, the damper member DP may be coupled to the elastic member EE and the second member 1126 of the housing 1120. Furthermore, the damper member DP may also be disposed to connect separate regions of the elastic member EE. A detailed description thereof will be given below in various embodiments. In addition, hereinafter, the damper member DP may be expressed as symbols of DP, DP1, DP2, DP3, and the like according to the position of the damper member DP.

FIG. 8 is a perspective view of the mover according to the embodiment.

Referring to FIG. 8, the optical member 1132 may be seated on a holder. The optical member 1132 may be a right angle optical member as a reflector, but the present invention is not limited thereto.

In an embodiment, the optical member 1132 may have a structure protruding from a portion of an outer surface. The optical member 1132 may be easily coupled to the holder through the protruding structure. In addition, a bottom surface 1132*b* of the optical member 1132 may be seated on the seating surface of the holder. Therefore, the bottom surface 1132*b* of the optical member 1132 may correspond to the seating surface of the holder. In an embodiment, the bottom surface 1132*b* may be formed to have the same inclined surface as the seating surface of the holder. Therefore, it is possible to prevent the optical member 1132 from being separated from the holder due to the movement as the optical member moves with the movement of the holder.

In addition, as described above, the optical member 1132 may be formed in a structure capable of reflecting light reflected from the outside (e.g., an object) into the camera module. As in the embodiment, the optical member 1132 may be formed as a single mirror. In addition, the optical member 1132 may be formed as a prism. For example, the optical member 1132 may be formed as an optical element formed of any material or structure that changes the optical path. The optical member 1132 may reduce spatial limitations of the first camera actuator and the second camera actuator by changing the path of the reflected light. As described above, it should be understood that the camera module may also provide a high magnification by extending the optical path while minimizing the thickness. As described above, it should be understood that the camera module including the camera actuator according to the embodiment may also provide a high magnification by extending the optical path while minimizing the thickness.

FIG. 9 is a perspective view of a holder according to the embodiment, FIG. 10 is a bottom view of the holder according to the embodiment, and FIG. 11 is a side view of the holder according to the embodiment.

Referring to FIGS. 9 to 11, the holder 1131 may include a seating surface 1131*k* on which the optical member 1132 is seated. The seating surface 1131*k* may be an inclined surface. In addition, the holder 1131 may include a jaw portion 1131*b* on the seating surface 1131*k*. In addition, the jaw portion 1131*b* of the holder 1131 may be coupled to the protruding structure of the optical member 1132.

The holder 1131 may include a plurality of outer surfaces. For example, the holder 1131 may include a first holder outer surface 1131S1, a second holder outer surface 1131S2, a third holder outer surface 1131S3, and a fourth holder outer surface 1131S4. The description of the above-described embodiment may be applied to a description thereof in the same manner.

Specifically, the fourth holder outer surface 1131S4 may include the fourth seating groove 1131S4*a*. In addition, the first member 1131*a*, the second member 1126, and the tilting guide unit 1141 may be sequentially positioned in the fourth seating groove 1131S4*a* in the third direction (Z-axis direction).

In an embodiment, the fourth seating groove 1131S4*a* may include a plurality of regions. The fourth seating groove 1131S4*a* may include a first region AR1, a second region AR2, and a third region AR3.

The first member 1131*a* may be positioned in the first region AR1. In other words, the first region AR1 may overlap the first member 1131*a* in the first direction (X-axis direction).

The second member 1126 may be positioned in the second region AR2. In other words, the second region AR2 may overlap the second member 1126 in the first direction (X-axis direction).

The tilting guide unit 1141 may be positioned in the third region AR3. In addition, the third region AR3 may overlap the tilting guide unit 1141 in the first direction (X-axis direction). In particular, the third region AR3 may overlap the base of the tilting guide unit 1141 in the first direction (X-axis direction).

In addition, according to an embodiment, the second region AR2 may be positioned between the first region AR1 and the third region AR3. In addition, the first region AR1, the second region AR2, and the third region AR3 may have different heights in the first direction (X-axis direction). In an embodiment, the first region AR1 may have a greater height than the second region AR2 and the third region AR3 in the first direction (X-axis direction). Therefore, a step may be positioned between the first region AR1 and the second region AR2.

The first member 1131*a* may be seated on the fourth holder outer surface 1131S4. A second coupling portion PP2 may be positioned on an outer surface (e.g., a surface opposite to a surface facing the second member) of the first member 1131*a*. The second coupling portion PP2 may include a coupling base PP2*a* and a second coupling protrusion PP2*b*. The second coupling portion PP2 may be disposed to overlap a first protrusion to be described below in the first direction (X-axis direction).

A plurality of second coupling protrusions PP2*b* may be disposed to be spaced apart from each other in the second direction (Y-axis direction). In this case, all bisectors between the plurality of second coupling protrusions PP2*b* may be positioned on an apex of the first protrusion and the first direction (X-axis direction).

In an embodiment, a tilting guide unit may be accommodated in the fourth seating groove 1131S4*a*. In addition, as described above, the first member 1131*a* may also be accommodated in the fourth seating groove 1131S4*a*. In this case, the first member 1131*a* may be disposed on an outer side of the tilting guide unit within the fourth seating groove 1131S4*a*. More specifically, the first member 1131*a*, a portion of the second member, and the tilting guide unit may be sequentially disposed in the fourth seating groove 1131S4*a* in the third direction (Z-axis direction). In other words, the first member 1131*a* may be disposed in the upper region AR1 of the fourth seating groove 1131S4*a*. In addition, the tilting guide unit may be disposed in the lower region AR3 of the fourth seating groove 1131S4*a*. In addition, a portion of the second member may be disposed in a middle region AR2 between the upper region and the lower region. Therefore, at least a portion of the second member may be disposed between the tilting guide unit and the first member 1131*a*. In addition, the first member 1131*a* and the second member may at least partially overlap in the fourth seating groove 1131S4*a*.

In addition, in an embodiment, the holder 1131 of the mover 1130 may include a mover protrusion 1131*p* protruding toward a spring or outward from the fourth holder outer surface 1131S4.

The holder 1131 of the mover 1130 may have a plurality of protrusions 1131*ap*. For example, the mover protrusion 1131*p* may include a first protrusion 1131*ap*1, a second protrusion 1131*ap*2, and a third protrusion 1131*ap*3.

The first protrusion 1131*ap*1 and the second protrusion 1131*ap*2 may be disposed to be spaced apart from each other in the first direction (X-axis direction). In addition, the first protrusion 1131*ap*1 and the second protrusion 1131*ap*2 may overlap in the first direction (X-axis direction).

Furthermore, a mover groove 1131*h* may be included between the first protrusion 1131*ap*1 and the second protrusion 1131*ap*2 according to the embodiment. The mover groove 1131*h* may correspond to a region between the first protrusion 1131*ap*1 and the second protrusion 1131*ap*2 in the first direction (X-axis direction).

The elastic member may be disposed in the mover groove 1131*h*. In addition, the elastic member may pass through the mover groove 1131*h*.

Furthermore, the third protrusion 1131*ap*3 may be disposed inside the mover groove 1131*h*. In other words, the mover groove 1131*h* may be surrounded by the first protrusion 1131*ap*1, the second protrusion 1131*ap*2, and the third protrusion 1131*ap*3.

In addition, the third protrusion 1131*ap*3 may be positioned adjacent to the mover groove 1131*h*. Therefore, the mover groove 1131*h* and the third protrusion 1131*ap*3 may at least partially overlap in the second direction (Y-axis direction). Furthermore, at least a portion of the third protrusion 1131*ap*3 may overlap the first protrusion 1131*ap*1 or the second protrusion 1131*ap*2 in the second direction (Y-axis direction). With this configuration, even when the damper member is applied on the mover groove 1131*h*, the damper member may not flow outward due to the first protrusion 1131*ap*1, the second protrusion 1131*ap*2, and the third protrusion 1131*ap*3. In addition, the third protrusion 1131*ap*3 may prevent the damper member from moving inward, that is, toward the first member.

In an embodiment, a width or length W1 of the first protrusion 1131*ap*1 in the first direction (X-axis direction) and a width or length W2 of the second protrusion 1131*ap*2 in the first direction (X-axis direction) may be the same or different from each other. In this case, the third protrusion 1131*ap*3 may be greater than a separation distance between the first protrusion 1131*ap*1 and the second protrusion 1131*ap*2 in the first direction (X-axis direction). Therefore, the third protrusion 1131*ap*3 can easily suppress the inward movement of the damper member.

In addition, the mover groove 1131*h* may have a step portion ST. For example, the step portion ST of the mover groove 1131*h* may be lower in any one of an inner region 1131*hi* and an outer region 1131*ho*. In an embodiment, the step portion ST in an inward direction (toward a first protrusion groove PH1) may be lower than the step portion ST in an outward direction. Therefore, blurring in the inward direction of the damper member can be suppressed. In addition, the mover groove 1131*h* may be a groove region formed by the first protrusion 1131*ap*1 and the second protrusion 1131*ap*2. In addition, the mover groove 1131*h* may be a groove formed downward from a lower surface of the first protrusion 1131*ap*1 or the second protrusion 1131*ap*2.

FIG. 12 is a plan view of an elastic member according to the embodiment, FIG. 13 is a side view of the elastic member according to the embodiment, FIG. 14 is a top view of the elastic member according to the embodiment, FIG. 15 is a view for describing coupling between a first member, the second member, and the elastic member in the first camera actuator according to the first embodiment, and FIG. 16 is an enlarged view of portion K in FIG. 15.

Referring to FIGS. 12 to 16, the elastic member EE according to the embodiment includes a first bonding portion EP1, a second bonding portion EP2, and a connecting portion CP.

The first bonding portion EP1 may be connected to the housing 1120, and the first bonding portion EP1 and the housing 1120 may be coupled to each other. A plurality of first bonding portions EP1 may be provided. Hereinafter, description based on two first bonding portions EP1 will be given.

In addition, the first bonding portion EP1 may be coupled to the fixed member. In other words, the first bonding portion EP1 may be coupled to the housing 1120 or the second member 1126. Hereinafter, as shown in the drawing, the first bonding portion EP1 may be coupled to the second member 1126.

In addition, the second bonding portion EP2 may be connected to the first member 1131*a*, and the second bonding portion EP2 and the first member 1131*a* may be coupled to each other.

The connecting portion CP may be disposed between the first bonding portion EP1 and the second bonding portion EP2. In other words, the connecting portion CP may have one end connected to the first bonding portion EP1 and the other end connected to the second bonding portion EP2.

In an embodiment, the second bonding portion EP2 may be positioned between a plurality of first bonding portions EP1 disposed to be spaced apart from each other. Specifically, the second bonding portion EP2 may be disposed between the mover 1130 and the first bonding portion EP1. In other words, the second bonding portion EP2 may be disposed to be spaced apart from the first bonding portion EP1 in the third direction (Z-axis direction). Therefore, the connecting portion CP may extend from the first member 1131*a* toward the second member 1126. Alternatively, the connecting portion CP may extend in the third direction (Z-axis direction). For example, the connecting portion CP may have a curved shape from the first bonding portion EP1 to the second bonding portion EP2. Therefore, since the first bonding portion EP1 is fixed (the housing is fixed), an elastic restoring force generated from the elastic member EE may be formed from the second bonding portion EP2 toward the first bonding portion EP1. Therefore, a force may also be generated from the second bonding portion EP2 toward the first bonding portion EP1 in the first member 1131*a* connected to the second bonding portion EP2 and the mover 1130 coupled to the first member 1131*a*. Therefore, the above-described force may be applied between the mover 1130 and the tilting guide unit 1141. In addition, finally, since the tilting guide unit 1141 presses the second member 1126, the tilting guide unit 1141 may maintain its position between the mover 1130 and the second member 1126 (or the housing) so that first axis tilting or second axis tilting may be performed. In addition, the preload, which is the force described above, may be applied to the elastic member EE due to a separation distance dd1 between the first bonding portion EP1 and the second bonding portion EP2 in the third direction (Z-axis direction).

In addition, the second bonding portion EP2 of the elastic member EE may not be disposed on the first bonding portion EP1 of the elastic member EE and a surface in contact with the second member 1126, which is a fixed member. In other words, the second bonding portion EP2 of the elastic member EE may not be disposed on a plane (plane XY) of one surface (e.g., the surface in contact with the second member) of the first bonding portion EP1 of the elastic member EE or the surface in contact with the second member. In other words, as described above, the first bonding portion EP1 and the second bonding portion EP2 may be positioned on different planes XY and spaced apart from each other in the third direction (Z-axis direction). Therefore, the second bonding portion EP2 may be positioned closer to a reflective member than the first bonding portion EP1.

In addition, in an embodiment, even when the preload is formed in a direction opposite to the third direction (e.g., a direction from the tilting guide unit toward the second member), the position of the tilting guide unit 1141 may be easily maintained. In addition, since a magnetic substance or the like is not used, it is possible to prevent the malfunction of another camera actuator (e.g., the second camera actuator) adjacent to the first camera actuator due to a magnetic force. In addition, the camera actuator according to the embodiment can be easily miniaturized using an elastic member having a lighter weight and a smaller thickness without using the magnetic substance or the like. In addition, the second bonding portion EP2 may be disposed between the mover 1130 and the first bonding portion EP1.

In addition, in an embodiment, the first bonding portion EP1 may include a first flat region EP1*f* and a plurality of first bonding holes EP1*h* positioned in the first flat region EP1*f*.

An inner surface of the first flat region EP1*f* may be disposed to be spaced apart from a contact region CA1 in which the housing and the first flat region EP1*f* are in contact with each other in the second direction (Y-axis direction). In other words, the inner surface of the first flat region EP1*f* may be positioned inward from the contact region CA1 in which the housing and the first flat region EP1*f* are in contact with each other.

Therefore, the second member 1126 in contact with the first flat region EP1*f* may not interfere with the connecting portion CP. Therefore, the camera actuator according to the embodiment may provide accurate X-axis tilt and/or Y-axis tilt.

In addition, the second bonding portion EP2 may include a second flat region EP2*f* and a plurality of second bonding holes EP2*h* positioned in the second flat region EP2*f*.

An outer surface EP2*s* of the second flat region EP2*f* may be disposed to be spaced apart from a contact region CA2 in contact with a coupling base PP2*a* of the first member 1131*a*. In other words, an outer surface EP2*d* of the second flat region EP2*f* may be positioned outward from an outer surface of the coupling base PP2*a*. Therefore, the first member 1131*a* in contact with the second flat region EP2*f* may not interfere with the connecting portion CP. Therefore, the camera actuator according to the embodiment may provide accurate X-axis tilt and/or Y-axis tilt.

In addition, a plurality of first bonding holes EP1$h$ and a plurality of second bonding holes EP2$h$ may be provided.

In addition, the first bonding holes EP1$h$ may be disposed to be spaced apart from each other in the first direction (X-axis direction). In addition, the second bonding holes EP2$h$ may be disposed to be spaced apart from each other in the second direction (Y-axis direction).

In an embodiment, a length dd3 (e.g., a diameter) of the second bonding hole EP2$h$ in the first direction (X-axis direction) may be smaller than a length dd2 between the plurality of first bonding holes EP1$h$ in the first direction (X-axis direction).

In addition, the second bonding hole EP2$h$ may be positioned between the first bonding holes EP1$h$. For example, the second bonding hole EP2$h$ may be disposed on a first virtual line LX1 bisecting the first bonding hole EP1$h$. Therefore, in the camera actuator according to the embodiment, the force pressed by the elastic member EE may be uniformly provided to both of an upper portion and a lower portion of the mover.

When Y-axis tilting is performed, the amount of current provided to the first coil and the second coil may not be changed differently depending on positive (+)/negative (−) with respect to the Y-axis. In other words, a change width of the current provided to the first coil and the second coil may be uniform in response to the position of the mover. Therefore, the Y-axis tilting can be easily controlled. Furthermore, since the elastic restoring force of the elastic member EE is uniformly formed in one region, the reliability of the elastic member EE can be improved.

In addition, a second virtual line LX2 connecting the center of the first bonding hole EP in the first bonding portion EP1 (or the first flat region) and a third virtual line LX3 bisecting the second bonding hole EP2$h$ may be parallel to each other. Therefore, in the camera actuator according to the embodiment, the force pressed by the elastic member EE may also be uniformly provided to the movement of the mover.

When X-axis tilting is performed, the amount of current provided to the third coil may not be changed differently depending on positive (+)/negative (−) with respect to the X-axis. In other words, a change width of the current provided to the third coil may be uniform in response to the position of the mover. Therefore, the X-axis tilting can be easily controlled. Furthermore, since the elastic restoring force of the elastic member EE is uniformly formed in one region, the reliability of the elastic member EE can be improved.

In addition, the second virtual line LX2 and the third virtual line LX3 may be parallel to the first direction (X-axis direction).

In an embodiment, the connecting portion CP may include a first connecting portion CP1, a second connecting portion CP2, a third connecting portion CP3, and a fourth connecting portion CP4, which are positioned between the first bonding portion EP1 and the second bonding portion EP2. Furthermore, a plurality of connecting portions CP may be provided.

Specifically, the first connecting portion CP1, the second connecting portion CP2, the third connecting portion CP3, and the fourth connecting portion CP4 may be sequentially disposed from the first bonding portion EP1 to the second bonding portion EP2. In other words, the first connecting portion CP1, the second connecting portion CP2, the third connecting portion CP3, and the fourth connecting portion CP4 may be sequentially disposed from inside toward outside.

In addition, the first connecting portion CP1, the second connecting portion CP2, the third connecting portion CP3, and the fourth connecting portion CP4 may be disposed symmetrically with respect to the second bonding portion EP2. In addition, the first connecting portion CP1, the second connecting portion CP2, the third connecting portion CP3, and the fourth connecting portion CP4 may be disposed symmetrically with respect to the third virtual line LX3. In addition, the first connecting portion CP1, the second connecting portion CP2, the third connecting portion CP3, and the fourth connecting portion CP4 may be disposed symmetrically with respect to the first virtual line LX1.

One end of the first connecting portion CP1 may be in contact with the first bonding portion EP1. In addition, the first connecting portion CP1 may extend toward the second bonding portion EP2. In other words, the first connecting portion CP1 may be in contact with the first bonding portion EP1 and extend inward.

The second connecting portion CP2 may be connected to the other end of the first connecting portion CP1. In other words, one end of the second connecting portion CP2 may be in contact with the other end of the first connecting portion CP1.

The second connecting portion CP2 may be bent with respect to the first connecting portion CP1 in the first direction (X-axis direction). In an embodiment, the second connecting portion CP2 may extend downward from a lower portion of the first virtual line LX1 and extend upward from an upper portion of the first virtual line LX1. Therefore, the second connecting portion CP2 may extend by being inclined with respect to the first connecting portion CP1 at a first inclination θ1. For example, the first inclination may be 90 degrees.

The third connecting portion CP3 may be connected to the other end of the second connecting portion CP2. In other words, one end of the third connecting portion CP3 may be in contact with the other end of the second connecting portion CP2.

The third connecting portion CP3 may be bent with respect to the second connecting portion CP2 in the second direction (Y-axis direction). In an embodiment, the third connecting portion CP3 may extend from the second connecting portion CP2 toward the second bonding portion EP2. In addition, the third connecting portion CP3 may extend from a left of the third virtual line LX3 toward a right thereof and extend from the right side of the third virtual line LX3 toward the left of the third virtual line LX3.

In addition, the third connecting portion CP3 may extend by being inclined with respect to the second connecting portion CP2 at a second inclination θ2. The second inclination may be the same as the first inclination.

The fourth connecting portion CP4 may be connected to the other end of the third connecting portion CP3. One end of the fourth connecting portion CP4 may be in contact with the other end of the third connecting portion CP3. In addition, the other end of the fourth connecting portion CP4 may be connected to the second bonding portion EP2.

The fourth connecting portion CP4 may extend toward the third virtual line LX3 at a predetermined inclination with respect to the third connecting portion CP3. In other words, the fourth connecting portion CP4 may be bent at a predetermined angle toward the second bonding portion EP2 with respect to the third connecting portion CP3.

The fourth connecting portion CP4 may extend by being inclined with respect to the third connecting portion CP3 at a third inclination θ3. The third inclination θ3 may be smaller than the first inclination θ1 and the second inclination θ2.

In an embodiment, the elastic member EE may have two closed loops symmetrical with respect to the third virtual line LX3 or the second bonding portion EP2 by the first bonding portion EP1, the second bonding portion EP2, and the connecting portion CP. In addition, a height between the first connecting portions CP1 may be maintained in the closed loop. In other words, the first connecting portion CP1 may have the same separation distance CL1 between the first virtual lines LX1.

In addition, in the closed loop, a height between the second connecting portion CP2 and the third connecting portion CP3 may be greater than the height between the first connecting portions CP1. In other words, the separation distance CL1 between the first connecting portion CP1 and the first virtual line LX1 may be smaller than a distance CL2 between the third connecting portion CP3 and the first virtual line LX1. In other words, the heights (length in the first direction (X-axis direction)) of the second connecting portion CP2 and the third connecting portion CP3 may increase in the closed loop as compared to the first connecting portion CP1.

In addition, the height between the third connecting portions CP3 may be maintained in the closed loop.

In addition, in the closed loop, the fourth connecting portion CP4 may be reduced by as much as a constant length as a separation distance CL3 between the first virtual lines LX3 is adjacent to the third virtual line. In other words, in the closed loop, the height may be reduced by as much as a predetermined inclination by the fourth connecting portion CP4. Therefore, the fourth connecting portion CP4 may be in contact with the second bonding portion EP2.

FIG. 17A is a perspective view before a damper member is applied on the first camera actuator according to the first embodiment, FIG. 17B is a perspective view after the damper member is applied on the first camera actuator according to the first embodiment, FIG. 17C is a view showing coupling between the first member, the second member, and the elastic member in the first camera actuator according to the first embodiment, FIG. 17D is a view of another aspect of FIG. 17C, FIG. 17E is a view of still another aspect of FIG. 17C, and FIG. 18 is a view illustrating FIG. 17C from which the first member is removed.

Referring to FIGS. 17A and 17B, in an embodiment, a height hc or length of the third protrusion 1131ap3 in the third direction (Z-axis direction) may be different from a height ha or hb or a length of the first protrusion 1131ap1 or the second protrusion 1131ap2 in the third direction (Z-axis direction). For example, the height or length of the third protrusion 1131ap3 in the third direction (Z-axis direction) may be smaller than the height or length of the first protrusion 1131ap1 in the third direction (Z-axis direction). In addition, the height or length of the third protrusion 1131ap3 in the third direction (Z-axis direction) may be smaller than the height or length of the second protrusion 1131ap2 in the third direction (Z-axis direction). In this case, the height of each protrusion may be the length from a lowermost surface among the plurality of protrusions to an upper surface of each protrusion in the third direction (Z-axis direction). For example, the lowermost surface among the plurality of protrusions may be a lowermost surface of the third protrusion 1131ap3.

With this configuration, the third protrusion 1131ap3 may be in contact with at least a portion of the elastic member and may support the elastic member. In addition, the elastic member may pass through a region between the first protrusion 1131ap1 and the second protrusion 1131ap2.

In addition, a lower surface of the third protrusion 1131ap3 may be positioned inward or downward from the first protrusion 1131ap1 or the second protrusion 1131ap2. In other words, the lower surface of the third protrusion 1131ap3 may be spaced apart from the lower surface of the first protrusion 1131ap1 or the second protrusion 1131ap2 in the third direction (Z-axis direction). In addition, the third protrusion 1131ap3 may be coupled to a groove formed in a side surface of the first member 1131a. With this configuration, the third protrusion 1131ap3 can improve the coupling force between the first member 1131a and the holder (or the mover). Furthermore, as described above, the third protrusion 1131ap3 can suppress the inward movement of the damper member DP.

Furthermore, as described above, a groove may be formed in a region between the first protrusion 1131ap1 and the second protrusion 1131ap2 due to the protruding structure. The groove may correspond to the mover groove 1131h described above. Furthermore, as described above, an additional step structure may further be present in the mover groove 1131h.

Referring to FIGS. 17C, 17D, and 18, according to an embodiment, the damper member DP may be disposed between the first protrusion 1131ap1 and the second protrusion 1131ap2. In addition, the damper member DP may be disposed on the third protrusion 1131ap3. Alternatively, the damper member DP may be disposed between the first protrusion 1131ap1 and the second protrusion 1131ap2 and on the third protrusion 1131ap3.

Therefore, the third protrusion 1131ap3 can improve the coupling force between the first member 1131a and the holder and also improve the coupling force between the elastic member and the mover by the damper member DP. In addition, the third protrusion 1131ap3 can suppress the flow of the damper member, thereby improving the reliability of the actuator.

In addition, in the first camera actuator according to the embodiment, the second bonding portion EP2 may overlap the first protrusion PR1 in the second axis or the first direction.

In addition, an apex of the first protrusion PR1 on the base to be described below may be disposed on a middle axis (corresponding to the above-described third virtual line) bisecting the plurality of second bonding holes EP2h.

With this configuration, when second axis tilting is performed by the first protrusion PR1, the force applied to the tilting guide unit by the elastic member EE may be uniformly generated with respect to the second axis or the first direction.

In addition, the second member 1126 may include a protrusion region 1126a protruding rearward. The protrusion region 1126a may partially overlap the elastic member EE in the second direction (Y-axis direction). Therefore, the connecting portion CP of the elastic member EE may be formed in a structure surrounding the protrusion region 1126a. With this configuration, the center of gravity can be easily adjusted by weight loss.

In addition, an apex of the second protrusion PR2 may be positioned on the first virtual line LX1. In other words, the apex of the second protrusion PR2 may be disposed on the first virtual line LX1 bisecting the first bonding hole EP1h. Therefore, in the camera actuator according to the embodiment, the force pressed by the elastic member EE may be uniformly provided to both of an upper portion and a lower portion of the mover.

In addition, the damper member DP according to the embodiment may be disposed in the mover groove 1131*h* described above to be in contact with the mover 1130 or the holder 1131. In other words, the damper member DP may be coupled to the holder 1131 (or mover) and the elastic member EE. With this configuration, the damper member DP can suppress vibration at a settling time when the mover rotates about an axis. In addition, the damper member DP can suppress damage to the spring due to a resonant frequency. Therefore, it is possible to improve the reliability of the first camera actuator according to the embodiment.

In particular, at least a portion of the connecting portion CP of the elastic member EE may be disposed in the mover groove 1131*h* to be in contact with the damper member DP.

In addition, as described above, at least a portion of the third protrusion 1131*ap*3 may be in contact with the elastic member EE. For example, an upper surface of the third protrusion 1131*ap*3 may be in contact with the elastic member EE. Therefore, the third protrusion 1131*ap*3 may support at least a portion of the elastic member EE.

Furthermore, the elastic member EE may pass through the region between the first protrusion 1131*ap*1 and the second protrusion 1131*ap*2. In addition, the connecting portion CP may pass through the damper member DP in the mover groove 1131*h* or the mover groove 113*h*. For example, the elastic member EE may pass through the damper member DP. As a result, it is possible to improve the coupling force between the damper member DP, the elastic member EE, and the holder 1131, thereby improving vibration suppression. Therefore, it is also possible to improve the durability of the first camera actuator.

FIG. 19 is a perspective view of a tilting guide unit according to the embodiment, FIG. 20 is a perspective view of the tilting guide unit in a direction different from that of FIG. 19, and FIG. 21 is a cross-sectional view of the tilting guide unit along line F-F' in FIG. 19.

Referring to FIGS. 19 to 21, the tilting guide unit 1141 according to the embodiment may include a base BS, the first protrusion PR1 protruding from a first surface 1141*a* of the base BS, and the second protrusion PR2 protruding from a second surface 1141*b*. In addition, as described above, the first protrusion and the second protrusion may have surfaces formed opposite to each other depending on their structures, but will be described below based on the above description.

First, the base BS may include the first surface 1141*a* and the second surface 1141*b* opposite to the first surface 1141*a*. In other words, the first surface 1141*a* may be spaced apart from the second surface 1141*b* in the third direction (Z-axis direction) and may be outer surfaces opposite to each other or facing each other within the tilting guide unit 1141.

The tilting guide unit 1141 may include the first protrusion PR1 extending to one side on the first surface 1141*a*. According to an embodiment, the first protrusion PR1 may protrude from the first surface 1141*a* toward the mover. The plurality of first protrusions PR1 may include a 1-1 protrusion PR1*a* and a 1-2 protrusion PR1*b*.

The 1-1 protrusion PR1*a* and the 1-2 protrusion PR1*b* may be positioned side by side in the first direction (X-axis direction). In other words, the 1-1 protrusion PR1*a* and the 1-2 protrusion PR1*b* may overlap in the first direction (X-axis direction). In addition, in an embodiment, the 1-1 protrusion PR1*a* and the 1-2 protrusion PR1*b* may be bisected by a virtual line extending in the first direction (X-axis direction).

In addition, the 1-1 protrusion PR1*a* and the 1-2 protrusion PR1*b* have a curvature and may have, for example, a hemispherical shape.

In addition, the tilting guide unit 1141 may include the second protrusion PR2 extending to one side on the second surface 1141*b*. According to the embodiment, the second protrusion PR2 may protrude from the second surface 1141*b* toward the housing. In addition, a plurality of second protrusions PR2 may be provided and may include a 2-1 protrusion PR2*a* and a 2-2 protrusion PR2*b* in the embodiment.

The 2-1 protrusion PR2*a* and the 2-2 protrusion PR2*b* may be positioned side by side in the second direction (Y-axis direction). In other words, the 2-1 protrusion PR2*a* and the 2-2 protrusion PR2*b* may overlap in the second direction (Y-axis direction). In addition, in the embodiment, the 2-1 protrusion PR2*a* and the 2-2 protrusion PR2*b* may be bisected by a virtual line VL2' extending in the second direction (Y-axis direction).

The 2-1 protrusion PR2*a* and the 2-2 protrusion PR2*b* may have a curvature, and may have, for example, a hemispherical shape. In addition, the 2-1 protrusion PR2*a* and the 2-2 protrusion PR2*b* may be in contact with the first member 1131*a* at a point spaced apart from the second surface 1141*b* of the base BS.

The 1-1 protrusion PR1*a* and the 1-2 protrusion PR1*b* may be positioned in a region between the 2-1 protrusion PR2*a* and the 2-2 protrusion PR2*b* in the second direction. According to the embodiment, the 1-1 protrusion PR1*a* and the 1-2 protrusion PR1*b* may be positioned at the center of the separation space between the 2-1 protrusion PR2*a* and the 2-2 protrusion PR2*b* in the second direction. With this configuration, the actuator according to the embodiment may have an angle of the X-axis tilt in the same range with respect to the X-axis. In other words, the tilting guide unit 1141 may provide a range (e.g., a positive/negative range) in which the mover may perform X-axis tilting with respect to the 1-1 protrusion PR1*a* and the 1-2 protrusion Pr1*b* equally with respect to the X-axis.

In addition, the 2-1 protrusion PR2*a* and the 2-2 protrusion PR2*b* may be positioned in a region between the 1-1 protrusion PR1*a* and the 1-2 protrusion PR1*b* in the first direction. According to the embodiment, the 2-1 protrusion PR2*a* and the 2-2 protrusion PR2*b* may be positioned at the center of the separation space between the 1-1 protrusion PR1*a* and the 1-2 protrusion PR1*b* in the first direction. With this configuration, the actuator according to the embodiment may have an angle of the Y-axis tilt in the same range with respect to the Y-axis. In other words, the actuator may provide a range (e.g., a positive/negative range) in which the tilting guide unit 1141 and the mover may perform Y-axis tilting with respect to the 2-1 protrusion PR2*a* and the 2-2 protrusion PR2*b* equally with respect to the Y-axis.

The first protrusion PR1 may be positioned on a first bisector VL1. Here, the first bisector VL1 is a line bisecting the first surface 1141*a* in the second direction (Y-axis direction). Therefore, the tilting guide unit 1141 may easily perform the X-axis tilting through the first protrusion PR1. In addition, since the tilting guide unit 1141 performs the X-axis tilting with respect to the first bisector VL1, a rotational force may be uniformly applied to the tilting guide unit 1141. Therefore, it is possible to precisely perform the X-axis tilting and improve the reliability of the device.

In addition, the 1-1 protrusion PR1*a* and the 1-2 protrusion PR1*b* may be symmetrically disposed with respect to the first bisector VL1 and a second bisector VL2. Alternatively, the 1-1 protrusion PR1*a* and the 1-2 protrusion PR1*b* may be symmetrically positioned with respect to a first center point C1. With this configuration, when the X-axis tilting is performed, a supporting force supported by the first protrusion PR1 may be equally applied to upper and lower sides with respect to the second bisector VL2. Therefore, it is possible to improve the reliability of the tilting guide unit. Here, the second bisector VL2 is a line bisecting the first surface 1141a in the first direction (X-axis direction). In addition, the first center point C1 may be an intersection of the first bisector VL1 and the second bisector VL2. Alternatively, the first center point C1 may be a point corresponding to the center of gravity according to the shape of the tilting guide unit 1141.

In addition, since the tilting guide unit 1141 performs the Y-axis tilting with respect to a fourth bisector VL2', a rotational force may be uniformly applied to the tilting guide unit 1141. Therefore, it is possible to precisely perform the Y-axis tilting and improve the reliability of the device.

In addition, the 2-1 protrusion PR2a and the 2-2 protrusion PR2b may be disposed symmetrically with respect to a third bisector VL1' on the fourth bisector VL2'. Alternatively, the 2-1 protrusion PR2a and the 2-2 protrusion PR2b may be positioned symmetrically with respect to a second center point C1'. With this configuration, when Y-axis tilting is performed, a supporting force supported by the second protrusion PR2 may be equally applied to upper and lower sides of the tilting guide unit with respect to the fourth bisector VL2'. Therefore, it is possible to improve the reliability of the tilting guide unit. Here, the third bisecting VL1' is a line bisecting the second surface 1141b in the second direction (Y-axis direction). The fourth bisector VL2' is a line bisecting the second surface 1141b in the first direction (X-axis direction). In addition, the second center point C1' may be an intersection of the third bisector VL1' and the fourth bisector VL2'. Alternatively, the first center point C1 may be a point corresponding to the center of gravity according to the shape of the tilting guide unit 1141.

In addition, the above description may be applied to a description of the first protrusion PR1 and the second protrusion PR2 in the same manner. In addition, a shape of the base BS may be variously changed depending on a weight or fastening structure of the camera actuator.

FIG. 22 is a perspective view of the first camera actuator according to the first embodiment from which a shield can and a board are removed, FIG. 23 is a cross-sectional view along line P-P' in FIG. 22, and FIG. 24 is a cross-sectional view along line Q-Q' in FIG. 22.

Referring to FIGS. 22 to 24, the first coil 1152a may be positioned on the first housing side portion 1121, and the first magnet 1151a may be positioned on the first holder outer surface 1131S1 of the holder 1131. Therefore, the first coil 1152a and the first magnet 1151a may be positioned opposite to each other. At least a portion of the first magnet 1151a may overlap the first coil 1152a in the second direction (Y-axis direction).

In addition, the second coil 1152b may be positioned on the second housing side portion 1122, and the second magnet 1151b may be positioned on the second holder outer surface 1131S2 of the holder 1131. Therefore, the second coil 1152b and the second magnet 1151b may be positioned opposite to each other. At least a portion of the second magnet 1151b may overlap the second coil 1152b in the second direction (Y-axis direction).

In addition, the first coil 1152a and the second coil 1152b overlap in the second direction (Y-axis direction), and the first magnet 1151a and the second magnet 1151b overlap in the second direction (Y-axis direction).

With this configuration, an electromagnetic force applied to the outer surfaces of the holders (the first holder outer surface and the second holder outer surface) is positioned on an axis parallel to the second direction (Y-axis direction) and thus it is possible to perform X-axis tilting accurately and precisely.

In addition, the second protrusions PR2a and PR2b of the tilting guide unit 1141 may be in contact with the second member 1126 of the housing 1120. The second protrusion PR2 may be seated in the second protrusion groove PH2 formed in one side surface of the second member 1126. In addition, when X-axis tilting is performed, the second protrusions PR2a and PR2b may be reference axes (or the rotational axes) for the tilt. Therefore, the tilting guide unit 1141 and the mover 1130 may move up and down.

In addition, the first Hall sensor 1153a may be positioned outside for electrical connection and coupling with the board unit 1154 as described above. However, the present invention is not limited to these positions.

In addition, the third coil 1152c may be positioned on the third housing side portion 1123, and the third magnet 1151c may be positioned on the third holder outer surface 1131S3 of the holder 1131. The third coil 1152c and the third magnet 1151c may overlap at least partially in the first direction (X-axis direction). Therefore, an intensity of an electromagnetic force between the third coil 1152c and the third magnet 1151c may be easily controlled.

As described above, the tilting guide unit 1141 may be positioned on the fourth holder outer surface 1131S4 of the holder 1131. In addition, the tilting guide unit 1141 may be seated in the fourth seating groove 1131S4a on the fourth holder outer surface. As described above, the fourth seating groove 1131S4a may include the first region AR1, second region AR2, and third region AR3 described above.

The first member 1131a may be disposed in the first region AR1. In addition, the outer surface of the first member 1131a may be coupled to the second bonding portion EP2 of the elastic member EE. Therefore, the holder 1131 may apply a force from the holder 1131 to the tilting guide unit 1141 in the same direction as that of a restoring force RF2 generated by the elastic member EE (RF2').

The second member 1126 may be disposed in the second region AR2. The second member 1126 may include the second protrusion groove PH2. The second protrusion groove PH2 may be positioned on a surface of the second member 1126 facing the holder 1131.

In addition, the restoring force RF2 generated by the elastic member EE may be applied to the second member 1126 through the above-described path. Therefore, the restoring forces RF2 and RF2' generated through the elastic member EE may press the tilting guide unit 1141 disposed between the second member 1126 and the holder 1131.

The tilting guide unit 1141 may be disposed in the third region AR3. As described above, the tilting guide unit 1141 may include the first protrusion PR1 and the second protrusion PR2. In this case, the first protrusion PR1 and the second protrusion PR2 may also be disposed on the second surface 1141b and the first surface 1141a of the base BS, respectively. The first protrusion PR1 and the second protrusion PR2 may be variously positioned on the facing surfaces of the base BS. However, this will be described below based on the drawings.

In addition, the first protrusion groove PH1 may be positioned in the holder 1131. In particular, the first protrusion groove PH1 may be positioned in the fourth seating groove 1131S4a. In addition, the first protrusion PR1 may be positioned in the first protrusion groove PH1. Therefore, at least a portion of the first protrusion PR1 may be in contact with the first protrusion groove PH1. In addition, as described above, the apex of the first protrusion PR1 may be positioned on the bisector of the bonding hole of the second bonding portion.

In addition, the maximum diameter of the first protrusion groove PH1 may correspond to the maximum diameter of the first protrusion PR1. This may also be applied to the second protrusion groove PH2 and the second protrusion PR2 in the same manner. In other words, the maximum diameter of the second protrusion groove PH2 may correspond to the maximum diameter of the second protrusion PR2. In addition, therefore, the second protrusion PR2 may be in contact with the second protrusion groove PH2. With this configuration, the second axis tilting may be easily performed with respect to the first protrusion PR1, and the first axis tilting may be easily performed with respect to the second protrusion PR2, and thus it is possible to increase a radius of the tilt.

In addition, the tilting guide unit 1141 may be disposed side by side with the first member 1131a and the second member 1126 in the third direction (Z-axis direction), and thus the tilting guide unit 1141 may overlap the optical member 1132 in the first direction (X-axis direction). More specifically, in the embodiment, the first protrusion PR1 may overlap the optical member 1132 in the first direction (X-axis direction). Furthermore, at least a portion of the first protrusion PR1 may overlap the third coil 1152c or the third magnet 1151c in the first direction (X-axis direction). In other words, in the camera actuator according to the embodiment, each protrusion, which is the central axis of the tilt, may be positioned adjacent to the center of gravity of the mover 1130. Therefore, the tilting guide unit may be positioned adjacent to the center of gravity of the mover. Therefore, the camera actuator according to the embodiment can minimize a moment value at which the mover tilts and also minimize the amount of current applied to the coil unit or the like to tilt the mover, thereby improving power consumption and the reliability of the device.

In addition, as described above, the second Hall sensor 1153b positioned inside the third coil 1153c may detect a change in magnetic flux and thus sense the position between the third magnet 1151c and the second Hall sensor 1153b.

FIG. 25 is a view showing a driving unit according to the embodiment.

Referring to FIG. 25, as described above, the first driving unit 1150 includes the driving magnet 1151, the driving coil 1152, the Hall sensor unit 1153, and the board unit 1154.

In addition, as described above, the driving magnet 1151 may include the first magnet 1151a, the second magnet 1151b, and the third magnet 1151c for providing a driving force by an electromagnetic force. Each of the first magnet 1151a, the second magnet 1151b, and the third magnet 1151c may be positioned on an outer surface of the prism holder 1131.

In addition, the driving coil 1152 may include a plurality of coils. In an embodiment, the driving coil 1152 may include the first coil 1152a, the second coil 1152b, and the third coil 1152c.

The first coil 1152a may be positioned to face the first magnet 1151a. Therefore, as described above, the first coil 1152a may be positioned in the first housing hole 1121a of the first housing side portion 1121. In addition, the second coil 1152b may be positioned to face the second magnet 1151b. Therefore, as described above, the second coil 1152b may be positioned in the second housing hole 1122a of the second housing side portion 1122.

The first camera actuator according to the first embodiment may provide the best optical characteristics by minimizing the occurrence of decentering or tilting phenomenon when implementing an OIS by controlling the mover 1130 to be rotated by the electromagnetic force between the driving magnet 1151 and the driving coil 1152 along the first axis (X-axis direction) or the second axis (Y-axis direction).

In addition, according to the embodiment, the ultra-slim and ultra-small type camera actuator and the camera module including the same may be provided by eliminating size limitations of the actuator by implementing the OIS through the tilting guide unit 1141 of the rotational unit 1140 disposed between the housing 1120 and the mover 1130.

The board unit 1154 may include a first board side portion 1154a, a second board side portion 1154b, and a third board side portion 1154c.

The first board side portion 1154a and the second board side portion 1154b may be disposed to face each other. In addition, the third board side portion 1154c may be positioned between the first board side portion 1154a and the second board side portion 1154b.

In addition, the first board side portion 1154a may be positioned between the first housing side portion and the shield can, and the second board side portion 1154b may be positioned between the second housing side portion and the shield can. In addition, the third board side portion 1154c may be positioned between the third housing side portion and the shield can and a bottom surface of the board unit 1154.

The first board side portion 1154a may be coupled and electrically connected to the first coil 1152a. In addition, the first board side portion 1154a may be coupled and electrically connected to the first Hall sensor 1153a.

The second board side portion 1154b may be coupled and electrically connected to the second coil 1152b. In addition, it should be understood that the second board side portion 1154b may also be coupled and electrically connected to the first Hall sensor.

The third board side portion 1154c may be coupled and electrically connected to the third coil 1152c. In addition, the third board side portion 1154c may be coupled and electrically connected to the second Hall sensor 1153b.

FIG. 26 is a view showing a driving unit according to a modified example.

The first driving unit 1150A includes the driving magnet 1151, the driving coil 1152, the Hall sensor unit 1153, the first board unit 1154, and a yoke unit 1155.

In addition, as described above, the driving magnet 1151 may include the first magnet 1151a and the second magnet 1151b for providing a driving force by an electromagnetic force. Each of the first magnet 1151a and the second magnet 1151b may be positioned on the outer surface of the holder 1131.

In addition, as described above, a dummy member DM is described as being included in the driving unit 1150A in the drawing, but it should be understood that the dummy member DM may be a separate member. In other words, since the dummy member DM is not disposed to face the coil and does not generate an electromagnetic force, the dummy member DM is not a driving source for generating a driving force in a predetermined direction, for example, for performing the Y axis. However, the dummy member DM may be seated on the outer surface of the holder and positioned to be symmetrical with the first magnet 1151a with respect to the first direction or second direction. In addition, the dummy member DM may have the same weight as that of the first magnet 1151a. Therefore, the dummy member DM may compensate for the holder by a weight of the first magnet 1151*a*, thereby preventing the weight from concentrating toward the first magnet 1151*a* when the holder rotates with respect to the second direction (Y-axis direction). In other words, the dummy member DM can improve the accuracy of the Y-axis tilt of the holder 1131. Furthermore, it is possible to improve the current efficiency for Y-axis tilt by the dummy member DM because the coils are not disposed at positions symmetrical to the first coil 1152*a* in the first and second directions. In addition, the overall weight of the first camera actuator according to the first embodiment can be reduced, thereby reducing the weight.

In addition, the driving coil 1152 may include a plurality of coils. In an embodiment, the driving coil 1152 may include the first coil 1152*a* and the second coil 1152*b*.

The first coil 1152*a* may be positioned to face the first magnet 1151*a*. Therefore, as described above, the first coil 1152*a* may be positioned in the first housing hole 1121*a* of the first housing side portion 1121.

In addition, since the second housing hole 1122*a* of the second housing side portion 1122 is open, the weight of the first camera actuator can be reduced. The opening may be positioned to face the dummy member DM.

In addition, the first camera actuator according to the first embodiment may provide the best optical characteristics by minimizing the occurrence of decentering or tilting phenomenon when implementing the OIS by controlling the mover 1130 to be rotated by the electromagnetic force between the driving magnet 1151 and the driving coil 1152 along the first axis (X-axis direction) or the second axis (Y-axis direction).

In addition, according to the embodiment, the ultra-slim and ultra-small type camera actuator and the camera module including the camera actuator may be provided by resolving size limitations of the actuator by implementing the OIS through the tilting guide unit 1141 of the rotational unit 1140 disposed between the housing 1120 and the mover 1130.

The first board unit 1154 may include the first board side portion 1154*a*, the second board side portion 1154*b*, and the third board side portion 1154*c*.

The first board side portion 1154*a* and the second board side portion 1154*b* may be disposed to face each other. In addition, the third board side portion 1154*c* may be positioned between the first board side portion 1154*a* and the second board side portion 1154*b*.

In addition, the first board side portion 1154*a* may be positioned between the first housing side portion and the shield can, and the second board side portion 1154*b* may be positioned between the second housing side portion and the shield can. In addition, the third board side portion 1154*c* may be positioned between the third housing side portion and the shield can and a bottom surface of the first board unit 1154.

The first board side portion 1154*a* may be coupled and electrically connected to the first coil 1152*a*. In addition, the first board side portion 1154*a* may be coupled and electrically connected to the first Hall sensor 1153*a*.

The second board side portion 1154*b* may be a dummy board.

Furthermore, the third board side portion 1154*c* may be coupled and electrically connected to the second coil 1152*b*. In addition, the third board side portion 1154*c* may be coupled and electrically connected to the second Hall sensor 1153*b*.

Therefore, in the first camera actuator according to the first embodiment, an electrical path CPH may be formed on only the first board side portion 1154*a* and the third board side portion 1154*c* because no electrical connection to the second board side portion 1154*b* is required. Therefore, a length of the electrical connection can be reduced, thereby reducing electrical resistance. In other words, it is possible to improve current efficiency.

In addition, a driver dR for controlling the amount of current applied to the first coil or the second coil may also be disposed on any one of the first board side portion 1154*a* and the third board side portion 1154*c*. Therefore, it is possible to minimize an electrical path, thereby minimizing electrical resistance.

In addition, the yoke unit 1155 may include a first yoke 1155*a* and a second yoke 1155*b*. The first yoke 1155*a* may be positioned in the first seating groove and coupled to the first magnet 1151*a*. In addition, the second yoke 1155*b* may be positioned in the third seating groove and coupled to the second magnet 1151*b*. Additionally, the dummy yoke may be positioned in the second seating groove and coupled to the dummy member DM. The first yoke 1155*a* and the second yoke 1155*b* allow the first magnet 1151*a* and the second magnet 1151*b* to be easily seated in the first seating groove and the third seating groove and coupled to the housing.

FIG. 27 is a perspective view of the first camera actuator according to the first embodiment, FIG. 28 is a cross-sectional view along line S-S' in FIG. 27, and FIG. 29 is an exemplary view of movement of the first camera actuator shown in FIG. 28.

Referring to FIGS. 27 to 29, Y-axis tilting may be performed. In other words, an OIS may be implemented by the rotation in the first direction (X-axis direction).

In an embodiment, the third magnet 1151*c* disposed under the holder 1131 forms an electromagnetic force with the third coil 1152*c* to tilt or rotate the mover 1130 in the second direction (Y-axis direction).

Specifically, the restoring force of the elastic member EE may be transmitted to the first member 1131*a* and finally transmitted to the tilting guide unit 1141 disposed between the second member 1126 and the holder 1131. Therefore, the tilting guide unit 1141 may be pressed by the mover 1130 and the housing 1120 by a repulsive force described above.

In addition, the second protrusion PR2 may be supported by the second member 1126. In this case, in an embodiment, the tilting guide unit 1141 may rotate or tilt using the second protrusion PR2 protruding toward the second member 1126 serving as a reference axis (or a rotational axis), that is, with respect to the second direction (Y-axis direction). In other words, the tilting guide unit 1141 may rotate or tilt using the second protrusion PR2 protruding toward the second member 1126 serving as the reference axis (or the rotational axis) in the first direction (X-axis direction).

For example, the OIS may be implemented by rotating (X1→X1*a*) the mover 1130 at the first angle θ1 in the X-axis direction by the electromagnetic forces F1A and F1B between the third magnet 1151*c* disposed in the third seating groove and the third coil unit 1152*c* disposed on the third board side portion. In addition, OIS may be implemented by rotating (X1→X1*b*) at the first angle θ1 in the X-axis direction by the first electromagnetic forces F1A and F1B between the third magnet 1151*c* disposed in the third seating groove and the third coil unit 1152*c* disposed on the third board side portion. The first angle θ1 may be in the range of ±1° to ±3°. However, the present invention is not limited thereto. Hereinafter, in the first camera actuators according to various embodiments, the electromagnetic force may move the mover by generating a force in the described direction or move the mover in the described direction even when generating the force in another direction. In other words, the direction of the described electromagnetic force means a direction of the force generated by the magnet and the coil to move the mover.

FIG. 30 is a perspective view of the first camera actuator according to the first embodiment, FIG. 31 is a cross-sectional view along line R-R' in FIG. 30, and FIG. 32 is an exemplary view of the movement of the first camera actuator shown in FIG. 31.

Referring to FIGS. 30 to 32, X-axis tilting may be performed. In other words, OIS may be implemented by the mover 1130 that tilts or rotates in the Y-axis direction.

In an embodiment, the first magnet 1151*a* and the second magnet 1151*b* disposed on the holder 1131 form an electromagnetic force with the first coil 1152*a* and the second coil 1152*b*, respectively, and tilt or rotate the tilting guide unit 1141 and the mover 1130 with respect to the first direction (X-axis direction).

Specifically, the restoring force of the elastic member EE may be transmitted to the first member 1131*a* and the holder 1131 and finally transmitted to the tilting guide unit 1141 disposed between the holder 1131 and the second member 1126. Therefore, the tilting guide unit 1141 may be pressed by the mover 1130 and the housing 1120 by the repulsive force described above.

In addition, the 1-1 protrusion PR1*a* and the 1-2 protrusion PR1*b* may be spaced apart from each other in the first direction (X-axis direction) and supported by the first protrusion groove PH1 formed in the fourth seating groove 1131S4*a* of the holder 1131. In addition, in an embodiment, the tilting guide unit 1141 may rotate or tilt using the first protrusion PR1 protruding toward the holder 1131 (e.g., toward the third direction) serving as the reference axis (or the rotational axis), that is, with respect to the first direction (X-axis direction).

For example, the OIS may be implemented by rotating (Y1→Y1*a*) the mover 1130 at the second angle θ2 in the Y-axis direction by the second electromagnetic forces F2A and F2B between the first and second magnets 1151*a* and 1151*b* disposed in the first seating groove and the first and second coil units 1152*a* and 1152*b* disposed on the first and second board side portions. In addition, the OIS may be implemented by rotating (Y1→Y1*b*) the mover 1130 at the second angle θ2 in the Y-axis direction by the second electromagnetic forces F2A and F2B between the first and second magnets 1151*a* and 1151*b* disposed in the first seating groove and the first and second coil units 1152*a* and 1152*b* disposed on the first and second board side portions. The second angle θ2 may be in the range of ±1° to ±3°. However, the present invention is not limited thereto.

In addition, as described above, the electromagnetic force by the first and second magnets 1151*a* and 1151*b* and the first and second coil units 1152*a* and 1152*b* may act in the third direction or in a direction opposite to the third direction. For example, the electromagnetic force may be generated in a left portion of the mover 1130 in the third direction (Z-axis direction) and may act on a right portion of the mover 1130 in the opposite direction to the third direction (Z-axis direction). Therefore, the mover 1130 may rotate with respect to the first direction. Alternatively, the mover 1130 may move in the second direction.

In addition, the second actuator according to the first embodiment may provide the best optical characteristics by minimizing the occurrence of decentering or tilting phenomenon when implementing the OIS by controlling the mover 1130 to be rotated in the first direction (X-axis direction) or the second direction (Y-axis direction) by the electromagnetic force between the driving magnets in the holder and the driving coils disposed in the housing. In addition, as described above, "Y-axis tilting" refers to rotating or tilting in the first direction (X-axis direction), and "X-axis tilting" refers to rotating or tilting in the second direction (Y-axis direction).

FIG. 33 is a perspective view of a first camera actuator according to a second embodiment, FIG. 34 is a view showing a first member in the first camera actuator according to the second embodiment, FIG. 35 is a top view of the first member in the first camera actuator according to the second embodiment, and FIG. 36 is a side view of the first camera actuator according to the second embodiment.

Referring to FIGS. 33 to 36, a first camera actuator 1100A according to the second embodiment includes a shield can, a housing, a mover, a rotational unit, the elastic member EE, a driving unit, the first member 1131*a*, the second member 1126, and a damper member. In addition, the above description may be applied in the same manner except for the following description.

In the first camera actuator 1100A according to the second embodiment, the first member 1131*a* may include a member protrusion 1131*ap* disposed adjacent to the connecting portion CP.

At least a portion of the member protrusion 1131*ap* may overlap the connecting portion CP in the optical axis direction or the third direction (Z-axis direction). In addition, at least a portion of the connecting portion CP may be curved to correspond to an outer surface of the member protrusion 1131*ap*. In other words, the connecting portion CP and the member protrusion 1131*ap* may have facing surfaces or lines corresponding to each other in a region overlapping each other in the first direction (X-axis direction). In addition, the facing surfaces or lines described above may be curved. Therefore, a damper member DP1 may be easily coupled to the first member 1131*a* and the elastic member EE. Furthermore, the member protrusion 1131*ap* can suppress a phenomenon in which the damper member DP1 is coupled to a member other than the first member 1131*a* and the elastic member EE. Furthermore, the member protrusion 1131*ap* may have a region 1131*app* protruding to one side by the curved surfaces or lines described above.

In addition, an upper surface 1131*apu* of the first member 1131*a* may have a smaller width or length in the first direction (X-axis direction) than a lower surface 1131*apb* of the first member 1131*a*. For example, a width or length W5 of the upper surface 1131*apu* of the first member 1131*a* in the first direction (X-axis direction) may be smaller than a width or length W4 of the lower surface 1131*apb* thereof in the first direction (X-axis direction).

Furthermore, the upper surface 1131*apu* of the first member 1131*a* may have a smaller area than the lower surface 1131*apb* of the first member 1131*a*. With this configuration, it is possible to easily secure a coupling region between the damper member DP1 and the elastic member EE and easily suppress a phenomenon in which the damper member moves down.

In addition, a height or length d2 of the second coupling portion PP2 in the third direction (Z-axis direction) may be smaller than a width or length d1 of the member protrusion 1131*ap* in the third direction. Therefore, as described above, the preload of the elastic member EE may be easily formed, and the member protrusion 1131*ap* and the damper member DP1 may also be coupled.

Furthermore, a width or length d3 of the coupling base PP2*a* in the third direction may be smaller than the height or length d2 of the second coupling portion PP2 in the third direction (Z-axis direction).

In addition, the damper member DP1 may be coupled to the member protrusion 1131*ap* and the connecting portion CP. Therefore, the damper member DP1 can suppress vibration at the settling time when the mover axially rotates. In addition, the damper member DP1 can suppress damage to the spring due to a resonant frequency. Therefore, it is possible to improve the reliability of the first camera actuator according to the embodiment.

In addition, the member protrusion 1131*ap* may be positioned between the first coupling portion and the second coupling portion PP2. Specifically, the member protrusion 1131*ap* may be positioned in a region separated between the first coupling portion and the second coupling portion PP2 in the second direction (Y-axis direction). For example, the member protrusion 1131*ap* may be positioned at a point bisecting the region separated between the first coupling portion and the second coupling portion PP2 in the second direction (Y-axis direction). Therefore, it is possible to further improve a vibration damping effect by a damper member DP2.

In addition, in an embodiment, the second member 1126 may include a housing protrusion 1126*p* disposed adjacent to the connecting portion CP.

At least a portion of the connecting portion CP may correspond to an outer surface of the housing protrusion 1126*p*. For example, the connecting portion CP and the housing protrusion 1126*p* may have facing surfaces or lines corresponding to each other in a region overlapping each other in the first direction (X-axis direction). In addition, the facing surfaces or lines described above may be curved. Therefore, the damper member DP2 may be easily coupled to the second member 1126 and the elastic member EE. Furthermore, it is possible to suppress a phenomenon in which the damper member DP2 is coupled to a member other than the second member 1126 and the elastic member EE. Therefore, the housing protrusion 1126*p* may have the region 1126*pp* protruding to one side by the curved surfaces or lines described above. Therefore, the damper member DP2 can suppress vibration at the settling time when the mover axially rotates. In addition, the damper member DP2 can suppress damage to the spring due to a resonant frequency. Therefore, it is possible to improve the reliability of the first camera actuator according to the embodiment.

At least a portion of the housing protrusion 1126*p* may overlap the connecting portion CP in the optical axis direction or the third direction (Z-axis direction). Therefore, it is possible to further improve the coupling force between the housing protrusion 1126*p* and the connecting portion CP by the damper member DP2. Furthermore, the separation of the connecting portion CP can be suppressed by the housing protrusion 1126*p*.

FIG. 37 is a perspective view of a first camera actuator according to a third embodiment, FIG. 38 is a diagram showing the first camera actuator according to the third embodiment, and FIG. 39 is a side view of the first camera actuator according to the third embodiment.

Referring to FIGS. 37 to 39, the first camera actuator 1100B according to the third embodiment includes a shield can, a housing, a mover, a rotational unit, the elastic member EE, a driving unit, the first member 1131*a*, the second member 1126, and a damper member. In addition, the above description may be applied in the same manner except for the following description.

In addition, as described above, the holder 1131 of the mover 1130 may include the mover protrusion 1131*p* protruding toward a spring or outward from the fourth holder outer surface 1131S4. In addition, a plurality of protrusions 1131*ap* may be provided in the holder 1131 of the mover 1130. For example, the mover protrusion 1131*p* may include the first protrusion 1131*ap*1, the second protrusion 1131*ap*2, and the third protrusion 1131*ap*3. Furthermore, as described above, the damper member DP and the mover or the holder 1131 may be easily coupled through the mover protrusion 1131*p*.

In addition, the first member 1131*a* may include the member protrusion 1131*ap* disposed adjacent to the connecting portion CP. As described above, the damper member DP1 may be easily coupled to the first member 1131*a* and the elastic member EE.

In addition, the second member 1126 may include the housing protrusion 1126*p* disposed adjacent to the connecting portion CP. Therefore, the damper member DP2 may be easily coupled to the second member 1126 and the elastic member EE.

With this configuration, the elastic member EE may be coupled to the second member (or the housing), the first member 1131*a*, and the holder 1131 (or the mover) by the damper members DP, DP1, and DP2. Therefore, it is possible to further improve a coupling force between the damper member and each member. In addition, with this configuration, it is possible to further suppress vibration at the settling time when the mover axially rotates. In addition, the damper member can further suppress damage to the spring due to a resonance frequency (vibration at the resonance frequency). Therefore, it is possible to greatly improve the durability or reliability of the first camera actuator according to the embodiment.

FIG. 40 is a view showing a first camera actuator according to a modified example.

Referring to FIG. 40, the first camera actuator according to the modified example includes a shield can, a housing, a mover, a rotational unit, the elastic member EE, a driving unit, the first member 1131*a*, the second member 1126, and the damper member DP. In addition, the above description may be applied in the same manner except for the following description.

First, in the connecting portion CP of the elastic member EE, the elastic member EE may be formed so that legs of connecting portions CP are disposed adjacent to each other. In this case, the damper member DP3 may couple the legs of the adjacent connecting portions. In other words, the leg of the connecting portion CP may be a branch connecting a first bonding portion and a second bonding portion. Furthermore, the leg may be provided as a plurality of legs. In addition, one leg of the connecting portion CP may include the first to fourth connecting portions described above.

In addition, the damper member DP3 may be easily coupled to the housing protrusion 1126*p* or the member protrusion 1131*ap* of the first member 1131*a* by coupling the legs of the adjacent connecting portions. Therefore, the damper member DP3 may be coupled to adjacent legs, the leg and the housing protrusion, the leg and the member protrusion, or the leg and the member protrusion, and the housing protrusion. Therefore, it is possible to greatly improve the durability or reliability of the first camera actuator according to the embodiment.

FIG. 41 is a perspective view of a first camera actuator according to a fourth embodiment, and FIG. 42 is an exploded perspective view of the first camera actuator according to the fourth embodiment.

Referring to FIGS. 41 and 42, a first camera actuator 1100C according to the fourth embodiment includes the first housing 1120, the mover 1130, the rotational unit 1140, the first driving unit 1150, the elastic member EE, the second member 1126, the first member 1131*a*, and the damper member. Furthermore, the above description may be applied in the same manner except for the following description.

The mover 1130 may include the holder 1131 and the optical member 1132 seated on the holder 1131. In addition, the rotational unit 1140 may include the tilting guide unit 1141. In addition, the first driving unit 1150 includes the driving magnet 1151, the driving coil 1152, the Hall sensor unit 1153, the first board unit 1154, and the yoke unit 1155.

First, the first camera actuator 1100C may include a shield can (not shown). The shield can (not shown) may be positioned on an outermost side of the first camera actuator 1100C and positioned to surround the rotational unit 1140 and the first driving unit 1150, which will be described below.

The shield can (not shown) can block or reduce the influence of electromagnetic waves generated from the outside. In other words, the shield can (not shown) can reduce the number of occurrences of the malfunction of the rotational unit 1140 or the first driving unit 1150.

The first housing 1120 may be positioned inside the shield can (not shown). When there is no shield can, the first housing 1120 may be positioned on the outermost side of the first camera actuator.

In addition, the first housing 1120 may be positioned inside the first board unit 1154 to be described below. The first housing 1120 may be fastened by being fitted into or engaged with the shield can (not shown).

The first housing 1120 may include the first housing side portion 1121, the second housing side portion 1122, the third housing side portion 1123, and the fourth housing side portion 1124. A detailed description thereof will be given below.

The second member 1126 may be disposed in the first housing 1120. The second member 1126 may be disposed between the first member 1131*a* and the first housing. The second member 1126 may be disposed in the first housing or included in the first housing 1120. A description thereof will be given below.

The mover 1130 includes the holder 1131 and the optical member 1132 seated on the holder 1131.

The holder 1131 may be seated in the accommodating portion 1125 of the first housing 1120. The holder 1131 may include the first holder outer surface to the fourth holder outer surface corresponding to the first housing side portion 1121, the second housing side portion 1122, the third housing side portion 1123, and the second member 1126, respectively. For example, the first holder outer surface to the fourth holder outer surface may correspond to or face inner surfaces of the first housing side portion 1121, the second housing side portion 1122, the third housing side portion 1123, and the second member 1126, respectively.

In addition, the holder 1131 may include the first member 1131*a* disposed in the fourth seating groove. A detailed description thereof will be given below.

The optical member 1132 may be seated on the holder 1131. To this end, the holder 1131 may have a seating surface, and the seating surface may be formed by the accommodating groove. A bonding member may be applied to the seating surface. Therefore, the optical member 1132 may be coupled to the holder 1131.

In an embodiment, the optical member 1132 may be formed as a mirror or a prism. Hereinafter, the optical member 1132 is shown as the prism, but may also be composed of a plurality of lenses as in the above-described embodiment. Alternatively, the optical member 1132 may include a plurality of lenses and prisms or mirrors. In addition, the optical member 1132 may include a reflective unit disposed therein. However, the present invention is not limited thereto.

In addition, the optical member 1132 may light reflected from the outside (e.g., an object) into the camera module. In other words, the optical member 1132 may reduce spatial limitations of the first camera actuator and the second camera actuator by changing the path of the reflected light. As described above, it should be understood that the camera module may also provide a high magnification by extending the optical path while minimizing the thickness.

In addition, the first member 1131*a* may be coupled to the holder 1131. The first member 1131*a* may be disposed outside the holder 1131 and inside the housing. In addition, the first member 1131*a* may be seated in an additional groove positioned in a region of the holder 1131 other than the fourth seating groove of the fourth holder outer surface. Therefore, the first member 1131*a* may be coupled to the holder 1131, and at least a portion of the second member 1126 may be positioned between the first member 1131*a* and the holder 1131. For example, at least a portion of the second member 1126 may pass through a space formed between the first member 1131*a* and the holder 1131.

In addition, the first member 1131*a* may be formed in a structure separated from the holder 1131. With this configuration, it is possible to easily assemble the first camera actuator as will be described below. Alternatively, the first member 1131*a* may be formed integrally with the holder 1131, but will be described below as having a separated structure.

The rotational unit 1140 may include the tilting guide unit 1141. Additionally, the rotational unit 1140 may include magnetic substances having the same polarity to press the tilting guide unit 1141.

The tilting guide unit 1141 may be coupled to the mover 1130 and the first housing 1120 described above. Specifically, the tilting guide unit 1141 may be disposed between the holder 1131 and the second member 1126. Therefore, the tilting guide unit 1141 may be coupled to the mover 1130 of the holder 1131 and the first housing 1120. However, unlike the above description, in the embodiment, the tilting guide unit 1141 may be disposed between the second member 1126 and the holder 1131. Specifically, the tilting guide unit 1141 may be positioned between the second member 1126 and the fourth seating groove of the holder 1131.

The first member 1131*a*, the second member 1126, the tilting guide unit 1141, and the holder 1131 may be sequentially disposed in the third direction (Z-axis direction). In addition, the tilting guide unit 1141 may be disposed adjacent to the optical axis. Therefore, the actuator according to the embodiment may easily change the optical path according to the first axis tilt and the second axis tilt, which will be described below.

The tilting guide unit 1141 may include the first protrusions disposed to be spaced apart from each other in the first direction (X-axis direction) and the second protrusions disposed to be spaced apart from each other in the second direction (Y-axis direction). In addition, the first protrusion and the second protrusion may protrude in opposite directions. A detailed description thereof will be given below.

The first driving unit 1150 includes the driving magnet 1151, the driving coil 1152, the Hall sensor unit 1153, the first board unit 1154, and the yoke unit 1155. The above description may be applied to a description thereof. Therefore, the dummy member DM may be replaced with the second magnet, and a lower magnet may correspond to the third magnet.

In addition, the elastic member EE may be positioned between the mover 1130 and the fixed member (e.g., the first housing 1120 or the second member 1126). In addition, the tilting guide unit 1141 may be positioned between the fixed member and the mover. In addition, the elastic member EE may allow the tilting guide unit 1141 to be in close contact with the fixed member and the mover by pulling the mover 1130 to the fixed member. In addition, the elastic member EE may allow the tilting guide unit 1141 to be in close contact with the mover 1130. In other words, the elastic member EE may pull the mover 1130 to the housing 1220 or the second member 1126, which is the fixed member.

The elastic member EE may be disposed between the tilting guide unit 1141 and the housing 1120. In particular, the elastic member EE may be sequentially disposed on the tilting guide unit 1141, the second member 1126, and the first member 1131a. In other words, the second member 1126, the elastic member EE, the first member 1131a, the tilting guide unit 1141, and the mover 1130 may be sequentially disposed in the third direction.

The elastic member EE may be made of an elastic material and disposed between the second member 1126 and the first member 1131a to couple the second member 1126 to the first member 1131a. In addition, the elastic member EE may provide an elastic force to the first member 1131a and the holder 1131 connected thereto with respect to the second member 1126 fixed to the housing 1120.

Therefore, the elastic member EE may be coupled to the housing 1120 and the mover 1130 between the housing 1120 and the mover 1130 and may press the tilting guide unit 1141 through the mover 1130. Therefore, the mover 1130 may tilt to the X-axis and/or the Y-axis through the tilting guide unit 1141.

A portion of the elastic member EE in contact with the second member 1126 and a portion of the elastic member EE in contact with the first member 1131a (or the holder 1131) and the housing 1120 may be spaced apart from each other in the third direction (Z-axis direction). The elastic member EE may have a preload due to the separated distance between the contacting portions (first and second bonding portions to be described below). In addition, the preload may be transmitted to the tilting guide unit 1141 through the mover 1130 and the second member 1126 through the tilting guide unit 1141. Therefore, the tilting guide unit 1141 disposed between the mover 1130 and the second member 1126 may be pressed by the elastic member EE. In other words, a force of the tilting guide unit 1141 positioned between the mover 1130 and the second member 1126 may be maintained. Therefore, the position of the tilting guide unit 1141 may be maintained between the mover 1130 and the housing 1120 without separation even when X-axis tilting or Y-axis tilting is performed. In addition, when a current is not applied (e.g., when the current is zero) after the current is applied to the first coil and the second coil for the X-axis tilt or the Y-axis tilt, the mover 1130 may move to an initial position by the preload or restoring force described above. In other words, when a force greater than the preload (electromagnetic force to be described below) is generated, the mover 1130 may perform X/Y-axis tilting, and when a force smaller than the preload is generated, the mover 1130 may return to the initial position or maintain the position.

Furthermore, the damper member may be coupled to at least one of the housing 1120 (or the second member) and the mover (or the first member) with the elastic member.

FIG. 43A is a perspective view of a housing of the first camera actuator according to the fourth embodiment, FIG. 43B is a perspective view of the housing in a direction different from that of FIG. 43A, and FIG. 43C is a front view of the housing of the first camera actuator according to the fourth embodiment.

Referring to FIGS. 43A to 43C, the first housing 1120 according to the embodiment may include the first housing side portion 1121 to the fourth housing side portion 1124. In addition, the second member 1126 may be coupled to the first housing 1120 and formed integrally therewith. Therefore, the second member 1126 may be a component included in the first housing 1120. In other words, the first housing 1120 may be coupled to the second member 1126 and formed integrally therewith. Alternatively, the first housing 1120 may include the second member 1126.

The first housing side portion 1121 and the second housing side portion 1122 may be disposed to face each other. In addition, the third housing side portion 1123 and the fourth housing side portion 1124 may be disposed to face each other.

The third housing side portion 1123 and the fourth housing side portion 1124 may be disposed between the first housing side portion 1121 and the second housing side portion 1122.

The third housing side portion 1123 and the fourth housing side portion 1124 may be in contact with the first housing side portion 1121, the second housing side portion 1122, and the fourth housing side portion 1124. In addition, the third housing side portion 1123 may be a bottom surface of the first housing 1120. In addition, the fourth housing side portion 1124 may be an upper surface of the first housing 1120. In addition, the above description may also be applied to a description of the direction in the same manner.

The first housing side portion 1121 may include the first housing hole 1121a. The first coil to be described below may be positioned in the first housing hole 1121a.

In addition, the second housing side portion 1122 may include the second housing hole 1122a. In addition, the second housing hole 1122a may be positioned to be symmetrical with the first housing hole 1121a with respect to the first direction or the third direction. The second housing hole 1122a may be an empty region.

In addition, the first housing side portion 1121 and the second housing side portion 1122 may be side surfaces of the first housing 1120.

In addition, the third housing side portion 1123 may include the third housing hole 1123a.

The second coil (when the dummy member is present) or the third coil (when the dummy member is not present) that will be described below may be positioned in the third housing hole 1123a.

The second member 1126 may be seated between the first housing side portion 1121 to the fourth housing side portion 1124. Therefore, the second member 1126 may be positioned on the third housing side portion 1123. For example, the second member 1126 may be position on one side. The second member 1126 and the holder may be sequentially positioned with respect to the third direction.

The fourth housing side portion 1124 may be disposed between the first housing side portion 1121 and the second housing side portion 1122 and may be in contact with the first housing side portion 1121, the second housing side portion 1122, and the third housing side portion 1123.

In addition, the fourth housing side portion 1124 may include the fourth housing hole 1124a. The fourth housing hole 1124a may be positioned above the optical member. Therefore, light may pass through the fourth housing hole 1124a and may be incident on the optical member.

In addition, the first housing 1120 may include the accommodating portion 1125 formed by the first housing side portion 1121 to the fourth housing side portion 1124. Components such as the second member 1126, the first member 1131*a*, the mover 1130, and the elastic member EE may be positioned in the accommodating portion 1125.

In addition, the first housing 1120 may further include a fifth housing side portion facing the second member 1126. In addition, the fifth housing side portion may be disposed between the first housing side portion 1121 and the second housing side portion 1122 and may be in contact with the first housing side portion 1121, the second housing side portion 1122, and the third housing side portion 1123. In addition, the fifth housing side portion may include an opening region and provide a path through which the light reflected from the optical member 1132 moves. In addition, the fifth housing side portion may include a protrusion, a groove, or the like and provide the easy coupling with another camera actuator adjacent thereto. With this configuration, it is possible to provide an optical path and at the same time, improve the coupling force between the fifth housing side portion in which the opening providing the optical path is formed and another component, thereby suppressing the movement of the opening due to separation or the like and minimizing a change in the optical path.

In addition, as described above, the second member 1126 may be a component coupled to the first housing 1120 and included in the first housing 1120. In other words, the second member 1126 may be disposed in the first housing 1120. Alternatively, the second member 1126 may be positioned in the first housing 1120.

In addition, the second member 1126 may be coupled to the first housing 1120. In an embodiment, the second member 1126 may be positioned between the first housing side portion 1121 and the second housing side portion 1122. In addition, the second member 1126 may be positioned between the third housing side portion 1123 and the fourth housing side portion 1124.

The second member 1126 may be positioned on the third housing side portion 1123 and may be in contact with the first housing side portion to the third housing side portion.

In addition, a first stopper 1121*b* may be positioned on an inner surface of the first housing side portion 1121. In addition, a second stopper 1122*b* may be positioned on an inner surface of the second housing side portion 1122.

The first stopper 1121*b* and the second stopper 1122*b* may be positioned symmetrically with respect to the first direction (X-axis direction). The first stopper 1121*b* and the second stopper 1122*b* may extend in the first direction (X-axis direction). With this configuration, even when the second member 1126 moves into the first housing 1120, the position may be maintained by the first stopper 1121*b* and the second stopper 1122*b*. In other words, the first stopper 1121*b* and the second stopper 1122*b* may maintain the position of the second member 1126 on one side of the first housing 1120.

Furthermore, the first stopper 1121*b* and the second stopper 1122*b* may fix the position of the second member 1126 and fix the position of the tilting guide unit between the second member 1126 and the mover, thereby removing error occurrence factors such as vibration. Therefore, the first camera actuator according to the fourth embodiment may accurately perform X-axis tilting and Y-axis tilting.

In addition, a separation distance L2 between the first stopper 1121*b* and the second stopper 1122*b* in the second direction (Y-axis direction) may be smaller than a maximum length L1 of the second member 1126 in the second direction (Y-axis direction). Therefore, the second member 1126 may be assembled to or inserted into a side surface of the first housing 1120 and coupled to the first housing 1120. In addition, the housing 1120 may include the accommodating portion 1125 formed by the first housing side portion 1121 to the fourth housing side portion 1124. Components such as the second member 1126, the first member 1131*a*, the tilting guide unit 1141, the mover 1130, and the elastic member EE may be positioned in the accommodating portion 1125.

The second member 1126 may be disposed in the housing 1120. The second member 1126 may be disposed or included in the first housing. In addition, the second member 1126 may be coupled to the first housing 1120. In an embodiment, the second member 1126 may be coupled to the third housing side portion 1123 by seating in or at least partially passing through the housing groove 1123*b*' formed in the third housing side portion 1123. Therefore, the second member 1126 may be coupled to the housing 1120 and may maintain fixation between the mover 1130 and the tilting guide unit 1141, which will be described below.

In addition, the second member 1126 may include first coupling portions PP1 disposed in regions adjacent to the first housing side portion 1121 and the second housing side portion 1122. The first coupling portion PP1 may be formed as a protrusion. In addition, the first coupling portion PP1 may be coupled to the first bonding portion EP1. As will be described below, the first coupling portion PP1 may be inserted into the first bonding hole of the first bonding portion EP1.

In addition, the second member 1126 includes the second protrusion groove in which the second protrusion of the tilting guide unit is seated. The second protrusion groove PH2 may be positioned on an inner surface 1126*s*1 of the second member 1126. Therefore, the second member 1126 allows the protrusion (e.g., the second protrusion) of the tilting guide unit to be disposed adjacent to the prism in the fourth seating groove and the protrusion serving as the reference axis of the tilt to be disposed close to the center of gravity of the mover 1130. Therefore, when the holder tilts, the moment for moving the mover 1130 for tilt can be minimized. Therefore, the current consumption for driving the coil can also be minimized, thereby reducing the power consumption of the camera actuator.

In addition, the second member 1126 may include through holes 1126*a* and 1126*b*. A plurality of through holes may be composed of a first through hole 1126*a* and a second through hole 1126*b*.

First and second extensions of the first member to be described below may pass through the first through hole 1126*a* and the second through hole 1126*b*, respectively. Therefore, the first member and the second member may be coupled. In other words, the first housing and the mover may be coupled.

The second protrusion groove PH2 may be positioned between the first through hole 1126*a* and the second through hole 1126*b*. With this configuration, it is possible to improve the coupling force between the tilting guide unit 1141 and the second member 1126, thereby blocking a reduction in the accuracy of the tilt caused by the movement of the tilting guide unit 1141 within the first housing.

In addition, a second groove gr2 may be positioned on an outer surface 1126*s*2 of the second member 1126. A magnetic substance may be seated in the second groove gr2. In addition, the outer surface 1126*s*2 of the second member 1126 may face an inner surface of the first member or a member base unit. Furthermore, a magnetic substance seated on the first member and a magnetic substance of the second member 1126 may face each other and have the same polarity. Therefore, a repulsive force may be generated. In addition, since the second member 1126 presses the tilting guide unit inward or the holder by the repulsive force, the mover may be spaced apart at a predetermined distance from the third housing side portion even without current applied to the coil. In other words, the coupling force between the mover, the housing, and the tilting guide unit may be maintained.

In addition, when the second member 1126 is formed integrally with the first housing 1120, it is possible to improve the coupling force between the second member 1126 and the first housing 1120, thereby improving the reliability of the camera actuator. In addition, when the second member 1126 and the first housing 1120 are separately formed, it is possible to improve the ease of assembling and manufacturing.

In addition, in an embodiment, the second member 1126 may include the first through hole 1126*a* and the second through hole 1126*b* as described above. In addition, the first through hole 1126*a* and the second through hole 1126*b* may be disposed side by side in the second direction (Y-axis direction) and may overlap each other.

In addition, the second member 1126 may include an upper member UA positioned above the first through hole 1126*a* and the second through hole 1126*b* and a lower member BA positioned under the first through hole 1126*a* and the second through hole 1126*b*. Therefore, the first through hole 1126*a* and the second through hole 1126*b* may be positioned in the middle of the second member 1126. In other words, the second member 1126 may include a connecting member MA positioned on side portions of the first through hole 1126*a* and the second through hole 1126*b*. In other words, the upper member UA and the lower member BA may be connected to each other through the connecting member MA. In addition, a plurality of lower members BA may be provided to form the first and second through holes and disposed to be spaced apart from each other in the second direction (Y-axis direction).

Therefore, the second member 1126 may have the upper member UA, thereby improving stiffness. For example, the stiffness of the second member 1126 may increase as compared to a case where the upper member UA is not present. For example, in the embodiment, a unit of the stiffness may be N/μm. Therefore, it is possible to improve the reliability of the first camera actuator according to the fourth embodiment.

In addition, a first coupling groove 1126*k* may be positioned on the outer surface 1126*s*2 of the second member 1126. The first coupling groove 1126*k* may be positioned on an edge of the outer surface 1126*s*2 of the second member 1126. In particular, the first coupling groove 1126*k* may be positioned on an end portion (e.g., left and right portions) of the outer surface 1126*s*2 of the second member 1126 and positioned adjacent to the first housing side portion 1121.

The first coupling groove 1126*k* may be positioned to correspond to the second coupling grooves 1121*m* and 1122*m* of the first housing side portion 1121 and the second housing side portion 1122. In an embodiment, the first coupling groove 1126*k* may be positioned to face the second coupling grooves 1121*m* and 1122*m* of the first housing side portion 1121 and the second housing side portion 1122. The second coupling grooves 1121*m* and 1122*m* may be adjacent to the outer surface 1126*s*2 of the second member 1126 described above and positioned on the side surface having the same plane.

In an embodiment, a plurality of first coupling grooves 1126*k* and a plurality of second coupling grooves 1121*m* and 1122*m* may be provided, and the plurality of first coupling grooves 1126*k* and the plurality of second coupling grooves 1121*m* and 1122*m* may be positioned symmetrically in the first direction or the second direction.

In addition, the bonding member may be applied to the first coupling groove 1126*k* and the second coupling grooves 1121*m* and 1122*m*. In other words, the bonding member may be applied between the first housing side portion (or the second housing side portion) and the second member 1126, thereby improving the coupling force between the housing 1120 and the second member 1126. The bonding member may include an epoxy or the like, but the present invention is not limited to the material.

In addition, the second member 1126 may further include a first protrusion and a second protrusion. The first protrusion may be in contact with the first housing side portion, and the second protrusion may be in contact with the second housing side portion. The first protrusion may extend from one end of the outer surface 1126*s*2 of the second member in the third direction (Z-axis direction). The second protrusion may extend from the other end of the outer surface 1126*s*2 of the second member in the third direction (Z-axis direction). In other words, the first protrusion and the second protrusion may extend toward the holder.

A position of the first protrusion may be maintained by the first stopper 1121*b*, and a position of the second protrusion may be maintained by the second stopper 1122*b*. Therefore, it is possible to improve the reliability of the camera actuator according to the embodiment.

FIG. 44A is a perspective view of the holder of the first camera actuator according to the fourth embodiment, FIG. 44B is a bottom view of the holder of the first camera actuator according to the fourth embodiment, FIG. 44C is a front view of the holder of the first camera actuator according to the fourth embodiment, FIG. 44D is a rear view of a second member of the first camera actuator according to the fourth embodiment, and FIG. 44E is a bottom view of the second member of the first camera actuator according to the fourth embodiment.

Referring to FIGS. 44A to 44E, the holder 1131 may include the seating surface 1131*k* on which the optical member 1132 is seated. The seating surface 1131*k* may be an inclined surface. In addition, the holder 1131 may include a jaw portion on the seating surface 1131*k*. In addition, the jaw portion of the holder 1131 may be coupled to the protrusion portion (not shown) of the optical member 1132.

The holder 1131 may include a plurality of outer surfaces. For example, the holder 1131 may include the first holder outer surface 1131S 1, the second holder outer surface 1131S2, the third holder outer surface 1131S3, and the fourth holder outer surface 1131S4.

The first holder outer surface 1131S1 may be positioned to face the second holder outer surface 1131S2. In other words, the first holder outer surface 1131S1 may be disposed to be symmetrical with the second holder outer surface 1131S2 with respect to the first direction (X-axis direction). The first holder outer surface 1131S1 may be a first side surface. In addition, the second holder outer surface 1131S2 to be described below may be a second side surface.

The first holder outer surface 1131S1 may be positioned to correspond to the first housing side portion. In other words, the first holder outer surface 1131S1 may face the first housing side portion. In addition, the second holder outer surface 1131S2 may be positioned to correspond to the second housing side portion. In other words, the second holder outer surface 1131S2 may be positioned to face the second housing side portion.

In addition, the first holder outer surface 1131S1 may include a first seating groove 1131S1a. In addition, the second holder outer surface 1131S2 may include a second seating groove 1131S2a. The first seating groove 1131S1a and the second seating groove 1131S2a may be disposed symmetrically with respect to the first direction (X-axis direction).

In addition, the first seating groove 1131S1a and the second seating groove 1131S2a may be disposed to overlap in the second direction (Y-axis direction). In addition, the first magnet 1151a may be disposed in the first seating groove 1131S1a, and the dummy member DM may be disposed in the second seating groove 1131S2a. The first magnet 1151a and the dummy member DM may also be disposed symmetrically with respect to the first direction (X-axis direction). In the specification, it should be understood that the first magnet to the second magnet may be coupled to the housing through a yoke or a bonding member.

As described above, the electromagnetic force induced by the first magnet of the first seating groove 1131S1a may be provided to the holder 1131.

According to the embodiment, the first magnet of the first seating groove 1131S1a and the dummy member DM of the second seating groove 1131S2a may have the same weight. Therefore, even when the holder 1131 tilts to the X-axis by the electromagnetic force generated by the first magnet, it is possible to prevent the inclination to one side caused by weight imbalance. Therefore, it is possible to accurately perform the X-axis tilting.

The third holder outer surface 1133S3 may be in contact with the first holder outer surface 1131S1 and the second holder outer surface 1131S2 and may be an outer surface extending from one sides of the first holder outer surface 1131S1 and the second holder outer surface 1131S2 in the second direction (Y-axis direction). In addition, the third holder outer surface 1131S3 may be positioned between the first holder outer surface 1131S1 and the second holder outer surface 1131S2. The third holder outer surface 1131S3 may be a bottom surface of the holder 1131. In other words, the third holder outer surface 1131S3 may be positioned to face the third housing side portion.

In addition, the third holder outer surface 1131S3 may include a third seating groove 1131S3a. The second magnet 1151b may be disposed in the third seating groove 1131S3a. The third holder outer surface 1131S3 may be positioned to face the third housing side portion 1123.

In addition, at least a portion of the third housing hole 1123a may overlap the third seating groove 1131S3a in the first direction (X-axis direction). Therefore, the second magnet 1151b in the third seating groove 1131S3a and the second coil 1152b in the third housing hole 1123a may be positioned to face each other. In addition, the second magnet 1151b and the second coil 1152b may generate electromagnetic forces so that the first camera actuator may perform Y axis tilting.

In addition, X-axis tilting may be performed by only the first magnet, and Y-axis tilting may be performed by only the second magnet.

In an embodiment, the third seating groove 1131S3a may be the same as the first seating groove 1131S1a or the second seating groove 1131S2a. With this configuration, the Y-axis tilting may be performed by the same current control as that of the X-axis tilting.

The fourth holder outer surface 1131S4 may be in contact with the first holder outer surface 1131S1 and the second holder outer surface 1131S2 and may be an outer surface extending from the first holder outer surface 1131S1 and the second holder outer surface 1131S2 in the first direction (X-axis direction). In addition, the fourth holder outer surface 1131S4 may be positioned between the first holder outer surface 1131S1 and the second holder outer surface 1131S2. In other words, the fourth holder outer surface 1131S4 may be positioned to face the second member.

In addition, the first member is disposed in the first region AR1, and the first member 1131a may include the first groove gr1. In an embodiment, the first member 1131a may include the first groove gr1 formed on an inner surface 1131aas. In addition, as described above, the magnetic substance may be disposed in the first groove gr1.

In addition, as described above, the second member may be disposed in the second region AR2. The first groove gr1 may be positioned to face the second groove gr2. For example, at least a portion of the first groove gr1 may overlap the second groove gr2 in the third direction (Z-axis direction). In addition, as described above, the repulsive force generated by the magnetic material disposed in the first and second grooves may be transmitted to the fourth seating groove 1131S4a of the holder 1131 through the first member. Therefore, the holder may apply a force to the tilting guide unit in the same direction as that of the repulsive force generated by the magnetic substance. The applied force may be combined with the preload of the elastic member and may firmly maintain the coupling between the mover, the housing and the tilting guide unit. Therefore, it is possible to improve the reliability of the camera module against external impact.

The second member may include the second groove gr2 facing the first groove gr1 formed on the outer surface thereof. In addition, the second member may include the second protrusion groove formed on the inner surface thereof as described above. In addition, the second protrusion may be seated in the second protrusion groove. The tilting guide unit 1141 may be disposed in the third region AR3. In addition, the first protrusion groove PH1 may be positioned in the fourth seating groove 1131S4a. In addition, the first protrusion of the tilting guide unit 1141 may be accommodated in the first protrusion groove PH1. Therefore, the first protrusion PR1 may be in contact with the first protrusion groove. A maximum diameter of the first protrusion groove PH1 may correspond to a maximum diameter of the first protrusion PR1. This may also be applied to the second protrusion groove and the second protrusion PR2 in the same manner. In other words, a maximum diameter of the second protrusion groove may correspond to a maximum diameter of the second protrusion PR2. Therefore, the second protrusion may be in contact with the second protrusion groove. With this configuration, the first axis tilt with respect to the first protrusion and the second axis tilt with respect to the second protrusion may easily occur, and a radius of the tilt can be increased.

In addition, in an embodiment, a plurality of first protrusion grooves PH1 may be provided. For example, any one of the first protrusion groove PH1 and the second protrusion groove PH2 may include a 1-1 protrusion groove PH1a and a 1-2 protrusion groove PH1b. Hereinafter, it will be described that the first protrusion groove PH1 includes the 1-1 protrusion groove PH1a and the 1-2 protrusion groove PH1b. In addition, the following description may be applied to the second protrusion groove PH2 in the same manner. For example, the second protrusion groove PH2 may include a 2-1 protrusion groove and a 2-2 protrusion groove, a description of the 1-1 protrusion groove may be applied to the 2-1 protrusion groove, and a description of the 1-2 protrusion groove may be applied to the 2-2 protrusion groove.

The 1-1 protrusion groove PH1$a$ and the 1-2 protrusion groove PH1$b$ may be disposed side by side in the first direction (X-axis direction). The 1-1 protrusion groove PH1$a$ and the 1-2 protrusion groove PH1$b$ may have the same maximum width.

The plurality of first protrusion grooves PH1 may have different numbers of inclined surfaces. For example, the first protrusion groove PH1 may include a groove bottom surface and an inclined surface. In this case, the plurality of protrusion grooves may have different numbers of inclined surfaces. In addition, a width of the bottom surface of the protrusion groove may also be different. This may also be applied to the first and second protrusion grooves described above in the same manner.

For example, the 1-1 protrusion groove PH1$a$ may include a first groove bottom surface LS1 and a first inclined surface CS1. The 1-2 protrusion groove PH1$b$ may include a second groove bottom surface LS2 and a second inclined surface CS2.

In this case, the first groove bottom surface LS1 and the second groove bottom surface LS2 may have different areas. The area of the first groove bottom surface LS1 may be smaller than the area of the second groove bottom surface LS2.

In addition, the number of first inclined surfaces CS1 in contact with the first groove bottom surface LS1 may be different from the number of second inclined surfaces CS2. For example, the number of first inclined surfaces CS1 may be greater than the number of second inclined surfaces CS2.

With this configuration, it is possible to easily compensate for the assembly tolerance of the first protrusion seated in the first protrusion groove PH1. For example, since the number of first inclined surfaces CS1 is greater than the number of second inclined surfaces CS2, the first protrusion is in contact with more inclined surfaces, and thus the position of the first protrusion may be more accurately maintained in the 1-1 protrusion groove PH1$a$.

Conversely, since the number of inclined surfaces in contact with the first protrusion in the 1-2 protrusion groove PH1$b$ is smaller than that of the 1-1 protrusion groove PH1$a$, the position of the first protrusion may be easily adjusted.

In an embodiment, the second inclined surfaces CS2 may be disposed to be spaced apart from each other in the second direction (Y-axis direction). In addition, the second groove bottom surface LS2 may extend in the first direction (X-axis direction) so that the first protrusion may easily move in the first direction (X-axis direction) in a state of being in contact with the second inclined surface CS2. In other words, the position of the first protrusion may be easily adjusted in the 1-2 protrusion groove PH1$b$.

In addition, the first member 1131$a$ may be seated on the fourth holder outer surface 1131S4. The second coupling portion PP2 may be positioned on the outer surface of the first member 1131$a$ (e.g., a surface opposite to a surface facing the first member 1131$a$). The second coupling portion PP2 may include the coupling base PP2$a$ and the second coupling protrusion PP2$b$. The second coupling portion PP2 may be disposed to overlap the first protrusion to be described below in the first direction (X-axis direction).

A plurality of second coupling protrusions PP2$b$ may be disposed to be spaced apart from each other in the second direction (Y-axis direction). In this case, all bisectors between the plurality of second coupling protrusions PP2$b$ may be positioned on the apex of the first protrusion and the first direction (X-axis direction).

In addition, the first member 1131$a$ may include the first groove gr1. In other words, the first groove gr1 may be positioned on an inner surface of a member base unit 1131$aa$. In addition, the magnetic substance described above may be seated in the first groove gr1. In addition, a plurality of first grooves gr1 may be provided according to the number of magnetic substances. In other words, the number of first grooves gr1 may correspond to the number of magnetic substances.

In addition, the first member 1131$a$ may include the member base unit 1131$aa$, the first extension 1131$ab$, and a second extension 1131$ac$.

The member base unit 1131$aa$ may be positioned on an outermost side of the first camera actuator. The member base unit 1131$aa$ may be positioned outside the second member. In other words, the second member may be positioned between the member base unit 1131$aa$ and the tilting guide unit.

The first extension 1131$ab$ may extend from an edge of the member base unit 1131$aa$ in the third direction (Z-axis direction). In other words, the first extension 1131$ab$ may extend from the member base unit 1131$aa$ toward the holder 1131. This may also be applied to the second extension 1131$ac$ in the same manner. In addition, the second extension 1131$ac$ may extend from the edge of the member base unit 1131$aa$ in the third direction (Z-axis direction). In an embodiment, the first extension 1131$ab$ and the second extension 1131$ac$ may be positioned on the edges of the member base unit 1131$aa$ in the second direction (Y-axis direction). In addition, the first extension 1131$ab$ and the second extension 1131$ac$ may be disposed between the upper member and the lower member.

Therefore, the first member 1131$a$ may have a groove formed by the first extension 1131$ab$ and the second extension 1131$ac$. In other words, the groove may be positioned between the first extension 113 lab and the second extension 1131$ac$. Therefore, the first extension 1131$ab$ and the second extension 1131$ac$ may be connected to each other by only the member base unit 1131$aa$.

In addition, since the first member 1131$a$ is coupled to the holder and moves when X-axis tilting and Y-axis tilting are performed, the stiffness of the first member 1131$a$ may be greater than the stiffness of the second member.

Furthermore, as described above, the second member according to the embodiment may have an upper member and a lower member, thereby increasing stiffness. With this configuration, it is possible to reduce a difference in the stiffness between the first member and the second member. Therefore, when the first member 1131$a$ and the holder 1131 coupled to the first member 1131$a$ tilts to the X-axis or the Y-axis, the first member 1131$a$ may have a reduced distance adjacent to the second member and may be in contact with the second member. Therefore, the second member may have improved stiffness as described above, thereby easily performing an operation as a stopper. In other words, it is possible to improve the reliability of the camera actuator.

Furthermore, a difference in the stiffness between the second member and the first member can be reduced, thereby minimizing contact damage when tilting is performed. In other words, it is possible to improve the reliability of the camera actuator.

In addition, the first extension 113 lab may be spaced apart from the second extension 1131$ac$ in the second direction (Y-axis direction) to form a separation space. The second member and the tilting guide unit may be seated in the separation space.

In addition, the first extension 1131*ab* and the second extension 1131*ac* may have the same length in the third direction (Z-axis direction). Therefore, the coupling force, the weight, and the like are formed in a balanced manner so that tilting of the holder may be accurately performed without tilting of the holder inclined to one side.

In addition, the first extension 1131*ab* and the second extension 1131*ac* may be coupled to the holder. In the specification, it should be understood that coupling may be coupling through the bonding member other than the protrusion and groove structures described above. In an embodiment, the first extension 1131*ab* and the second extension 1131*ac* may include the third coupling groove 1131*k* formed in the third direction (Z-axis direction). In addition, a coupling protrusion 1131*m* may be positioned in a region of the fourth seating groove 1131S4*a*, which overlaps the first extension 1131*ab* and the second extension 1131*ac* in the third direction (Z-axis direction). The coupling protrusion 1131*m* may be positioned to correspond to the third coupling groove 1131*k*.

For example, the bonding member such as an epoxy may be applied to the third coupling groove 1131*k*. In addition, the coupling protrusion 1131*m* may be inserted into the third coupling groove 1131*k* of the first extension 1131*ab* and the second extension 1131*ac*. With this configuration, the first member 1131*a* and the holder 1131 may be coupled to each other. In addition, through the coupling, the repulsive force applied to the first member 1131*a* may be transmitted to the holder 1131. However, it should be understood that the positions of the protrusion and groove structures may also be reversed as described above.

In addition, in an embodiment, the holder 1131 of the mover 1130 or the first member 1131*a* coupled to the holder 1131 may include the mover protrusion 1131*p* protruding toward the outside or the spring or outward from the fourth holder outer surface 1131S4 or the outer surface of the first member.

The mover protrusion 1131*ap* may include a plurality of protrusions. For example, the mover protrusion 1131*p* may include a first protrusion 1131*ap*1, a second protrusion 1131*ap*2, and a third protrusion 1131*ap*3, and the above description may also be applied to the embodiment.

FIG. 45A is a plan view of an elastic member according to the embodiment, FIG. 45B is a side view of the elastic member according to the embodiment, FIG. 45C is a top view of the elastic member according to the embodiment, FIG. 45D is a view for describing coupling between a first member, a second member, and the elastic member in the first camera actuator according to the fourth embodiment, and FIG. 45E is a view illustrating FIG. 45D from which the first member and the second member are removed.

Referring to FIGS. 45A to 45C, the elastic member EE according to the embodiment may include the first bonding portion EP1, the second bonding portion EP2, and the connecting portion CP.

In an embodiment, the first bonding portion EP1 may be connected to the first housing 1120, and the first bonding portion EP1 and the first housing 1120 may be coupled to each other. In other words, the first bonding portion EP1 may be coupled to the fixing member. Alternatively, the first bonding portion EP1 may be coupled to the housing 1120 or the second member 1126. Hereinafter, as shown in the drawing, the first bonding portion EP1 may be coupled to the second member 1126. Therefore, the first bonding portion EP1 may be coupled to the housing 1120 described above.

In addition, the second bonding portion EP2 may be connected to the first member 1131*a*, and the second bonding portion EP2 and the first member 1131*a* may be coupled to each other.

The connecting portion CP may be disposed between the first bonding portion EP1 and the second bonding portion EP2. In other words, the connecting portion CP may have one end connected to the first bonding portion EP1 and the other end connected to the second bonding portion EP2.

Specifically, the first bonding portion EP1 according to the embodiment may include the first flat region EP 1 f and the plurality of first bonding holes EP positioned in the first flat region EP1*f*.

The first flat region EP1*f* may have a rectangular shape. Therefore, the first flat region EP 1 f may have a closed loop shape. In addition, the first flat region EP1*f* may be positioned along the edge of the second member 1126. Therefore, it is possible to improve the coupling force between the first bonding portion EP1 and the second member 1126 and improve the reliability of the device by the support and coupling by the second member 1126 when the preload is generated, which will be described below.

A plurality of first bonding holes EP1*h* may be provided and may be in the form of a hole or a groove. In addition, the first bonding hole EP1*h* may be coupled to a protrusion formed on the second member 1126 or the like.

In addition, the first bonding hole EP1*h* may be disposed on the first bisector LX1 or the second bisector LX2 or disposed symmetrically with respect to the first bisector LX1 or the second bisector LX2. Therefore, since the coupling force by the elastic member EE is not concentrated on one side, X-axis tilting or Y-axis tilting may be accurately performed.

In addition, the first bisector LX1 may be a line bisecting the first bonding portion EP1 in the first direction (X-axis direction). Alternatively, the first bisector LX1 may be a line bisecting the second bonding portion EP2 in the first direction (X-axis direction). In addition, the second bisector LX2 may be a line bisecting the first bonding portion EP1 in the second direction (Y-axis direction). Alternatively, the second bisector LX2 may be a line bisecting the second bonding portion EP2 in the second direction (Y-axis direction). In addition, an intersection CK may be a point where the first bisector LX1 and the second bisector LX2 cross. Hereinafter, the following description will be given based on this.

The second bonding portion EP2 may be positioned on an inner side of the first bonding portion EP1. Specifically, the second bonding portion EP2 may be surrounded by the first bonding portion EP1. An inward direction is a direction from the first bonding portion EP to the second bonding portion EP2 and corresponds to a direction from the first coupling portion toward the second coupling portion. In addition, the second bonding portion EP2 may be disposed between the mover 1130 and the first bonding portion EP1. Alternatively, the second bonding portion EP2 may be disposed between the first member 1131*a* and the first bonding portion EP1. In other words, the second bonding portion EP2 may be disposed to be spaced apart from the first bonding portion EP1 in the third direction (Z-axis direction).

The connection portion CP according to the embodiment may extend from the first member 1131*a* toward the second member 1126 or from the second member 1126 toward the first member 1131*a*. In other words, the connecting portion CP may extend in the third direction (Z-axis direction). For example, the connecting portion CP may be disposed between the first bonding portion EP1 and the second bonding portion EP2 and may connect the first bonding portion EP1 with the second bonding portion EP2. Therefore, the elastic restoring force generated by the elastic member EE may be formed from the second bonding portion EP2 toward the first bonding portion EP1 because the first bonding portion EP1 is a fixed member fixed to the housing (the housing is fixed). Therefore, the first member 1131a connected to the second bonding portion EP2 and the mover 1130 coupled to the first member 1131a may also generate a force from the second bonding portion EP2 toward the first bonding portion EP1. Therefore, the above-described force may be applied between the mover 1130 and the tilting guide unit 1141. In addition, finally, since the tilting guide unit 1141 presses the second member 1126, the tilting guide unit 1141 may maintain the position between the mover 1130 and the second member 1126 so that first axis tilting or second axis tilting, which will be described below, may be performed.

In addition, the elastic member EE may have the preload, which is a force described above, due to the separation distance dd1 between the first bonding portion EP1 and the second bonding portion EP2 in the third direction (Z-axis direction).

In addition, the second bonding portion EP2 of the elastic member EE may not be disposed on the first bonding portion EP1 of the elastic member EE and the surface in contact with the second member 1126, which is the fixed member. As described above, the first bonding portion EP1 and the second bonding portion EP2 may be positioned on different planes XY and spaced apart from each other in the third direction (Z-axis direction). Therefore, the second bonding portion EP2 may be positioned closer to the reflective member than the first bonding portion EP1.

Therefore, in an embodiment, even when the preload is formed in a direction opposite to the third direction (e.g., a direction from the tilting guide unit toward the first member), the position of the tilting guide unit 1141 may be easily maintained. In addition, when a magnetic substance or the like is not used, it is possible to prevent the malfunction of another camera actuator (e.g., the second camera actuator) adjacent to the first camera actuator due to a magnetic force. In addition, the first camera actuator according to the fourth embodiment may be easily miniaturized using an elastic member having a light weight and a smaller thickness without using the magnetic substance or the like. Alternatively, as a modified example, a repulsive force between magnetic substances may be generated by arranging the magnetic substances having the same polarity in the first groove and the second groove. At this time, the generated repulsive force may be transmitted to the fourth seating groove of the holder through the first member. The holder may apply a force to the tilting guide unit in the same direction as that of the generated repulsive force. Therefore, the elastic member may be easily restored by the repulsive force generated by the magnetic substance. In other words, it is possible to improve the reliability of the elastic member. Furthermore, the position of the tilting guide unit 1141 may be more easily maintained by the generated repulsive force and thus the X-axis tilt or the Y-axis tilt may be accurately performed.

In an embodiment, the second bonding portion EP2 may include the second flat region EP2f and a plurality of second bonding holes EP2h positioned in the second flat region EP2f. The second flat region EP2f may have a circular shape and may be in contact with the first member 1131a. In addition, the second bonding hole EP2h may be coupled to the second coupling portion PP2.

In addition, in an embodiment, the plurality of first bonding holes EP1h may be disposed to be spaced apart from each other in the first direction (X-axis direction) or the second direction (Y-axis direction). In addition, the second bonding holes EP2h may be disposed to be spaced apart from each other in the second direction (Y-axis direction).

In addition, the second bonding hole EP2h may be positioned between adjacent first bonding holes EP1h. For example, the second bonding hole EP2h and the first bonding hole EP1h may be disposed on the first bisector LX1. In addition, the first bonding hole EP1h may also be disposed on the second bisector LX2. Therefore, in the first camera actuator according to the fourth embodiment, the force pressed by the elastic member EE may be uniformly provided to the mover.

In addition, X-axis tilting may be performed by adjusting the amount of current provided to the first coil. In other words, since the position of the mover is restored to the initial position by the elastic member EE after driving, X-axis tilting may be easily performed with only the current applied to the first coil. Therefore, the camera module according to the embodiment can improve energy efficiency and can be easily driven.

In an embodiment, the connecting portion CP may include the first connecting portion CP1, the second connecting portion CP2, the third connecting portion CP3, and the fourth connecting portion CP4, which are positioned between the first bonding portion EP1 and the second bonding portion EP2. The following description may be applied to the first connecting portion CP to the fourth connecting portion CP4.

The first connecting portion CP1, the second connecting portion CP2, the third connecting portion CP3, and the fourth connecting portion CP4 may be respectively disposed in a first quadrant region S1 to a fourth quadrant region S4 partitioned by the first bisector LX1 and the second bisector LX2.

The first connecting portion CP1, the second connecting portion CP2, the third connecting portion CP3, and the fourth connecting portion CP4 may be disposed sequentially clockwise or counterclockwise from the first bonding portion EP1 to the second bonding portion EP2. The following description will be given based on counterclockwise. For example, the first connecting portion CP1, the second connecting portion CP2, the third connecting portion CP3, and the fourth connecting portion CP4 may be respectively positioned in the first quadrant region S1, the second quadrant region S2, the third quadrant region S3, and the fourth quadrant region S4 partitioned by the first bisector LX1 and the second bisector LX2. The first quadrant region S1 to the fourth quadrant region S4 are positioned counterclockwise.

In addition, each of the first connecting portion CP1, the second connecting portion CP2, the third connecting portion CP3, and the fourth connecting portion CP4 may have a shape, such as a bent shape, between the first connecting portion EP1 and the second connecting portion EP2.

In particular, the first connecting portion CP1, the second connecting portion CP2, the third connecting portion CP3, and the fourth connecting portion CP4 according to the embodiment may have the same shape counterclockwise. In other words, the first connecting portion CP1 and the third connecting portion CP3 may be symmetrical to each other with respect to the first bisector LX1 and the second bisector LX2. In addition, the second connecting portion CP2 and the fourth connecting portion CP4 may be symmetrical to each other with respect to the first bisector LX1 and the second bisector LX2. With this configuration, it is possible to improve the linearity of the restoring force for the X-axis tilt or the Y-axis tilt. For example, when the first connecting portion CP1 to the fourth connecting portion CP4 are symmetrical with respect to only any one of the first bisector LX1 and the second bisector LX2, the restoring force for the X/Y axis tilt may become imbalanced in one direction. However, in the camera actuator according to the embodiment, the connecting portions are symmetrical with respect to the first bisector LX1 and the second bisector LX2, and thus the imbalance may be resolved.

In an embodiment, the first bonding portion EP1 may include a first bonding point P1 to a fourth bonding point P4, which are in contact with the connecting portion CP. In addition, the second bonding portion EP2 may include a fifth bonding point P5 to an eighth bonding point P8, which are in contact with the connecting portion CP.

The first connecting portion CP1 may be in contact with the first bonding point P1 of the first bonding portion EP1 and may be in contact with the fifth bonding point P5 of the second bonding portion EP2. In addition, the second connecting portion CP2 may be in contact with the second bonding point P2 of the first bonding portion EP1 and may be in contact with the sixth bonding point P6 of the second bonding portion EP2. In addition, the third connecting portion CP3 may be in contact with the third bonding point P3 of the first bonding portion EP1 and may be in contact with the seventh bonding point P7 of the second bonding portion EP2. In addition, the fourth connecting portion CP4 may be in contact with the fourth bonding point P4 of the first bonding portion EP1 and may be in contact with the eighth bonding point P8 of the second bonding portion EP2.

In addition, the first bonding point P1, the fifth bonding point P5, the third bonding point P3, and the seventh bonding point P7 may be disposed on a first diagonal line DL1 passing the intersection CK. Furthermore, the second bonding point P2, the sixth bonding point P6, the fourth bonding point P4, and the eighth bonding point P8 may be disposed on a second diagonal line DL2 passing the intersection CK.

In addition, the first connecting portion CP1 may have a structure that extends inward from the first bonding point P1, is bent downward from the first virtual line DL1, then extend inward, and protrudes downward from the first virtual line DL1. In addition, the first connecting portion CP1 may have a structure that extends, is bent, and protrudes upward from the first virtual line DL1. In addition, the first connecting portion CP1 may have a structure that extends, is bent, and protrudes downward from the first virtual line DL1 and then may be in contact with the fifth bonding point P5 of the second bonding portion EP2.

The second connecting portion CP2 may have a structure that extends inward from the second bonding point P2, is bent upward from the second diagonal line DL2, then extends inward, and protrudes downward from the second virtual line DL2. The second connecting portion CP2 may have a structure that extends, is bent, and protrudes downward from the second virtual line DL2, then form a structure that extends, is bent, and protrudes upward from the second virtual line DL2, and then may be in contact with the sixth bonding point P6 of the second bonding portion EP2.

The third connecting portion CP3 may have a structure that extends inward from the third bonding point P3, is bent upward from the first diagonal line DL1, then extends inward, and protrudes downward from the first virtual line DL1. The third connecting portion CP3 may have a structure that extends, is bent, and protrudes downward from the first virtual line DL1, then form a structure that extends, is bent, and protrudes upward from the first virtual line DL1, and then may be in contact with the seventh bonding point P7 of the second bonding portion EP2.

The fourth connecting portion CP4 may have a structure that extends inward from the fourth bonding point P4, is bent downward from the second virtual line DL2, then extends inward, and protrudes downward from the second virtual line DL2. In addition, the fourth connecting portion CP4 may have a structure that extends, is bent, and protrudes upward from the second virtual line DL2. In addition, the fourth connecting portion CP4 may have a structure that extends, is bent, and protrudes downward from the second virtual line DL2 and may be in contact with the eighth bonding point P8 of the second bonding portion EP2.

Referring to FIGS. 45D and 45E, in the first camera actuator according to the fourth embodiment, the second bonding portion EP2 may overlap the first protrusion PR1 in the second axis or the first direction.

In addition, the apex of the first protrusion PR1 in the base to be described below may be disposed on the middle axis (corresponding to the above-described second virtual line LX2) bisecting the plurality of second bonding holes EP2$h$. With this configuration, when second axis tilting is performed by the first protrusion PR1, the force applied to the tilting guide unit by the elastic member EE may be uniformly generated with respect to the second axis or the first direction.

In addition, the apex of the second protrusion PR2 may be positioned on the first bisector LX1. In other words, the apex of the second protrusion PR2 may be disposed on the first bisector LX1 bisecting the first bonding hole EP1$h$. Therefore, in the camera actuator according to the embodiment, the force pressed by the elastic member EE may be uniformly provided to both of an upper portion and a lower portion of the mover.

In addition, at least a portion of the mover protrusion 1131$ap$ may overlap the connecting portion CP in the first direction. In addition, the damper member DP may be disposed between the mover protrusion 1131$ap$ and the connecting portion CP. Therefore, the damper member DP may be coupled to the mover protrusion 1131$ap$ and the connecting portion CP. With this configuration, the damper member DP can suppress vibration at the settling time when the mover rotates about an axis. In addition, the damper member DP can suppress damage to the spring due to a resonant frequency. Therefore, it is possible to improve the reliability of the first camera actuator according to the embodiment.

FIG. 46 is a view of a first camera actuator according to a fifth embodiment.

Referring to FIG. 46, the first camera actuator 1100D according to the fifth embodiment includes the first housing 1120, the mover 1130, the rotational unit 1140, the first driving unit 1150, the elastic member EE, the second member 1126, the first member 1131$a$, and the damper members DP1 and DP2. Furthermore, the above description may be applied in the same manner except for the following description.

In the first camera actuator 1100C according to the fifth embodiment, the first member 1131$a$ may include the member protrusion 1131$ap$ disposed adjacent to the connecting portion CP.

At least a portion of the member protrusion 1131$ap$ may overlap the connecting portion CP in the optical axis direction or the third direction (Z-axis direction). Alternatively, the member protrusion 1131*ap* may be disposed adjacent to the connecting portion CP even when not overlapping the connecting portion CP in the optical axis direction.

In addition, at least a portion of the connecting portion CP may be curved to correspond to the outer surface of the member protrusion 1131*ap*. In other words, the connecting portion CP and the member protrusion 1131*ap* may have the facing surfaces or lines corresponding to each other. In addition, the facing surfaces or lines described above may be curved. Therefore, the damper member DP1 may be easily coupled to the first member 1131*a* and the elastic member EE. Furthermore, the member protrusion 1131*ap* can suppress a phenomenon in which the damper member DP1 is coupled to a member other than the first member 1131*a* and the elastic member EE. In addition, the member protrusion 1131*ap* may have a region protruding to one side by the curved surfaces or lines described above. Therefore, the first member protrusion 1131*ap* and the first member 1131*a* may be easily coupled by the damper member DP1.

In addition, the upper surface of the first member 1131*a* may have a smaller width or length in the first direction (X-axis direction) than the lower surface thereof. For example, the width or length of the upper surface of the first member 1131*a* in the first direction (X-axis direction) may be smaller than the width or length of the lower surface of the first member 1131*a* in the first direction (X-axis direction).

Furthermore, the upper surface of the first member 1131*a* may have a smaller area than the lower surface thereof. With this configuration, it is possible to easily secure a coupling region between the damper member DP1 and the elastic member EE and easily suppress a phenomenon in which the damper member moves down.

In addition, the height or length of the second coupling portion in the third direction (Z-axis direction) may be smaller than the width or length of the member protrusion 1131*ap* in the third direction. Therefore, as described above, the preload of the elastic member EE may be easily formed, and the member protrusion 1131*ap* and the damper member DP1 may also be coupled.

In addition, the damper member DP1 may be disposed in a region above the second bonding portion EP2. Likewise, the member protrusion 1131*ap* may also be disposed in the region above the second bonding portion EP2. Therefore, the damper member DP1 may be coupled to the member protrusion 1131*ap* and the connecting portion CP in a region of the second bonding portion EP2 in the first direction. With this configuration, the damper member DP1 can suppress vibration at the settling time when the mover rotates about an axis. In addition, the damper member DP1 can suppress damage to the spring due to the resonant frequency. Therefore, it is possible to improve the reliability of the first camera actuator according to the embodiment.

In addition, the member protrusion 1131*ap* may be positioned between the first bonding portion and the second bonding portion. In addition, the member protrusions 1131*ap* may overlap with the connecting portion at least partially in the second direction (Y-axis direction). In addition, since the first connecting portion and the second connecting portion are not symmetrical with respect to the first direction, the member protrusion 1131*ap* may not be symmetrically disposed with respect to the first direction.

In addition, in an embodiment, the second member 1126 may include the housing protrusion 1126*p* disposed adjacent to the connecting portion CP. The housing protrusion 1126*p* may be disposed adjacent to the connecting portion CP.

Furthermore, at least a portion of the housing protrusion 1126*p* may overlap the connecting portion CP in the first direction (X-axis direction).

In addition, at least a portion of the connecting portion CP may correspond to the outer surface of the housing protrusion 1126*p*. For example, the connecting portion CP and the housing protrusion 1126*p* may have the facing surfaces or lines corresponding to each other. In addition, the facing surfaces or lines described above may be curved. Therefore, the damper member DP2 may be easily coupled to the second member 1126 and the elastic member EE. Furthermore, it is possible to suppress a phenomenon in which the damper member DP2 is coupled to the member other than the second member 1126 and the elastic member EE. Therefore, the housing protrusion 1126*p* may have the region 1126*pp* protruding to one side by the curved surfaces or lines described above. Therefore, the damper member DP2 can suppress vibration at the settling time when the mover rotates about an axis. In addition, the damper member DP2 can more effectively suppress damage to the spring due to the resonant frequency. Therefore, it is possible to improve the reliability of the first camera actuator according to the embodiment.

In addition, at least a portion of the housing protrusion 1126*p* may overlap the connecting portion CP in the optical axis direction or in the third direction (Z-axis direction). Therefore, it is possible to further improve the coupling force between the housing protrusion 1126*p* and the connecting portion CP by the damper member DP2. Furthermore, the separation of the connecting portion CP can be suppressed by the housing protrusion 1126*p*.

Alternatively, the housing protrusion 1126*p* may also be disposed to be spaced apart from each other in a region crossing the third direction without overlapping the connecting portion CP in the third direction.

In addition, the damper member DP2 may be disposed in a region under the second bonding portion EP2. Likewise, the housing protrusion 1126*p* may also be disposed in a region above the second bonding portion EP2. FIG. 47 is a view of a first camera actuator according to a sixth embodiment.

Referring to FIG. 47, the first camera actuator 1100E according to the sixth embodiment includes the first housing 1120, the mover 1130, the rotational unit 1140, the first driving unit 1150, the elastic member EE, the second member 1126, the first member 1131*a*, and the damper member DP1. Furthermore, the above description may be applied in the same manner except for the following description.

In the first camera actuator 1100E according to the sixth embodiment, the first member 1131*a* may include the member protrusion 1131*ap* disposed adjacent to the connecting portion CP. The above description may be applied to a description thereof. Furthermore, the housing protrusion and the damper member described above may not be coupled to the elastic member EE.

As described above, the member protrusion 1131*ap* may be disposed in the region above the second bonding portion EP2. In addition, the damper member DP1 may be disposed in an upper region with respect to the second bonding portion EP2.

In addition, a plurality of member protrusions 1131*ap* may be disposed in the region under the second bonding portion EP2. For example, the member protrusion 1131*ap* may be disposed adjacent to each of the first connecting portion to the fourth connecting portion. Further, each of the plurality of member protrusions 1131*ap* may be coupled to the first connecting portion to the fourth connecting portion through the damper member DP1.

FIG. 48 is a view of a first camera actuator according to a seventh embodiment.

Referring to FIG. 48, the first camera actuator 1100F according to the seventh embodiment includes the first housing 1120, the mover 1130, the rotational unit 1140, the first driving unit 1150, the elastic member EE, the second member 1126, the first member 1131a, and the damper member DP2. Furthermore, the above description may be applied in the same manner except for the following description.

In the first camera actuator 1100F according to the seventh embodiment, the first member 1131a may not be coupled to the elastic member through the member protrusion 1131ap disposed adjacent to the connecting portion CP and the damper member. In addition, the second member 1126 may include the housing protrusion 1126p protruding outward or in third direction (Z-axis direction). In addition, the housing protrusion 1126p may be coupled to the elastic member (connecting portion) through the damper member DP2. The above description may be applied to a description thereof.

In addition, as described above, the housing protrusion 1126p may be disposed in the region under the second bonding portion EP2. In addition, the damper member DP1 may be disposed in the region under the second bonding portion EP2.

FIG. 49 is a view of a first camera actuator according to an eighth embodiment.

Referring to FIG. 49, the first camera actuator 1100G according to the eighth embodiment includes the first housing 1120, the mover 1130, the rotational unit 1140, the first driving unit 1150, the elastic member EE, the second member 1126, the first member 1131a, and the damper member DP. Furthermore, the above description may be applied in the same manner except for the following description.

In addition, in an embodiment, the holder 1131 of the mover 1130 or the first member 1131a coupled to the holder 1131 may include the mover protrusion 1131p protruding toward the outside or the spring or outward from the fourth holder outer surface 1131S4 or the outer surface of the first member.

The mover protrusion 1131ap may include a plurality of protrusions. For example, the mover protrusion 1131p may include the first protrusion 1131ap1, the second protrusion 1131ap2, and the third protrusion 1131ap3, and the above description may also be applied to the embodiment.

In addition, at least a portion of the mover protrusion 1131ap may overlap the connecting portion CP in the first direction. In addition, the damper member DP may be disposed between the mover protrusion 1131ap and the connecting portion CP. Therefore, the damper member DP may be coupled to the mover protrusion 1131ap and the connecting portion CP. With this configuration, the damper member DP can suppress vibration at the settling time when the mover rotates about an axis. In addition, the damper member DP can suppress damage to the spring due to the resonant frequency. Therefore, it is possible to improve the reliability of the first camera actuator according to the embodiment.

In the first camera actuator 1100E according to the embodiment, the first member 1131a may include the member protrusion 1131ap disposed adjacent to the connecting portion CP. The above description may be applied to a description thereof. Furthermore, the housing protrusion and the damper member described above may not be coupled to the elastic member EE.

As described above, the member protrusion 1131ap may be disposed in an upper region with respect to the second bonding portion EP2. In addition, the damper member DP1 may be disposed in an upper region with respect to the second bonding portion EP2.

In addition, a plurality of member protrusions 1131ap may be disposed in the region under the second bonding portion EP2. For example, the member protrusion 1131ap may be disposed adjacent to each of the first connecting portion to the fourth connecting portion. Further, each of the plurality of member protrusions 1131ap may be coupled to the first connecting portion to the fourth connecting portion through the damper member DP1.

Alternatively, the second member 1126 may include the housing protrusion 1126p protruding outward or in the third direction (Z-axis direction). In addition, the housing protrusion 1126p may be coupled to the elastic member (connecting portion) through the damper member DP2. The above description may be applied to a description thereof.

FIG. 50 is a perspective view of a second camera actuator according to the eighth embodiment, FIG. 51 is an exploded perspective view of the second camera actuator according to the embodiment, FIG. 52 is a cross-sectional view along line D-D' in FIG. 50, and FIG. 53 is a cross-sectional view along line E-E' in FIG. 50.

Referring to FIGS. 50 to 53, the second camera actuator 1200 according to the embodiment may include a lens unit 1220, a second housing 1230, a second driving unit 1250, a base unit (not shown), and a second board unit 1270. Furthermore, the second camera actuator 1200 may further include a second shield can (not shown), an elastic unit (not shown), and a bonding member (not shown). Furthermore, the second camera actuator 1200 according to the embodiment may further include an image sensor IS.

The second shield can (not shown) may be positioned in one region (e.g., an outermost side) of the second camera actuator 1200 and positioned to surround components (the lens unit 1220, the second housing 1230, the elastic unit (not shown), the second driving unit 1250, the base unit (not shown), the second board unit 1270, and the image sensor IS) to be described below.

The second shield can (not shown) may block or reduce the influence of electromagnetic waves generated from the outside. Therefore, it is possible to reduce the number of occurrences of the malfunction of the second driving unit 1250.

The lens unit 1220 may be positioned in the second shield can (not shown). The lens unit 1220 may move in the third direction (Z-axis direction). Therefore, the above-described AF function may be performed.

Specifically, the lens unit 1220 may include a lens assembly 1221 and a bobbin 1222.

The lens assembly 1221 may include at least one lens. In addition, a plurality of lens assemblies 1221 may be provided, but hereinafter, the description will be based on one lens assembly.

The lens assembly 1221 may be coupled to the bobbin 1222 to move in the third direction (Z-axis direction) by electromagnetic forces generated from a fourth magnet 1252a and a second magnet 1252b coupled to the bobbin 1222.

The bobbin 1222 may include an opening region surrounding the lens assembly 1221. In addition, the bobbin 1222 may be coupled to the lens assembly 1221 by various methods. In addition, the bobbin 1222 may include a groove in a side surface thereof and may be coupled to the fourth magnet 1252*a* and the second magnet 1252*b* through the groove. A bonding member or the like may be applied to the groove.

In addition, the bobbin 1222 may be coupled to an elastic unit (not shown) at an upper end and a rear end thereof. Therefore, the bobbin 1222 may be supported by the elastic unit (not shown) to move in the third direction (Z-axis direction). In other words, a position of the bobbin 1222 may be maintained while being maintained in the third direction (Z-axis direction). The elastic unit (not shown) may be formed of a leaf spring.

The second housing 1230 may be disposed between the lens unit 1220 and the second shield can (not shown). In addition, the second housing 1230 may be disposed to surround the lens unit 1220.

A hole may be formed in a side portion of the second housing 1230. A fourth coil 1251*a* and a fifth coil 1251*b* may be disposed in the hole. The hole may be positioned to correspond to the groove of the bobbin 1222 described above.

The fourth magnet 1252*a* may be positioned to face the fourth coil 1251*a*. In addition, the second magnet 1252*b* may be positioned to face the fifth coil 1251*b*.

The elastic unit (not shown) may include a first elastic member (not shown) and a second elastic member (not shown). The first elastic member (not shown) may be coupled to the upper surface of the bobbin 1222. The second elastic member (not shown) may be coupled to a lower surface of the bobbin 1222. In addition, the first elastic member (not shown) and the second elastic member (not shown) may be formed as a leaf spring as described above. In addition, the first elastic member (not shown) and the second elastic member (not shown) may provide elasticity with respect to the movement of the bobbin 1222.

The second driving unit 1250 may provide driving forces F3 and F4 for moving the lens unit 1220 in the third direction (Z-axis direction). The second driving unit 1250 may include a second driving coil 1251 and a second driving magnet 1252.

The lens unit 1220 may move in the third direction (Z-axis direction) by the electromagnetic force formed between the second driving coil 1251 and the second driving magnet 1252.

The second driving coil 1251 may include the fourth coil 1251*a* and the fifth coil 1251*b*. The fourth coil 1251*a* and the fifth coil 1251*b* may be disposed in the hole formed in the side portion of the second housing 1230. In addition, the fourth coil 1251*a* and the fifth coil 1251*b* may be electrically connected to the second board unit 1270. Therefore, the fourth coil 1251*a* and the fifth coil 1251*b* may receive a current or the like through the second board unit 1270.

The second driving magnet 1252 may include the fourth magnet 1252*a* and the fifth magnet 1252*b*. The fourth magnet 1252*a* and the fifth magnet 1252*b* may be disposed in the above-described groove of the bobbin 1222 and positioned to correspond to the fourth coil 1251*a* and the fifth coil 1251*b*.

The base unit (not shown) may be positioned between the lens unit 1220 and the image sensor IS. A component such as a filter may be fixed to the base unit (not shown). In addition, the base unit (not shown) may be disposed to surround the image sensor IS. With this configuration, since the image sensor IS is free from foreign substances, it is possible to improve the reliability of the device.

In addition, the second camera actuator may be a zoom actuator or an AF actuator. For example, the second camera actuator may support one or more lenses and perform an auto-focusing function or a zooming function by moving the lenses according to a predetermined control signal of a controller.

In addition, the second camera actuator may be a fixed zoom actuator or a continuous zoom actuator. For example, the second camera actuator may provide the movement of the lens assembly 1221.

In addition, the second camera actuator may be formed of a plurality of lens assemblies. For example, the second camera actuator may include at least one of a first lens assembly (not shown), a second lens assembly (not shown), a third lens assembly (not shown), and a guide pin (not shown). The above description may be applied thereto. Therefore, the second camera actuator may perform a high-magnification zooming function through the driving unit. For example, the first lens assembly (not shown) and the second lens assembly (not shown) may be a moving lens that moves through the driving unit and the guide pin (not shown), and the third lens assembly (not shown) may be a fixed lens, but the present invention is not limited thereto. For example, the third lens assembly (not shown) may perform a function of a focator for imaging light at a specific position, and the first lens assembly (not shown) may function as a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in the focal length or magnification change of the optical system. Meanwhile, imaging points of an image formed by the first lens assembly, which is the variator, may be slightly different depending on a position. Therefore, the second lens assembly (not shown) may perform a position compensation function for the image formed by the variator. For example, the second lens assembly (not shown) may perform a function of a compensator for accurately forming an image at an actual position of the image sensor using the imaging points of the image formed by the first lens assembly which is the variator.

The image sensor IS may be positioned inside or outside the second camera actuator. In the embodiment, as shown, the image sensor IS may be positioned inside the second camera actuator. The image sensor IS may receive light and convert the received light into an electrical signal. In addition, the image sensor IS may have a plurality of pixels in the form of an array. In addition, the image sensor IS may be positioned on the optical axis.

FIG. 54 is a perspective view of a mobile terminal to which a camera module according to the embodiment is applied.

As shown in FIG. 54, a mobile terminal 1500 in the embodiment may include a camera module 1000, a flash module 1530, and an AF device 1510 provided on a rear surface thereof.

The camera module 1000 may include an image capturing function and an AF function. For example, the camera module 1000 may include the AF function using an image.

The camera module 1000 processes image frames of still images or moving images obtained by an image sensor in a capturing mode or a video call mode.

The processed image frame may be displayed on a predetermined display part and stored in a memory. A camera (not shown) may also be disposed on a front surface of a body of the mobile terminal.

For example, the camera module 1000 may include a first camera module 1000A and a second camera module 1000B, and OIS may be implemented together with the AF or zooming function by the first camera module 1000A. In addition, the AF, zoom, and OIS functions may be performed by the second camera module 1000B. In this case, since the first camera module 1000A includes both the above-described first camera actuator and second camera actuator, the camera device or the camera module can be easily miniaturized by changing the optical path.

In addition, in the second camera module 1000B according to the above-described example, the first magnet may be disposed on the first side surface (corresponding to the above-described first holder outer surface) of the first camera actuator 1100, and the dummy member (instead of the second magnet) may be disposed on the second side surface (corresponding to the above-described second holder outer surface). In this case, the first camera module 1000A may be disposed closer to the second side surface than the first side surface. In addition, the second camera module 1000B may have a first side surface adjacent to the first camera module and a second side surface opposite to the first side surface and include a driving unit (corresponding to a magnet/coil, or the like) for moving the optical member between the optical member disposed therein and the second side surface. In other words, the second camera module 1000B may include the dummy member between the optical member and the first side surface.

Therefore, by arranging the dummy member on the second side surface, the second camera module 1000B may perform the actuator function using a magnetic substance (e.g., a magnet) in a state of minimizing the influence of the magnetic force generated from the first camera module. In addition, since the first camera module 1000A correspondingly has the dummy member adjacent to the second camera module 1000B, it is possible to minimize the influence of the magnetic force generated from the second camera module 1000B on the actuator function of the first camera module 1000A.

The flash module 1530 may include a light emitting device for emitting light therein. The flash module 1530 may be operated by a camera operation of the mobile terminal or a user's control.

The AF device 1510 may include one of packages of a surface light emitting laser device serving as a light emitting unit.

The AF device 150 may include the AF function using a laser. The AF device 1510 may be mainly used in a condition in which the AF function using the image of the camera module 1000 is degraded, for example, in an environment in which a subject is close to 10 m or less or in a dark environment.

The AF device 1510 may include a light emitting part including a vertical cavity surface emitting laser (VCSEL) semiconductor device and a light receiving part for converting light energy into electrical energy, such as a photodiode.

FIG. 55 is a perspective view of a vehicle to which the camera module according to the embodiment is applied.

For example, FIG. 55 is an external view of the vehicle including a vehicle driver assistance device to which the camera module 1000 according to the embodiment is applied.

Referring to FIG. 55, a vehicle 700 in the embodiment may include wheels 13FL and 13FR rotated by a power source and a predetermined sensor. The sensor may be a camera sensor 2000, but the present invention is not limited thereto.

The camera sensor 2000 may be a camera sensor to which the camera module 1000 according to the embodiment is applied. The vehicle 700 in the embodiment may acquire image information through the camera sensor 2000 for capturing a front image or a surrounding image, determine a situation in which a lane line is not identified using the image information, and generate a virtual lane line when the lane line is not identified.

For example, the camera sensor 2000 may acquire a front image by capturing a view in front of the vehicle 700, and a processor (not shown) may acquire image information by analyzing an object included in the front image.

For example, when objects, such as a median, a curb, or a street tree corresponding to a lane line, an adjacent vehicle, a traveling obstacle, and an indirect road mark, are captured in the image captured by the camera sensor 2000, the processor may detect the object and include the detected object in the image information. At this time, the processor may further supplement the image information by acquiring distance information to the object detected through the camera sensor 2000.

The image information may be information on the object captured in the image. The camera sensor 2000 may include an image sensor and an image processing module.

The camera sensor 2000 may process a still image or moving images obtained by the image sensor (e.g., a complementary metal-oxide semiconductor (CMOS) or a charge-coupled device (CCD)).

The image processing module may process the still image or moving images acquired through the image sensor to extract necessary information, and transmit the extracted information to the processor.

At this time, the camera sensor 2000 may include a stereo camera for improving the measurement accuracy of the object and further securing information such as a distance between the vehicle 700 and the object, but the present invention is not limited thereto.

Although embodiments have been mainly described above, these are only illustrative and do not limit the present invention, and those skilled in the art to which the present invention pertains will understand that various modifications and applications not exemplified above are possible without departing from the essential characteristics of the embodiments. For example, each component specifically shown in the embodiments may be implemented by modification. In addition, differences related to these modifications and applications should be construed as being included in the scope of the present invention defined in the appended claims.

The invention claimed is:

1. A camera actuator comprising:
   a housing;
   a mover disposed in the housing;
   a tilting guide unit disposed between the housing and the mover;
   a first member disposed outside the tilting guide unit, the first member being coupled to the mover;
   a driving unit disposed in the housing and configured to drive the mover;
   an elastic member that allows the tilting guide unit to be in close contact with the mover, the elastic member including:

a first bonding portion connected to the housing;

a second bonding portion connected to the first member; and a connecting portion connecting the first bonding portion and the second bonding portion;

a damper member disposed between the elastic member and at least one of the mover and the housing; and a second member, at least a portion of which is disposed between the tilting guide unit and the first member and coupled to the housing, wherein the mover includes a seating groove configured to accommodate the tilting guide unit, and wherein the first member and the second member are accommodated in the seating groove.

2. The camera actuator of claim 1, wherein the mover includes a plurality of mover protrusions protruding toward the elastic member, and wherein the damper member is disposed in a mover groove positioned between the plurality of mover protrusions and is in contact with the mover.

3. The camera actuator of claim 2, wherein at least a portion of the connecting portion is disposed in the mover groove, and the connecting portion is in contact with the damper member.

4. The camera actuator of claim 2, wherein the plurality of mover protrusions include a first mover protrusion and a second mover protrusion disposed to be separated in a first direction, wherein the connecting portion passes through the mover groove, and wherein the mover groove is positioned between the first mover protrusion and the second mover protrusion.

5. The camera actuator of claim 4, wherein the plurality of mover protrusions include a third mover protrusion disposed inside the mover groove.

6. The camera actuator of claim 5, wherein a height of the third mover protrusion is smaller than a height of the first mover protrusion or the second mover protrusion.

7. The camera actuator of claim 1, wherein the first member includes a member protrusion disposed adjacent to the connecting portion.

8. The camera actuator of claim 7, wherein at least a portion of the member protrusion overlaps the connecting portion in an optical axis direction, and wherein at least a portion of the connecting portion is curved to correspond to an outer surface of the member protrusion.

9. The camera actuator of claim 7, wherein the damper member is coupled to the member protrusion and the connecting portion.

10. The camera actuator of claim 9, wherein the member protrusion is positioned between the first bonding portion and the second bonding portion.

11. The camera actuator of claim 10, wherein the second member includes a housing protrusion disposed adjacent to the connecting portion.

12. The camera actuator of claim 11, wherein at least a portion of the housing protrusion overlaps the connecting portion in an optical axis direction.

13. The camera actuator of claim 11, wherein at least a portion of the connecting portion is curved to correspond to an outer surface of the housing protrusion.

14. The camera actuator of claim 13, wherein the damper member is coupled to the housing protrusion and the connecting portion.

15. The camera actuator of claim 14, wherein at least a portion of the housing protrusion overlaps the damper member in a first direction.

16. The camera actuator of claim 1, wherein the damper member is coupled to legs of the connecting portion.

* * * * *